United States Patent
Gillerman et al.

(10) Patent No.: US 12,522,501 B2
(45) Date of Patent: Jan. 13, 2026

(54) ARCHITECTURES FOR PRODUCTION OF NITRIC OXIDE

(71) Applicant: Third Pole, Inc., Waltham, MA (US)

(72) Inventors: Ian J. Gillerman, Somerville, MA (US); Benjamin J. Apollonio, Lunenburg, MA (US); Kevin Cedrone, Boxborough, MA (US); Ziad F. Elghazzawi, Newton, MA (US); Gregory W. Hall, Belmont, MA (US)

(73) Assignee: Third Pole, Inc., Waltham, MA (US)

( * ) Notice: Subject to any disclaimer, the term of this patent is extended or adjusted under 35 U.S.C. 154(b) by 999 days.

(21) Appl. No.: 16/875,914

(22) Filed: May 15, 2020

(65) Prior Publication Data

US 2020/0361773 A1 Nov. 19, 2020

Related U.S. Application Data

(60) Provisional application No. 62/959,942, filed on Jan. 11, 2020, provisional application No. 62/959,937, (Continued)

(51) Int. Cl.
*C01B 21/24* (2006.01)
*A61M 16/10* (2006.01)
(Continued)

(52) U.S. Cl.
CPC ............ *C01B 21/24* (2013.01); *A61M 16/12* (2013.01); *C01B 21/203* (2013.01); *A61M 2016/102* (2013.01)

(58) Field of Classification Search
CPC ...... C01B 21/203; C01B 21/24; A61M 16/10; A61M 16/12; A61M 16/122;
(Continued)

(56) References Cited

U.S. PATENT DOCUMENTS

| | | |
|---|---|---|
| 709,867 A | 9/1902 | Bradley et al. |
| 2,485,478 A | 10/1949 | Cotton |
| | (Continued) | |

FOREIGN PATENT DOCUMENTS

| | | |
|---|---|---|
| CA | 2413834 A1 | 6/2004 |
| CN | 1099997 | 3/1995 |
| | (Continued) | |

OTHER PUBLICATIONS

Charles, et al., "SiO2 Deposition from Oxygen/Silane Pulsed Helicon Diffusion Plasmas" Applied Physics Letters, vol. 67, No. 1, pp. 40-42, Jul. 3, 1995.
(Continued)

*Primary Examiner* — Paige Kathleen Bugg
(74) *Attorney, Agent, or Firm* — Greenberg Traurig, LLP; David J. Dykeman; Jaime Burke

(57) ABSTRACT

Architectures for production of nitric oxide (NO) include systems and methods for generating NO having one or more plasma chambers configured to ionize a reactant gas to generate a plasma for producing a product gas containing NO using a flow of the reactant gas through one or more plasma chambers; a controller configured to regulate the amount of nitric oxide in the product gas using one or more parameters as an input to the controller, one or more parameters including information from a plurality of sensors configured to collect information relating to at least one of the reactant gas, the product gas, and a medical gas into which product gas flows; and a flow divider configured to divide a product gas flow from the plasma chamber into a first product gas flow to provide a variable flow to a patient inspiratory flow and a second product gas flow.

14 Claims, 56 Drawing Sheets

Related U.S. Application Data filed on Jan. 11, 2020, provisional application No. 62/848,530, filed on May 15, 2019.

(51) Int. Cl.
*A61M 16/12* (2006.01)
*C01B 21/20* (2006.01)

(58) Field of Classification Search
CPC ......... A61M 2202/0275; A61B 18/042; A61K 9/007; A61P 11/00; A61P 11/06; A61P 11/08
USPC .................................................... 128/202.26
See application file for complete search history.

(56) References Cited

U.S. PATENT DOCUMENTS

| | | |
|---|---|---|
| 2,485,481 A | 10/1949 | Cotton |
| 2,525,938 A | 10/1950 | Peck |
| 2,684,448 A | 7/1954 | Nilles |
| 3,225,309 A | 12/1965 | Phelps |
| 3,805,590 A | 4/1974 | Ringwall et al. |
| 4,287,040 A | 9/1981 | Alamaro |
| 4,500,563 A | 2/1985 | Ellenberger et al. |
| 4,505,795 A | 3/1985 | Alamaro |
| 4,680,694 A | 7/1987 | Huynh et al. |
| 4,695,358 A | 9/1987 | Mizuno et al. |
| 4,705,670 A | 11/1987 | O'Hare |
| 4,816,229 A | 3/1989 | Jensen et al. |
| 4,877,589 A | 10/1989 | Conrad |
| 5,285,372 A | 2/1994 | Huynh et al. |
| 5,378,436 A | 1/1995 | Endoh et al. |
| 5,396,882 A | 3/1995 | Zapol |
| 5,413,097 A | 5/1995 | Birenheide et al. |
| 5,471,977 A | 12/1995 | Olsson et al. |
| 5,485,827 A | 1/1996 | Zapol et al. |
| 5,531,218 A | 7/1996 | Krebs |
| 5,546,935 A | 8/1996 | Champeau |
| 5,558,083 A | 9/1996 | Bathe et al. |
| 5,573,733 A | 11/1996 | Salama |
| 5,674,381 A | 10/1997 | Dekker |
| 5,692,495 A | 12/1997 | Sheu |
| 5,732,693 A | 3/1998 | Bathe et al. |
| 5,749,937 A | 5/1998 | Detering et al. |
| 5,752,504 A | 5/1998 | Bathe |
| 5,827,420 A | 10/1998 | Shirazi et al. |
| 5,839,433 A | 11/1998 | Higenbottam |
| 5,845,633 A | 12/1998 | Psaros |
| 5,918,596 A | 7/1999 | Heinonen |
| 6,089,229 A | 7/2000 | Bathe et al. |
| 6,109,260 A | 8/2000 | Bathe |
| 6,125,846 A | 10/2000 | Bathe et al. |
| 6,164,276 A | 12/2000 | Bathe et al. |
| 6,186,140 B1 | 2/2001 | Hoague |
| 6,186,142 B1 | 2/2001 | Schmidt et al. |
| 6,197,091 B1 | 3/2001 | Ji et al. |
| 6,224,653 B1 | 5/2001 | Shvedchikov et al. |
| 6,250,302 B1 | 6/2001 | Rantala |
| 6,290,683 B1 | 9/2001 | Erez et al. |
| 6,296,827 B1 | 10/2001 | Castor et al. |
| 6,432,077 B1 | 8/2002 | Stenzler |
| 6,532,956 B2 | 3/2003 | Hill |
| 6,536,429 B1 | 3/2003 | Pavlov et al. |
| 6,581,599 B1 | 6/2003 | Stenzler |
| 6,612,306 B1 | 9/2003 | Mault |
| 6,668,828 B1 | 12/2003 | Figley et al. |
| 6,758,214 B2 | 7/2004 | Fine et al. |
| 6,920,876 B2 | 7/2005 | Miller et al. |
| 6,955,171 B1 | 10/2005 | Figley et al. |
| 6,955,790 B2 | 10/2005 | Castor et al. |
| 6,984,256 B2 | 1/2006 | Lamprecht et al. |
| 6,986,351 B2 | 1/2006 | Figley et al. |
| 7,025,869 B2 | 4/2006 | Fine et al. |
| 7,040,313 B2 | 5/2006 | Fine et al. |
| 7,122,018 B2 | 10/2006 | Stenzler et al. |
| 7,220,393 B2 | 5/2007 | Miller et al. |
| 7,255,105 B2 | 8/2007 | Figley et al. |
| 7,312,584 B2 | 12/2007 | Tamita et al. |
| 7,335,181 B2 | 2/2008 | Miller et al. |
| 7,485,324 B2 | 2/2009 | Miller et al. |
| 7,498,000 B2 | 3/2009 | Pekshev et al. |
| 7,516,742 B2 | 4/2009 | Stenzler et al. |
| 7,520,866 B2 | 4/2009 | Stenzler et al. |
| 7,523,752 B2 | 4/2009 | Montgomery et al. |
| 7,531,133 B2 | 5/2009 | Hole et al. |
| 7,560,076 B2 | 7/2009 | Rounbehler et al. |
| 7,589,473 B2 | 9/2009 | Suslov |
| 7,597,731 B2 | 10/2009 | Palmerton et al. |
| 7,618,594 B2 | 11/2009 | Rounbehler et al. |
| 7,744,812 B2 | 6/2010 | Witherspoon et al. |
| 7,861,516 B2 | 1/2011 | Allanson et al. |
| 7,861,717 B1 | 1/2011 | Krebs |
| 7,914,743 B2 | 3/2011 | Fine et al. |
| 7,947,227 B2 | 5/2011 | Fine et al. |
| 7,955,294 B2 | 6/2011 | Stenzler et al. |
| 8,030,849 B2 | 10/2011 | Suslov |
| 8,043,252 B2 | 10/2011 | Miller et al. |
| 8,057,742 B2 | 11/2011 | Rounbehler et al. |
| 8,066,904 B2 | 11/2011 | Fine et al. |
| 8,079,998 B2 | 12/2011 | Hole et al. |
| 8,083,997 B2 | 12/2011 | Rounbehler et al. |
| 8,091,549 B2 | 1/2012 | Montgomery et al. |
| 8,151,791 B2 | 4/2012 | Arlow et al. |
| 8,173,072 B2 | 5/2012 | Fine et al. |
| 8,187,544 B2 | 5/2012 | Fine et al. |
| 8,211,368 B2 | 7/2012 | Fine et al. |
| 8,221,800 B2 | 7/2012 | Fine et al. |
| 8,226,916 B2 | 7/2012 | Rounbehler et al. |
| 8,246,725 B2 | 8/2012 | Rounbehler et al. |
| 8,267,884 B1 | 9/2012 | Hicks |
| 8,268,252 B2 | 9/2012 | Fuller et al. |
| 8,277,399 B2 | 10/2012 | Hamilton et al. |
| 8,282,966 B2 | 10/2012 | Baldassarre et al. |
| 8,291,904 B2 | 10/2012 | Bathe et al. |
| 8,293,284 B2 | 10/2012 | Baldassarre et al. |
| 8,328,998 B2 | 12/2012 | Wada et al. |
| 8,344,627 B1 | 1/2013 | Hooke et al. |
| 8,371,296 B2 | 2/2013 | Fine et al. |
| 8,377,462 B2 | 2/2013 | DesNoyer et al. |
| 8,397,721 B2 | 3/2013 | Montgomery et al. |
| D679,366 S | 4/2013 | Fuller |
| 8,408,206 B2 | 4/2013 | Montgomery et al. |
| 8,431,163 B2 | 4/2013 | Baldassarre et al. |
| D688,352 S | 8/2013 | Fuller |
| 8,517,015 B2 | 8/2013 | Montgomery et al. |
| 8,518,457 B2 | 8/2013 | Miller et al. |
| 8,573,209 B2 | 11/2013 | Bathe et al. |
| 8,573,210 B2 | 11/2013 | Bathe et al. |
| 8,574,531 B2 | 11/2013 | Miller et al. |
| 8,580,109 B2 | 11/2013 | Kruckenberg et al. |
| 8,607,785 B2 | 12/2013 | Fine et al. |
| 8,607,792 B2 | 12/2013 | Montgomery et al. |
| 8,609,026 B2 | 12/2013 | Fine et al. |
| 8,609,028 B2 | 12/2013 | Rounbehler et al. |
| 8,613,958 B2 | 12/2013 | Fine |
| 8,616,204 B2 | 12/2013 | Montgomery et al. |
| 8,646,445 B2 | 2/2014 | Fine et al. |
| D701,963 S | 4/2014 | Abarbanel et al. |
| 8,685,467 B2 | 4/2014 | Miller et al. |
| 8,701,657 B2 | 4/2014 | Fine et al. |
| 8,715,577 B2 | 5/2014 | Fine et al. |
| 8,717,733 B2 | 5/2014 | Gefter et al. |
| 8,720,440 B2 | 5/2014 | Montgomery et al. |
| 8,741,222 B2 | 6/2014 | Fine et al. |
| 8,757,148 B2 | 6/2014 | Montgomery et al. |
| 8,770,199 B2 | 7/2014 | Flanagan et al. |
| 8,776,794 B2 | 7/2014 | Bathe et al. |
| 8,776,795 B2 | 7/2014 | Bathe et al. |
| 8,790,715 B2 | 7/2014 | Montgomery et al. |
| 8,795,222 B2 | 8/2014 | Stenzler et al. |
| 8,795,741 B2 | 8/2014 | Baldassarre |
| 8,808,655 B2 | 8/2014 | Solovyov et al. |
| 8,821,801 B2 | 9/2014 | Rounbehler et al. |
| 8,821,828 B2 | 9/2014 | Hilbig et al. |

(56) References Cited

U.S. PATENT DOCUMENTS

| | | |
|---|---|---|
| 8,846,112 B2 | 9/2014 | Baldassarre |
| 8,887,720 B2 | 11/2014 | Fine et al. |
| 8,893,717 B2 | 11/2014 | Montgomery et al. |
| 8,944,049 B2 | 2/2015 | Fine et al. |
| 9,035,045 B2 | 5/2015 | Chu et al. |
| 9,067,788 B1 | 6/2015 | Spielman et al. |
| 9,095,534 B2 | 8/2015 | Stenzler et al. |
| 9,108,016 B2 | 8/2015 | Acker et al. |
| 9,180,217 B2 | 11/2015 | Arnold et al. |
| 9,192,718 B2 | 11/2015 | Fine |
| 9,260,399 B2 | 2/2016 | Ruan et al. |
| 9,265,911 B2 | 2/2016 | Bathe et al. |
| 9,279,794 B2 | 3/2016 | Tolmie et al. |
| 9,295,802 B2 | 3/2016 | Bathe et al. |
| 9,351,994 B2 | 5/2016 | Montgomery et al. |
| 9,408,993 B2 | 8/2016 | Bathe et al. |
| 9,408,994 B2 | 8/2016 | Fine et al. |
| 9,522,249 B2 | 12/2016 | Rounbehler et al. |
| 9,550,039 B2 | 1/2017 | Flanagan et al. |
| 9,550,040 B2 | 1/2017 | Acker et al. |
| 9,562,113 B2 | 2/2017 | Ruan et al. |
| 9,573,110 B2 | 2/2017 | Montgomery et al. |
| 9,604,028 B2 | 3/2017 | Fine et al. |
| 9,701,538 B2 | 7/2017 | Fine et al. |
| 9,713,244 B2 | 7/2017 | Tabata et al. |
| 9,770,570 B2 | 9/2017 | Schnictman et al. |
| 9,795,756 B2 | 10/2017 | Flanagan et al. |
| 9,895,199 B2 | 2/2018 | Montgomery et al. |
| 9,896,337 B2 | 2/2018 | Montgomery et al. |
| 9,956,373 B2 | 5/2018 | Rounbehler et al. |
| 9,982,354 B2 | 5/2018 | Kim |
| 10,081,544 B2 | 9/2018 | Fine et al. |
| 10,086,352 B2 | 10/2018 | Fine et al. |
| 10,099,029 B2 | 10/2018 | Montgomery et al. |
| 10,124,142 B2 | 11/2018 | Rounbehler et al. |
| 10,179,222 B2 | 1/2019 | Fine et al. |
| 10,188,822 B2 | 1/2019 | Flanagan et al. |
| 10,213,572 B2 | 2/2019 | Gellman et al. |
| 10,226,592 B2 | 3/2019 | Acker et al. |
| 10,232,138 B2 | 3/2019 | Acker et al. |
| 10,239,038 B2 | 3/2019 | Zapol et al. |
| 10,279,139 B2 | 5/2019 | Zapol et al. |
| 10,286,176 B2 | 5/2019 | Zapol et al. |
| 10,293,133 B2 | 5/2019 | Zapol et al. |
| 10,328,228 B2 | 6/2019 | Zapol et al. |
| 10,398,820 B2 | 9/2019 | Potenziano et al. |
| 10,426,913 B2 | 10/2019 | Tolmie et al. |
| 10,434,276 B2 | 10/2019 | Zapol et al. |
| 10,532,176 B2 | 1/2020 | Zapol et al. |
| 10,548,920 B2 | 2/2020 | Montgomery et al. |
| 10,556,082 B2 | 2/2020 | Flanagan et al. |
| 10,556,086 B2 | 2/2020 | Goldstein et al. |
| 10,576,239 B2 | 3/2020 | Zapol et al. |
| 10,646,682 B2 | 5/2020 | Zapol et al. |
| 10,682,486 B1 | 6/2020 | Moon et al. |
| 10,695,523 B2 | 6/2020 | Zapol et al. |
| 10,737,051 B2 | 8/2020 | Gellman et al. |
| 10,750,606 B1 | 8/2020 | Liu et al. |
| 10,758,703 B2 | 9/2020 | Kohlmann et al. |
| 10,773,046 B2 | 9/2020 | Schnitman et al. |
| 10,773,047 B2 | 9/2020 | Zapol et al. |
| 10,780,241 B2 | 9/2020 | Fine et al. |
| 10,814,092 B2 | 10/2020 | Rounbehler et al. |
| 10,946,163 B2 | 3/2021 | Gillerman et al. |
| 11,007,503 B2 | 5/2021 | Zapol et al. |
| 11,033,705 B2 | 6/2021 | Zapol et al. |
| 11,045,620 B2 | 6/2021 | Hall et al. |
| 11,376,390 B2 | 7/2022 | Gillerman et al. |
| 11,478,601 B2 | 10/2022 | Hall et al. |
| 11,479,464 B2 | 10/2022 | Hall et al. |
| 11,524,134 B2 | 12/2022 | Zapol et al. |
| 11,554,240 B2 | 1/2023 | Hall et al. |
| 11,660,416 B2 | 5/2023 | McAuley et al. |
| 11,691,879 B2 | 7/2023 | Kondiboyina et al. |
| 11,754,538 B1* | 9/2023 | Fine .................... G01N 33/497 73/1.06 |
| 11,827,989 B2 | 11/2023 | Silkoff et al. |
| 11,833,309 B2 | 12/2023 | Gillerman et al. |
| 11,877,378 B2 | 1/2024 | Wu et al. |
| 11,911,566 B2 | 2/2024 | Zapol et al. |
| 11,975,139 B2 | 5/2024 | Miles et al. |
| 2001/0031230 A1 | 10/2001 | Castor et al. |
| 2001/0035186 A1 | 11/2001 | Hill |
| 2002/0111748 A1 | 8/2002 | Kobayashi et al. |
| 2002/0185126 A1 | 12/2002 | Krebs |
| 2004/0019274 A1 | 1/2004 | Galloway, Jr. et al. |
| 2004/0028753 A1 | 2/2004 | Hedenstierna et al. |
| 2004/0031248 A1 | 2/2004 | Lindsay |
| 2004/0050387 A1 | 3/2004 | Younes |
| 2004/0074493 A1 | 4/2004 | Seakins et al. |
| 2004/0149282 A1 | 8/2004 | Hickle |
| 2004/0168686 A1 | 9/2004 | Krebs |
| 2004/0181149 A1 | 9/2004 | Langlotz et al. |
| 2005/0172971 A1 | 8/2005 | Kolobow et al. |
| 2005/0218007 A1 | 10/2005 | Pekshev et al. |
| 2005/0263150 A1 | 12/2005 | Chathampally et al. |
| 2005/0274381 A1 | 12/2005 | Deane et al. |
| 2005/0281465 A1 | 12/2005 | Marquart et al. |
| 2006/0025700 A1 | 2/2006 | Fallik |
| 2006/0090759 A1 | 5/2006 | Howes et al. |
| 2006/0172018 A1 | 8/2006 | Fine et al. |
| 2006/0173396 A1 | 8/2006 | Hatamian et al. |
| 2006/0207594 A1* | 9/2006 | Stenzler ............ A61M 16/204 128/204.22 |
| 2006/0276844 A1 | 12/2006 | Alon et al. |
| 2007/0113851 A1 | 5/2007 | Delisle et al. |
| 2007/0151561 A1 | 7/2007 | Laurila |
| 2007/0181126 A1 | 8/2007 | Tolmie et al. |
| 2007/0190184 A1 | 8/2007 | Montgomery et al. |
| 2008/0017030 A1 | 1/2008 | Fleck |
| 2008/0078382 A1 | 4/2008 | LeMahieu et al. |
| 2008/0119754 A1 | 5/2008 | Hietala |
| 2008/0135044 A1 | 6/2008 | Freitag et al. |
| 2008/0176335 A1 | 7/2008 | Alberti et al. |
| 2008/0202509 A1 | 8/2008 | Dillon et al. |
| 2010/0030091 A1 | 2/2010 | Fine |
| 2010/0043789 A1 | 2/2010 | Fine et al. |
| 2010/0076325 A1 | 3/2010 | Cho et al. |
| 2010/0089392 A1 | 4/2010 | Fine et al. |
| 2010/0189808 A1 | 7/2010 | Gupta et al. |
| 2010/0275911 A1 | 11/2010 | Arlow et al. |
| 2010/0330193 A1 | 12/2010 | Baldassarre et al. |
| 2011/0140607 A1 | 6/2011 | Moore et al. |
| 2011/0240019 A1 | 10/2011 | Fine et al. |
| 2012/0093948 A1 | 4/2012 | Fine et al. |
| 2012/0279500 A1 | 11/2012 | Singvogel et al. |
| 2012/0285449 A1 | 11/2012 | Fine et al. |
| 2012/0296265 A1 | 11/2012 | Dobrynin et al. |
| 2013/0123801 A1 | 5/2013 | Umasuthan et al. |
| 2013/0150863 A1 | 6/2013 | Baumgartner |
| 2013/0239963 A1 | 9/2013 | Goldstein et al. |
| 2013/0309328 A1 | 11/2013 | Watts et al. |
| 2014/0020685 A1 | 1/2014 | Szabo |
| 2014/0031668 A1 | 1/2014 | Mobasser et al. |
| 2014/0127081 A1* | 5/2014 | Fine .................... A61M 16/12 422/198 |
| 2014/0127330 A1 | 5/2014 | Fine et al. |
| 2014/0144436 A1 | 5/2014 | Fine et al. |
| 2014/0144444 A1 | 5/2014 | Fine et al. |
| 2014/0155684 A1 | 6/2014 | Ehrenreich |
| 2014/0158121 A1 | 6/2014 | Flanagan et al. |
| 2014/0166009 A1 | 6/2014 | Flanagan et al. |
| 2014/0216452 A1 | 8/2014 | Miller et al. |
| 2014/0251787 A1 | 9/2014 | Montgomery et al. |
| 2014/0363525 A1 | 12/2014 | Montgomery et al. |
| 2014/0377378 A1 | 12/2014 | Baldassarre |
| 2015/0000659 A1 | 1/2015 | Martin |
| 2015/0004248 A1 | 1/2015 | Morfill et al. |
| 2015/0034084 A1 | 2/2015 | Av-Gay et al. |
| 2015/0044305 A1 | 2/2015 | Av-Gay et al. |
| 2015/0072023 A1 | 3/2015 | Greenberg et al. |
| 2015/0075522 A1 | 3/2015 | Acker et al. |
| 2015/0090261 A1 | 4/2015 | Crosbie |

(56) References Cited

U.S. PATENT DOCUMENTS

| | | |
|---|---|---|
| 2015/0101600 A1 | 4/2015 | Miller et al. |
| 2015/0101604 A1* | 4/2015 | Crosbie .................. B01D 53/22 128/203.14 |
| 2015/0174158 A1 | 6/2015 | Av-Gay et al. |
| 2015/0190565 A1 | 7/2015 | Ohdaira et al. |
| 2015/0238248 A1 | 8/2015 | Thompson et al. |
| 2015/0272988 A1 | 10/2015 | Av-Gay et al. |
| 2015/0273176 A1 | 10/2015 | Acker et al. |
| 2015/0328430 A1 | 11/2015 | Miller et al. |
| 2016/0022731 A1 | 1/2016 | Av-Gay et al. |
| 2016/0030699 A1 | 2/2016 | Zapol et al. |
| 2016/0038710 A1 | 2/2016 | Zapol et al. |
| 2016/0045685 A1 | 2/2016 | Hyde et al. |
| 2016/0106946 A1* | 4/2016 | Gellman .................. C01B 21/24 422/642 |
| 2016/0106949 A1 | 4/2016 | Kohlmann et al. |
| 2016/0121071 A1 | 5/2016 | Moon et al. |
| 2016/0151598 A1 | 6/2016 | Fine |
| 2016/0183841 A1 | 6/2016 | Duindam et al. |
| 2016/0191887 A1 | 6/2016 | Casas |
| 2016/0193336 A1 | 7/2016 | Nelson et al. |
| 2016/0228670 A1 | 8/2016 | Av-Gay et al. |
| 2016/0243328 A1 | 8/2016 | Tolmie et al. |
| 2016/0271169 A1 | 9/2016 | Potenziano et al. |
| 2016/0279165 A1 | 9/2016 | Av-Gay et al. |
| 2016/0310693 A1 | 10/2016 | Bathe et al. |
| 2016/0324580 A1 | 11/2016 | Esterberg |
| 2016/0367775 A1 | 12/2016 | Tolmie et al. |
| 2017/0014571 A1 | 1/2017 | Deem et al. |
| 2017/0014591 A1 | 1/2017 | Tolmie et al. |
| 2017/0014592 A1 | 1/2017 | Tolmie et al. |
| 2017/0021124 A1 | 1/2017 | Tolmie et al. |
| 2017/0065631 A1 | 3/2017 | Av-Gay et al. |
| 2017/0095634 A1 | 4/2017 | Miller et al. |
| 2017/0112871 A1 | 4/2017 | Nelson et al. |
| 2017/0128694 A1 | 5/2017 | Acker et al. |
| 2017/0143758 A1 | 5/2017 | Greenberg et al. |
| 2017/0165294 A1 | 6/2017 | Dasse et al. |
| 2017/0182088 A1 | 6/2017 | Dasse et al. |
| 2017/0232166 A1 | 8/2017 | Potenziano et al. |
| 2017/0239289 A1 | 8/2017 | Av-Gay et al. |
| 2017/0259025 A1 | 9/2017 | Fine et al. |
| 2017/0296463 A1 | 10/2017 | Minton et al. |
| 2017/0348503 A1 | 12/2017 | Westermark |
| 2018/0049622 A1 | 2/2018 | Ryan et al. |
| 2018/0071467 A1 | 3/2018 | Fine et al. |
| 2018/0104432 A1 | 4/2018 | Flanagan et al. |
| 2018/0125883 A1 | 5/2018 | Av-Gay et al. |
| 2018/0126111 A1 | 5/2018 | Moon et al. |
| 2018/0133246 A1 | 5/2018 | Av-Gay et al. |
| 2018/0169370 A1 | 6/2018 | Montgomery et al. |
| 2018/0228836 A1 | 8/2018 | Nelson et al. |
| 2018/0243527 A1* | 8/2018 | Zapol .................. A61M 16/12 |
| 2018/0243528 A1* | 8/2018 | Zapol .................. A61K 33/00 |
| 2018/0264032 A1 | 9/2018 | Jaffri et al. |
| 2018/0280920 A1* | 10/2018 | Zapol .................. A61K 33/00 |
| 2018/0296790 A1 | 10/2018 | Zapol et al. |
| 2018/0304038 A1 | 10/2018 | Jafri et al. |
| 2018/0311460 A1 | 11/2018 | Rounbehler et al. |
| 2018/0328842 A1 | 11/2018 | Kjaer |
| 2019/0038864 A1 | 2/2019 | Montgomery et al. |
| 2019/0083699 A1 | 3/2019 | Spohn et al. |
| 2019/0092639 A1 | 3/2019 | Fine et al. |
| 2019/0127223 A1 | 5/2019 | Montgomery et al. |
| 2019/0134574 A1 | 5/2019 | Tsuchiaya et al. |
| 2019/0135633 A1 | 5/2019 | Montgomery et al. |
| 2019/0143068 A1 | 5/2019 | Rounbehler et al. |
| 2019/0184116 A1* | 6/2019 | Acker .................. A61M 16/201 |
| 2019/0209993 A1 | 7/2019 | Fine et al. |
| 2019/0217042 A1 | 7/2019 | Zapol et al. |
| 2019/0217043 A1 | 7/2019 | Fine et al. |
| 2019/0233288 A1 | 8/2019 | Montgomery et al. |
| 2019/0233289 A1 | 8/2019 | Montgomery et al. |
| 2019/0276313 A1 | 9/2019 | Montgomery et al. |
| 2019/0314596 A1 | 10/2019 | Zapol et al. |
| 2019/0374739 A1 | 12/2019 | Tolmie et al. |
| 2020/0030553 A1 | 1/2020 | Keip et al. |
| 2020/0094011 A1 | 3/2020 | Zapol et al. |
| 2020/0139071 A1 | 5/2020 | Fine et al. |
| 2020/0139072 A1 | 5/2020 | Zapol et al. |
| 2020/0139073 A1 | 5/2020 | Tector et al. |
| 2020/0163989 A1 | 5/2020 | Montgomery et al. |
| 2020/0171259 A1 | 6/2020 | Flanagan et al. |
| 2020/0171264 A1 | 6/2020 | Goldstein et al. |
| 2020/0180958 A1 | 6/2020 | Fine et al. |
| 2020/0188319 A1 | 6/2020 | Quinn et al. |
| 2020/0197318 A1 | 6/2020 | Widgerow et al. |
| 2020/0254199 A1 | 8/2020 | Bassin |
| 2020/0282375 A1 | 9/2020 | Fine et al. |
| 2020/0308032 A1 | 10/2020 | Domrese et al. |
| 2020/0360647 A1 | 11/2020 | Quinn et al. |
| 2020/0360649 A1 | 11/2020 | Hall et al. |
| 2020/0360690 A1 | 11/2020 | Evans et al. |
| 2020/0361772 A1 | 11/2020 | Hall et al. |
| 2020/0390994 A1 | 12/2020 | Gillerman et al. |
| 2021/0214222 A1 | 7/2021 | Kondiboyia et al. |
| 2021/0220586 A1 | 7/2021 | Shah et al. |
| 2021/0268221 A1 | 9/2021 | Gillerman et al. |
| 2021/0330957 A1 | 10/2021 | Potenziano et al. |
| 2022/0080147 A1 | 3/2022 | Shah et al. |
| 2022/0096535 A1 | 3/2022 | Shah et al. |
| 2022/0135406 A1 | 5/2022 | Apollonio et al. |
| 2022/0162070 A1 | 5/2022 | Silkoff et al. |
| 2022/0193623 A1 | 6/2022 | Nakao |
| 2022/0211967 A1 | 7/2022 | Hall et al. |
| 2022/0296845 A1 | 9/2022 | Jackson et al. |
| 2022/0298653 A1 | 9/2022 | Silkoff et al. |
| 2022/0339391 A1 | 10/2022 | Gillerman et al. |
| 2023/0001119 A1 | 1/2023 | Richardson et al. |
| 2023/0053201 A1 | 2/2023 | Miles et al. |
| 2023/0058407 A1 | 2/2023 | Hall |
| 2023/0098706 A1 | 3/2023 | Miles et al. |
| 2023/0112963 A1 | 4/2023 | Yuen et al. |
| 2023/0149556 A1 | 5/2023 | Hall et al. |
| 2023/0158064 A1 | 5/2023 | Shah |
| 2023/0158260 A1 | 5/2023 | Shah et al. |
| 2023/0158261 A1 | 5/2023 | Trias et al. |
| 2023/0201497 A1 | 6/2023 | Dekker |
| 2023/0330359 A1 | 10/2023 | Scholz et al. |
| 2024/0067523 A1 | 2/2024 | Hall et al. |
| 2024/0076185 A1 | 3/2024 | Hall et al. |
| 2024/0076186 A1 | 3/2024 | Kondiboyina et al. |
| 2024/0209521 A1 | 6/2024 | Silkoff et al. |
| 2024/0253990 A1 | 8/2024 | Apollonio et al. |
| 2024/0325672 A1 | 10/2024 | Gillerman et al. |
| 2025/0128946 A1 | 4/2025 | Silkoff et al. |

FOREIGN PATENT DOCUMENTS

| | | |
|---|---|---|
| CN | 1730115 | 2/2006 |
| CN | 201037113 Y | 3/2008 |
| CN | 100404083 C | 7/2008 |
| CN | 101036482 B | 12/2010 |
| CN | 110662339 A | 1/2020 |
| CN | 110872714 A | 3/2020 |
| DE | 101 51 270 | 10/2006 |
| EP | 621051 | 10/1994 |
| EP | 0763500 A2 | 3/1997 |
| EP | 0878208 A2 | 11/1998 |
| EP | 1036758 | 9/2000 |
| EP | 2151554 | 2/2010 |
| EP | 1854494 | 6/2012 |
| EP | 2565157 B1 | 10/2017 |
| EP | 3372267 A1 | 12/2018 |
| JP | H04132560 | 5/1992 |
| JP | 2000102616 | 4/2000 |
| JP | 2003339872 A | 12/2003 |
| JP | 2004065636 | 3/2004 |
| JP | 2006273677 | 10/2006 |
| KR | 100841741 B1 | 6/2008 |
| KR | 20100087977 | 8/2010 |
| RU | 2199167 C1 | 2/2003 |
| WO | WO199507610 | 3/1995 |
| WO | WO2004032719 | 4/2004 |

(56) References Cited

FOREIGN PATENT DOCUMENTS

| | | |
|---|---|---|
| WO | 2005094138 A1 | 10/2005 |
| WO | 2005110441 A2 | 11/2005 |
| WO | 2008116991 A2 | 10/2008 |
| WO | WO2009018837 | 2/2009 |
| WO | WO2010021944 | 2/2010 |
| WO | WO2011/002606 | 1/2011 |
| WO | 2012014805 A1 | 2/2012 |
| WO | WO2012/034089 | 3/2012 |
| WO | WO2012/094008 | 7/2012 |
| WO | WO2013/052548 | 4/2013 |
| WO | WO2013/070712 | 5/2013 |
| WO | WO2013/181179 | 12/2013 |
| WO | WO2014/085719 | 6/2014 |
| WO | 2014144184 A2 | 9/2014 |
| WO | WO2014/143842 | 9/2014 |
| WO | WO2014/144151 | 9/2014 |
| WO | 2015049783 A1 | 4/2015 |
| WO | WO2015/066278 | 5/2015 |
| WO | WO2015/127085 | 8/2015 |
| WO | 2015168517 A1 | 11/2015 |
| WO | 2015172160 A1 | 11/2015 |
| WO | WO2016/064863 | 4/2016 |
| WO | WO2018/157172 | 8/2018 |
| WO | WO2018/157175 | 8/2018 |
| WO | 2019046415 A1 | 3/2019 |
| WO | WO2019/046413 | 3/2019 |
| WO | WO2019/133776 | 7/2019 |
| WO | WO2019/133777 | 7/2019 |
| WO | 2019222640 A1 | 11/2019 |
| WO | 2020033768 A1 | 2/2020 |
| WO | 2020115473 A1 | 6/2020 |
| WO | 2020142658 A1 | 7/2020 |
| WO | 2020150195 A1 | 7/2020 |
| WO | 2020232414 A1 | 11/2020 |
| WO | 2020232419 A1 | 11/2020 |
| WO | 2021087382 A1 | 5/2021 |
| WO | 2021142472 A1 | 7/2021 |
| WO | 2021154833 A1 | 8/2021 |
| WO | 2021245667 A1 | 12/2021 |
| WO | 2022123567 A1 | 6/2022 |
| WO | 2022123574 A1 | 6/2022 |
| WO | 2022123580 A1 | 6/2022 |
| WO | 2022192757 A1 | 9/2022 |
| WO | 2023018992 A1 | 2/2023 |
| WO | 2023049873 A1 | 3/2023 |
| WO | 2023092103 A1 | 5/2023 |
| WO | 2023201363 A1 | 10/2023 |

OTHER PUBLICATIONS

Patil et al., Plasma Assisted Nitrogen Oxide Production from Air, AiChE Journal, vol. 64, Issue 2, Aug. 14, 2017.
Pawlat et al., Evaluation of Oxidative Species in Gaseous, Plasma Chemistry and Plasma Processing, vol. 39, pp. 627-642, Mar. 28, 2019.
Wang et al., Gliding Arc Plasma for CO2 Conversion, Chemical Engineering Journal, vol. 330, pp. 11-25, 2017.
Bellerophon, "A Dose Escalation Study to Assess the Safety and Efficacy of Pulsed iNO in Subjects With Pulmonary Fibrosis", Aug. 30, 2017, https://clinicaltrials.gov/ct2/show/NCT03267108.
Fowler, "Exercise Intolerance in Pulmonary Arterial Hypertension", Pulmonary Medicine, vol. 2012, Article ID 39204, 11 pages, (2012).
Keshav, Saurabh. "Using Plasmas for High-speed Flow Control and Combustion Control" Diss. The Ohio State University, 2008.
Li et al., Production of Medically Useful Nitric Monoxide Using AC Arc Discharge, Nitric Oxide, Feb. 28, 2018, vol. 73, pp. 89-95.
Mok et al. "Application of Positive Pulsed Corona Discharge to Removal of SO2 and NOx," Proceedings, ICESP VII, Sep. 20-25, 1998, Kyongju, Korea.
Namihira et al., Production of Nitric Oxide Using a Pulsed Arc Discharge, IEEE Transactions on Plasma Science, 2002, 30(5):1993-1998.

Namihira et al., Production of Nitric Monoxide Using Pulsed Discharges for a Medical Application, IEEE Transactions on Plasma Science, vol. 29, No. 1, pp. 109-114, Feb. 2000.
Schilz, "Treatment of Pulmonary Hypertension Related to Disorders of Hypoxia" Advances in Pulmonary Hypertension, vol. 4, No. 2, pp. 14-22, May 2005.
Birkeland, K., "On the Oxidation of Atmospheric Nitrogen in Electric Arcs", A Paper read before the Faraday Society on Monday, Jul. 2, 1906, Published on Jan. 1, 1906.
Feigerle, C., et al., "Multiphoton Ionization of Vibrationally Hot Nitric Oxide Produced in a Pulsed Supersonic Glow Discharge", Journal of Chemical Physics, vol. 90, Issue 6, pp. 2900-2908, Mar. 15, 1989.
Hu, Hui et al., "Study on Pulsed Arc Discharge Conditions on Production of Nitric Oxide for Medical Application", High Voltage Apparatus, Issue 3, Mar. 2005.
Hu, Hui et al., "Study on Production of Nitric Monoxide for Respiratory Distress by Pulsed Discharge", Proceedings of the CSEE, vol. 23, No. 2, Jan. 2005.
Hu, Hui et al., "The Effect of Flow Distribution on the Concentration of NO Produced by Pulsed Arc Discharge", Plasma Science and Technology, vol. 9, No. 6, pp. 766-769, Dec. 2007.
Johns Hopkins University—"American Chemical Journal vol. XXXV"—No. 4, Reports Chapter, pp. 358-368, Apr. 1906.
Kornev, J., et al., "Generation of Active Oxidant Species by Pulsed Dielectric Barrier Discharge in Water-Air Mixtures", Ozone: Science & Engineering, vol. 28, Issue 4, pp. 207-215, Jul. 2006.
Li, Z. et al., "Development of Miniature Pulsed Power Generator," 2005 IEEE Pulsed Power Conference, Monterey, CA, pp. 1053-1056, Jul. 2005.
Matsuo, K. et al., "Nitric Oxide Generated by Atmospheric Pressure Air Microplasma," 2009 IEEE Pulsed Power Conference, Washington, DC, Jun. 28-Jul. 2, 2009, pp. 999-1003, Jan. 19, 2010.
Namihara et al., "Production of NO Using Pulsed Arc Discharges and Its Medical Applications", Journal of Plasma and Fusion Research, vol. 79, No. 1 pp. 35-38, Jun. 25, 2002.
Namihira et al., "Production of Nitric Monoxide in Dry Air Using Pulsed Ddischarge," Digest of Technical Papers. 12th IEEE International Pulsed Power Conference. (Cat. No. 99CH36358), Monterey, CA, pp. 1313-1316 vol. 2, Aug. 6, 2002.
Overzet, et al. "Why and How to Pulse a Plasma"—slide show presentation, Oct. 1997.
Pontiga, F., et al., "Nitrogen Oxides Generation Induced by Negative Corona Discharge in N2 + O2 Mixtures," 2006 IEEE Conference on Electrical Insulation and Dielectric Phenomena, Kansas City, MO, pp. 264-267, Oct. 2006.
Sakai, et al., "A Compact Nitric Oxide Supply for Medical Application," 2007 16th IEEE International Pulsed Power Conference, Albuquerque, NM, pp. 752-755, Oct. 14, 2008.
International Search Report in PCT/US2020/033290 mailed Aug. 17, 2020.
Arjunan Thesis—Plasma Produced Reactive Oxygen and Nitrogen Species in Angiogenesis—May 2011—Krishna Priya Arjunan.
Arora et al., Nitric Oxide Regulation of Bacterial Biofilms, Biochemistry, vol. 54, pp. 3717-3728, May 21, 2015.
Barraud et al., Involvement of Nitric Oxide n Biofilm Dispersal of Pseudomonas Aeruginosa, Journal of Bacteriology, vol. 188, No. 21, pp. 7344-7353, Nov. 2006.
Bentur et al., Pilot Study to Test Inhaled Nitric Oxide in Cystic Fibrosis Patients with Refractory *Mycobacterium abscessus* Lung Infection, Journal of Cystic Fibrosis, vol. 19, pp. 225-231, May 23, 2019.
Bogdonovski et al., Anti-Mycobacterial Activity of High-Dose Nitric Oxide Against *Mycobacterium abscessus* In Vitro, National Institutes of Health Poster, Jul. 8, 2018.
Deppisch et al., Gaseous Nitric Oxide to Treat Antibiotic Resistant Bacterial and Fungal Lung Infections in Patients with Cystic Fibrosis: A Phase I Clinical Study, Infection, vol. 44, pp. 513-520, Feb. 9, 2016.
Dobrynin et al. "Direct and Controllable Nitric Oxide Delivery into Biological Media and Living Cells by a Pin-to-Hole Spark Discharge (PHD) Plasma" Journal of Physics D: Applied Physics, vol. 44, pp. 1-10, Jan. 28, 2011.

(56) References Cited

OTHER PUBLICATIONS

Howlin et al., Low-Dose Nitric Oxide as Targeted Anti-Biofilm Adjunctive Therapy to Treat Chronic Pseudomonas Aeruginosa Infection in Cystic Fibrosis, Molecular Therapy, vol. 25, No. 9, pp. 2104-2116, Sep. 2017.
Hu et al., "Study on Production of Inhaled Nitric Oxide for Medical Applications by Pulsed Discharge" IEEE Transactions on Plasma Science, vol. 35, No. 3, pp. 619-625, Jun. 2007.
Kuo, Spencer P. "Air Plasma for Medical Applications" J. Biomedical Science and Engineering, vol. 5, pp. 481-495, Sep. 2012.
McMullin et al., The Antimicrobial Effect of Nitric Oxide on the Bacteria That Cause Nosocomial Pneumonia in Mechanically Ventilated Patients in the Intensive Care Unit, Respiratory Care, vol. 50, No. 11, pp. 1451-1456, Nov. 2005.
Miller et al., Gaseous Nitric Oxide Bactericidal Activity Retained During Intermittent High-Dose Short Duration Exposure, Nitric Oxide, vol. 20, Issue 1, pp. 16-23, Feb. 2009.
Miller et al., Inhaled Nitric Oxide Decreases the Bacterial Load in a Rat Model of Pseudomonas Aeruginosa Pneumonia, Journal of Cystic Fibrosis, vol. 12, pp. 817-820, Mar. 6, 2013.
Miller et al., Nitric Oxide is a Potential Antimicrobial Against Slow and Fast Growing Mycobacteria, Online Abstracts Issue, American Journal Respiratory Care Medicine, vol. 193, A7498, May 18, 2016.
Miller et al., A Phase I Clinical Study of Inhaled Nitric Oxide in Healthy Adults, Journal of Cystic Fibrosis, vol. 11, pp. 324-331, Apr. 18, 2012.
Namihira et al., "Temperature and Nitric Oxide Generation in a Pulsed Arc Discharge Plasma" Plasma Science and Technology, vol. 9, No. 6, pp. 747-751, Dec. 2007.
Navarro-Gonzalez et al., "The Physical Mechanism of Nitric Oxide Formation in Simulated Lightning" Geophysical Research Letters, vol. 28, No. 20, pp. 3867-3870, Oct. 15, 2001.
Olivier et al., Treatment of Refractory *Mycobacterium abscessus* Lung Infection with Inhaled Intermittent Nitric Oxide, Poster, Jul. 8, 2018.
Sakai et al., "Nitric Oxide Generator Based on Pulsed Arc Discharge" Acta Physica Polonica A, vol. 115, No. 6, pp. 1104-1106, Jun. 2009.
Tal et al., Nitric Oxide Inhalations in Bronchiolitis: A Pilot, Randomized, Double-Blinded, Controlled Trial, Pediatric Pulmonology, vol. 53, Issue 1, pp. 95-102, Jan. 2018.
Yaacoby-Bianu et al., Compassionate Nitric Oxide Adjuvant Treatment of Persistent *Mycobacterium* Infection in Cystic Fibrosis Patients, The Pediatric Infectious Disease Journal, vol. 37, No. 4, Apr. 2018.
Heli, Study on the Removal of Byproduct Nitrogen Dioxide from the Mixture of Inhaled Nitric Oxide Produced by Pulsed Arc Discharge, Thesis for Degree of Master of Engineering, Huazhong University of Science & Technology, China, Apr. 2006, 78 pages (Includes English Language Translation of Title Page and Abstract).
Hui, Research on the Production of Nitric Oxide by Pulsed Arc Discharge and the Curing of Respiratory Distress Instrument, Dissertation for Degree of Doctor of Philosophy in Engineering, Huazhong University of Science and Technology, China, Apr. 2005, 138 pages (Includes English Language Translation of Title Page and Abstract).
Ovich et al., "Generation of Purified Nitric Oxide from Liquid N2O4 for the Treatment of Pulmonary Hypertension in Hypoxemic Swine", Nitric Oxide vol. 37, pp. 66-77, Feb. 15, 2014.
U.S. Appl. No. 15/907,241 2018/0243527 U.S. Pat. No. 10,286,176, filed Feb. 27, 2018 Aug. 30, 2018, May 14, 2019, Systems and Methods for Generating Nitric Oxide.
U.S. Appl. No. 15/907,258 2018/0243528 U.S. Pat. No. 10,328,228, filed Feb. 27, 2018 Aug. 30, 2018 Jun. 25, 2019, Systems and Methods for Ambulatory Generation of Nitric Oxide.
U.S. Appl. No. 16/363,505 2019/0217042 U.S. Pat. No. 10,576,329, filed Mar. 25, 2019 Jul. 18, 2019 Mar. 3, 2020, Systems and Methods for Ambulatory Generation of Nitric Oxide.
U.S. Appl. No. 16/388,464 2019/0314596 U.S. Pat. No. 10,532,176, filed Apr. 18, 2019 Oct. 17, 2019, Jan. 14, 2020, Systems and Methods for Generating Nitric Oxide.
U.S. Appl. No. 16/697,498 2020/0094011 U.S. Pat. No. 10,695,523, filed Nov. 27, 2019 Mar. 26, 2020 Jun. 30, 2020, Systems and Methods for Generating Nitric Oxide.
U.S. Appl. No. 16/724,233 2020/0139072, filed Dec. 21, 2019 May 7, 2020, Systems and Methods for Ambulatory Generation of Nitric Oxide.
U.S. Appl. No. 16/875,971, filed May 15, 2020, Systems and Methods for Generating Nitric Oxide.
U.S. Appl. No. 16/875,687, filed May 15, 2020, Electrodes for Nitric Oxide Generation.
U.S. Appl. No. 16/909,722, filed Jun. 23, 2020, Systems and Methods for Generating Nitric Oxide.
Beanland et al., "PreInsertion Resistors in High Voltage Capicitor Bank Switching", prepared for Western Protective Relay Conference, Oct. 19-21, 2004, Spokane, WA.
Diblasi et al., "Evidence-Based Clinical Practice Guideline: Inhaled Nitric Oxide for Neonates With Acute Hypoxic Respiratory Failure", Respiratory Care (2010), vol. 55, No. 12, pp. 1717-1745.
Edwards et al., "Current Modes of Conventional Ventilation in Intensive Care", BJA CEPD Reviews, vol. 2, No. 2, pp. 41-44, Apr. 1, 2002.
Ehrenwerth et al., Anesthesia Equipment, Principles and Applications, Chapter 6, Anesthesia Ventilators, pp. 140-171, Mosby Publishing, 1993.
Engstrom Ventilator Technical Reference Manual.
Ikaria, INOmax DSIR® Operation Manual (2012).
Kirmse et al., "Delivery of Inhaled Nitric Oxide Using the Ohmeda INOvent Delivery System", Chest (1998), vol. 113, Issue 6, pp. 1650-1657.
Maeda et al., "Generation Mechanism of Micro-Bubbles in a Pressurized Dissolution Method", Experimental Thermal and Fluid Science, vol. 60, pp. 201-207, Jan. 1, 2015.
Malik, "Nitric Oxide Production by High Voltage Electrical Discharges for Medical Uses: A Review" Plasma Chem Plasma Process, (2016), vol. 36, pp. 737-766.
Montgomery et al., "Inhaled Nitric Oxide Delivery and Monitoring", Journal of Clinical Monitoring and Computing (1999), vol. 15, pp. 325-335.
Shoobert et al., "Iridium Electrodes Increase Spark Plug Life", Platinum Metals Rev., 1962, vol. 6, No. 3, pp. 92-94.
Young et al., "Delivery and monitoring of inhaled nitric oxide", Intensive Care Med. (1996), vol. 22, pp. 77-86.

\* cited by examiner

In-Vent Device

ARCHITECTURES FOR PRODUCTION OF NITRIC OXIDE

RELATED APPLICATIONS

This application claims the benefit of and priority to U.S. Provisional Application No. 62/959,937 filed Jan. 11, 2020, U.S. Provisional Application No. 62/959,942 filed Jan. 11, 2020, and U.S. Provisional Application No. 62/848,530 filed May 15, 2019, and the contents of each of these applications are hereby incorporated herein by reference in their entireties.

FEDERALLY SPONSORED RESEARCH OR DEVELOPMENT

This invention was made with government support under Grant No. R44 HL134429 and Grant No. R44 TR001704, awarded by the National Institutes of Health (NIH). The government has certain rights in the invention.

FIELD

The present disclosure relates to systems and methods for generating nitric oxide, and more particularly to architectures for production of nitric oxide.

SUMMARY

The present disclosure is directed to systems, methods and devices for nitric oxide generation for use with various ventilation and/or medical devices.

In the presently disclosed embodiments, a nitric oxide (NO) generation system comprising: one or more plasma chambers configured to ionize a reactant gas to generate a plasma for producing a product gas containing nitric oxide (NO) using a flow of the reactant gas through the one or more plasma chambers; a controller configured to regulate the amount of nitric oxide in the product gas using one or more parameters as an input to the controller, the one or more parameters including information from a plurality of sensors configured to collect information relating to at least one of the reactant gas, the product gas, and a medical gas into which the product gas flows; and a flow divider configured to divide a product gas flow from the plasma chamber into a first product gas flow to provide a variable flow to a patient inspiratory flow and a second product gas flow.

In some embodiments, the second product gas flow from the flow divider is configured to be directed upstream of the plasma chamber and merged into the reactant gas flow to form a closed pneumatic system. In some embodiments, the second gas flow from the flow divider comprises excess NO produced by the plasma chamber that is configured to be released into the environment to form an open system. In some embodiments, the released second gas flow that comprises NO and $NO_2$ is configured to be scrubbed for at least one of NO and $NO_2$ prior to release. In some embodiments, the released second gas flow that comprises NO and $NO_2$ is released to a house vacuum.

In some embodiments, at least one of the plurality of sensors is a gas sensor configured to measure an NO concentration in the product gas. In some embodiments, the measured NO concentration in the product gas is configured to be used for control of the NO production in the plasma chamber in a closed-loop system. In some embodiments, at least one of the plurality of sensors comprises an inspiratory flow sensor configured to sense patient inspiration. In some embodiments, the flow rate of product gas diverted to the patient is proportional to the patient inspiratory flow. In some embodiments, the gas flow rate through the plasma chamber is constant. In some embodiments, the concentration of product gas at the flow diverter is constant. In some embodiments, at least one of the plurality of sensors is a gas sensor configured to measure an $NO_2$ concentration in the product gas.

In some embodiments, the second gas flow from the flow divider comprises excess NO produced by the plasma chamber that is configured to be scrubbed and flow to the plasma chamber. In some embodiments, the flow divider is comprised of a first flow controller and a second flow controller that are configured to operate to deliver a constant flow rate to the plasma chamber.

In the presently disclosed embodiments, a nitric oxide (NO) generation system includes one or more plasma chambers configured to ionize a reactant gas to generate a plasma for producing a product gas containing nitric oxide (NO) using a flow of the reactant gas through the one or more plasma chambers; a controller configured to regulate the amount of nitric oxide in the product gas using one or more parameters as an input to the controller, the one or more parameters including information from a plurality of sensors configured to collect information relating to at least one of the reactant gas, the product gas, and a medical gas into which the product gas flows; and a flow divider configured to divide a product gas flow from the plasma chamber into a first product gas flow to provide a variable flow to a patient inspiratory flow and a second product gas flow to provide a flow upstream of the plasma chamber and merged into the reactant gas flow or downstream of the plasma chamber and merged into the product gas flow, the second product gas flow forming a closed pneumatic loop in the NO generation system.

In some embodiments, at least one of the plurality of sensors is a gas sensor configured to measure an NO concentration in the product gas. In some embodiments, the measured NO concentration in the product gas is configured to be used for control of the NO production in the plasma chamber in a closed-loop system. In some embodiments, the NO concentration in the product gas is measured downstream from the plasma chamber. In some embodiments, at least one of the plurality of sensors is a gas sensor configured to measure an $NO_2$ concentration in the product gas.

In the presently disclosed embodiments, a method of generating nitric oxide (NO) includes ionizing a reactant gas inside one or more plasma chambers to generate a plasma for producing a product gas containing nitric oxide using a flow of the reactant gas through the one or more plasma chambers, the plasma chamber including at least one pair of electrodes for generating the product gas; controlling the amount of nitric oxide in the product gas using one or more parameters as input to a control algorithm used by one or more controllers to control the one or more plasma chambers, at least one of the one or more parameters being related to a target concentration of NO in a combination of the product gas and a medical gas into which the product gas flows; and dividing a flow of the product gas from the plasma chamber into a first product gas flow for providing a variable flow to a patient inspiratory flow and a second product gas flow.

In some embodiments, a plasma chamber can operate at or near atmospheric pressure. In some embodiments, product gas NO concentration can be measured. The product gas NO measurement can be made for closed-loop control of NO production, or the product gas NO measurement can be made to quantify the amount of NO loss in the system. In some embodiments, the product gas can be measured by one or more methods of gas measurement including electrochemical, optical, photoionization, and chemiluminescent methods. In some embodiments, humidity levels at the NO sensor can be managed.

In some embodiments, the system can include an $NO_2$ scrubber located between a plasma chamber and a flow divider. In some embodiments, product gas $NO_2$ scrubber measurements are used to indicate scrubber efficacy. In some embodiments, product gas $NO_2$ scrubber measurements are used to trigger scrubber replacement.

In some embodiments, a pump can be included to propel reactant gas through the system. In some embodiments, a source of pressurized reactant gas can be relied on to generate flow through the system. In some embodiments, flow controllers can include at least two parallel channels, with a first channel being used for low flow and a second channel being used for high flow. In some embodiments, close loop flow control is utilized on the part of the flow divider delivering the flow to the patient and a closed loop pressure controller maintain a constant pressure at a flow divider junction. In some embodiments, the concentration of product gas within the system is constant. In some embodiments, the mass flow rate through the flow divider to the patient is proportional to the mass flow rate in the inspiratory limb.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein.

Figure 1:
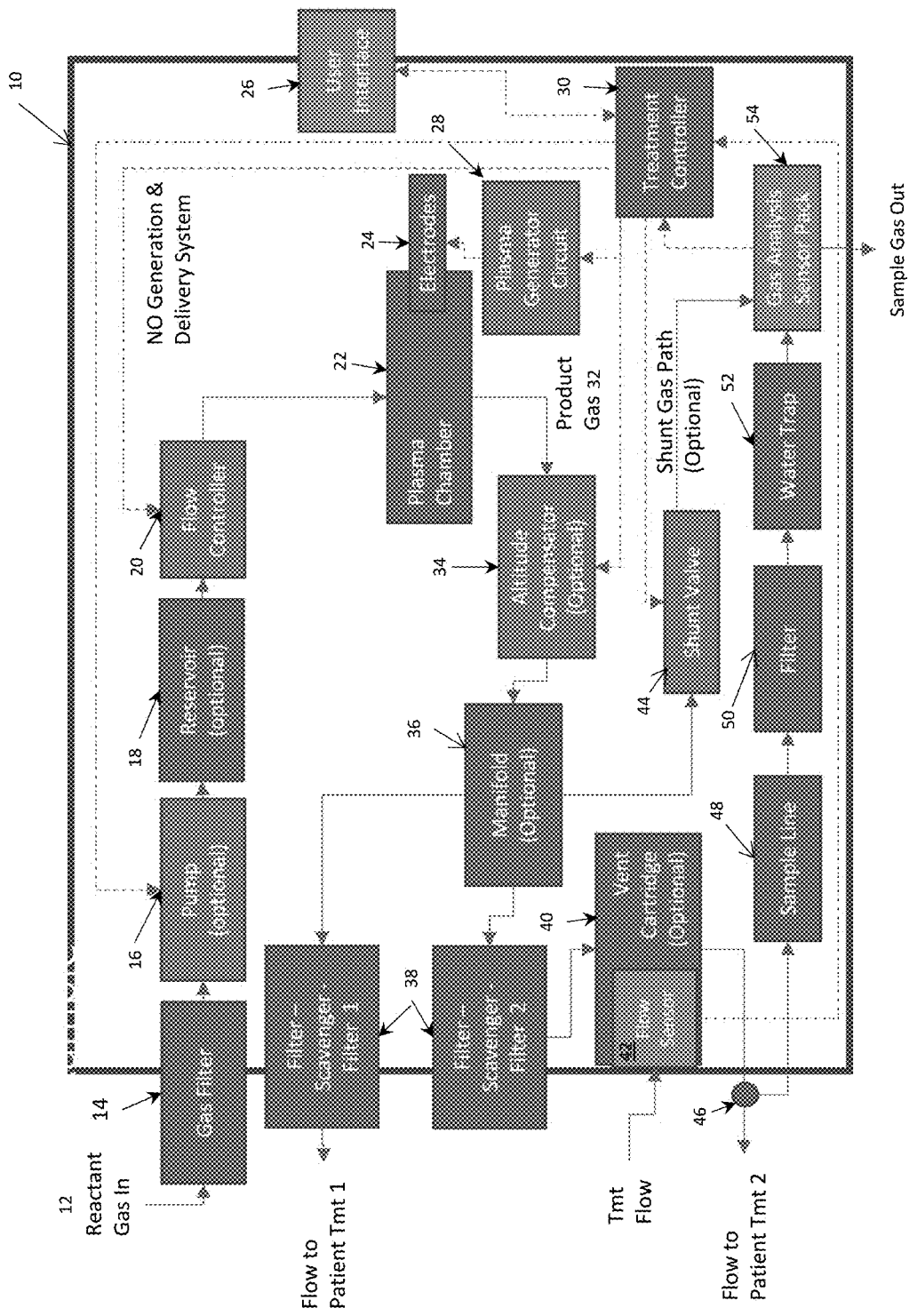
FIG. 1 is an exemplary embodiment of a system for generating a NO-enriched product gas.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It will be understood that various changes may be made in the function and arrangement of elements without departing from the spirit and scope of the presently disclosed embodiments.

Specific details are given in the following description to provide a thorough understanding of the embodiments. However, it will be understood by one of ordinary skill in the art that the embodiments may be practiced without these specific details. For example, systems, processes, and other elements in the presently disclosed embodiments may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Subject matter will now be described more fully with reference to the accompanying drawings, which form a part hereof, and which show, by way of illustration, specific example aspects and embodiments of the present disclosure. Subject matter may, however, be embodied in a variety of different forms and, therefore, covered or claimed subject matter is intended to be construed as not being limited to any example embodiments set forth herein; example embodiments are provided merely to be illustrative. The following detailed description is, therefore, not intended to be taken in a limiting sense.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure relates to systems and methods of nitric oxide (NO) delivery for use in various applications, for example, inside a hospital room, in an emergency room, in a doctor's office, in a clinic, in an ambulance, in a patient transport helicopter, in a patient transport fixed wing plane, in a ship hospital, and outside a hospital setting as a portable or ambulatory device. A NO generation and/or delivery system can take many forms, including but not limited to a device configured to work with an existing medical device that utilizes a product gas, a stand-alone (ambulatory)

device, a module that can be integrated with an existing medical device, one or more types of cartridges that can perform various functions of the NO system, and an electronic NO tank. The NO generation system uses a reactant gas, including but not limited to ambient air, to produce a product gas that is enriched with NO.

A NO generation device can be used with any device that can utilize NO, including but not limited to a ventilator, an anesthesia device, house air, a defibrillator, a ventricular assist device (VAD), a Continuous Positive Airway Pressure (CPAP) machine, a Bilevel Positive Airway Pressure (Bi-PAP) machine, a non-invasive positive pressure ventilator (NIPPV), a nasal cannula application, a nebulizer, an extracorporeal membrane oxygenation (ECMO), a bypass system, an automated CPR system, an oxygen delivery system, an oxygen concentrator, an oxygen generation system, and an automated external defibrillator AED, MRI, and a patient monitor. In addition, the destination for nitric oxide produced can be any type of delivery device associated with any medical device, including but not limited to a nasal cannula, a manual ventilation device, a face mask, inhaler, or any other delivery circuit. The NO generation capabilities can be integrated into any of these devices, or the devices can be used with a NO generation device as described herein.

FIG. 1 illustrates an exemplary embodiment of a NO generation system 10. The system 10 that includes components for reactant gas intake 12 and delivery to a plasma chamber 22. The plasma chamber 22 includes one or more electrodes 24 therein that are configured to produce, with the use of a high voltage circuit (plasma generator) 28, a product gas 32 containing a desired amount of NO from the reactant gas. The system includes a controller 30 in electrical communication with the plasma generator 28 and the electrode(s) 24 that is configured to control the concentration of NO in the product gas 32 using one or more control parameters relating to conditions within the system and/or conditions relating to a separate device for delivering the product gas to a patient and/or conditions relating to the patient receiving the product gas. In some embodiments, the plasma generator circuit is a high voltage circuit that generates a potential difference across an electrode gap. In some embodiments, the plasma generator circuit is a radio frequency (RF) power generator delivering RF power to one or more RF electrodes. In some embodiments, the RF power operates around 13.56 MHz with power in the 50-100 W range, however other power ranges can be effective depending on electrode design, production targets and reactant gas conditions. In some embodiments, RF power operates around 2.45 GHz for improved coupling and excitation of $N_2$ molecules. The controller 30 is also in communication with a user interface 26 that allows a user to interact with the system, view information about the system and NO production, and control parameters related to NO production.

In some embodiments, the NO system pneumatic path includes a pump pushing air through a manifold 36. The manifold is configured with one or more valves, including but not limited to three-way valves, binary valves, check valves, and/or proportional orifices. The treatment controller 30 controls the flow of the pump, the power in the plasma and the direction of the gas flow post-electrical discharge. By configuring valves, the treatment controller 30 can direct gas to the manual respiration pathway, the ventilator pathway or the gas sensor chamber for direct measurement of NO, $NO_2$ and $O_2$ levels in the product gas. In some embodiments, respiratory gas (i.e. treatment flow) can be directed through a ventilator cartridge that measures the flow of the respiratory gas and merges the respiratory gas with the NO product gas.

The output from the NO generation system in the form of the product gas 32 enriched with the NO produced in the plasma chamber 22 can either be directed to a respiratory or other device for delivery to a patient or can be directed to a plurality of components provided for self-test or calibration of the NO generation system. In some embodiments, the system collects gases to sample in two ways: 1) gases are collected from a patient inspiratory circuit near the patient and pass through a sample line 48, a filter 50, and a water trap 52, or 2) gases are shunted directly from the pneumatic circuit as they exit the plasma chamber 22. In some embodiments, product gases are shunted with a shunt valve 44 to the gas sensors after being scrubbed but before dilution into a patient airstream. In some embodiments, product gases are collected from an inspiratory air stream near the device and/or within the device post-dilution. Within the gas analysis portion of the device, the product gas passes through one or more sensors to measure one or more of temperature, humidity, concentrations, pressure, and flow rate of various gasses therein.

Figure 2:
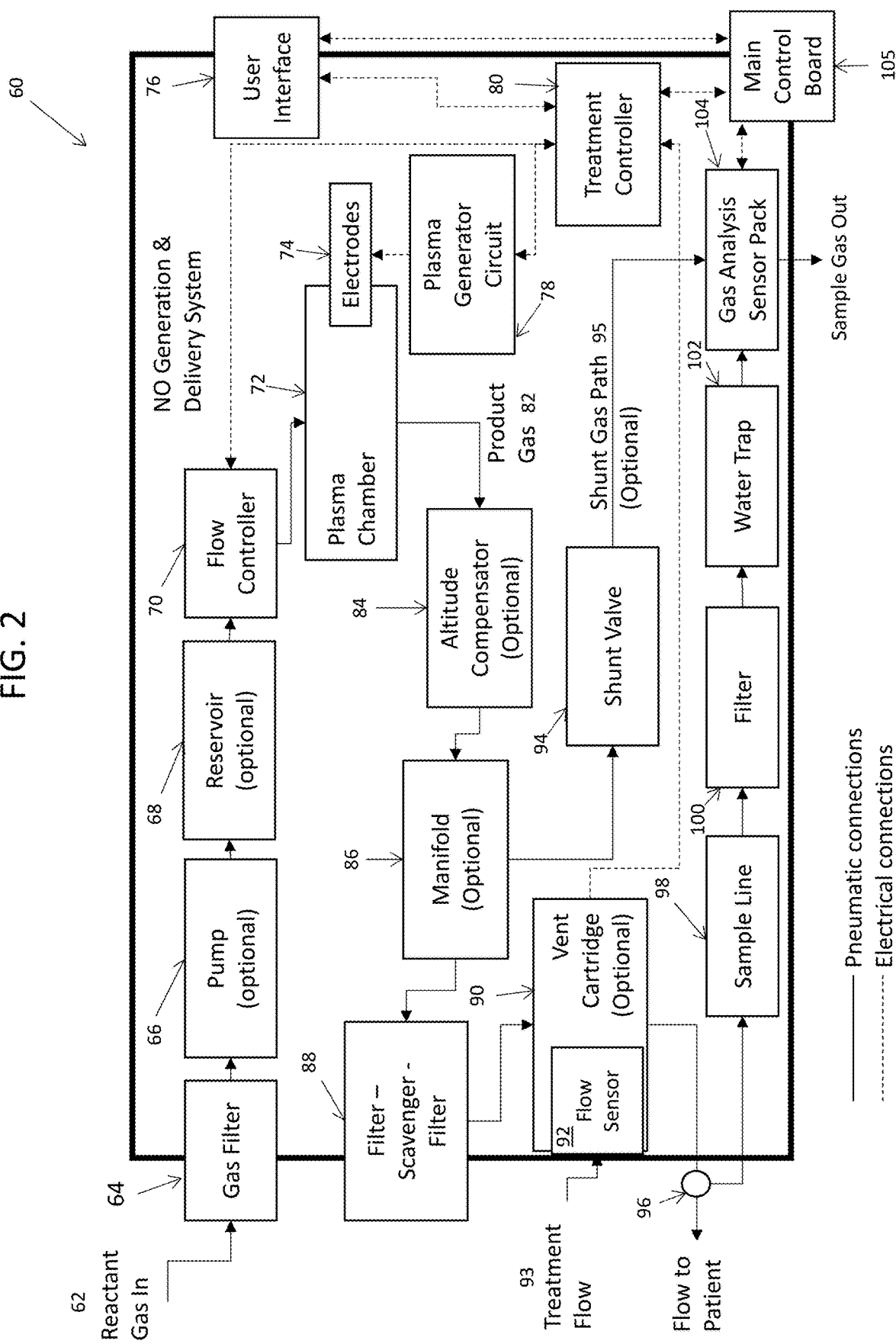
FIG. 2 is another exemplary embodiment of a system for generating a NO-enriched product gas.

FIG. 2 depicts an embodiment of a NO generation and delivery system 60. Reactant gas 62 enters the system through a gas filter 64. A pump 66 is used to propel gas through the system. Whether or not a system includes a pump can depend on the pressure of the reactant gas supply. If reactant gas is pressurized, a pump may not be required. If reactant gas is at atmospheric pressure, a pump or other means to move reactant gas through the system is required. A reservoir 68 after the pump attenuates rapid changes in pressure and/or flow from a pump. Coupled with a flow controller 70, the reservoir, when pressurized, can enable a system to provide flow rates to the plasma chamber 72 that are greater than the pump 66 flow rate. This can enable the use of a smaller, lighter, quieter, and more efficient pump. Electrodes 74 within the plasma chamber 72 are energized by a plasma generation circuit 78 that produces high voltage inputs based on desired treatment conditions received from a treatment controller 80. A user interface 76 receives desired treatment conditions (dose, treatment mode, etc.) from the user and communicates them to the main control board 105. The main control board 105 relays to the treatment controller 80 the target dose and monitors measured NO concentrations from the gas analysis sensor pack 104. The main control board 105 monitors the system for error conditions and generates alarms, as required. Reactant gas 62 is converted into product gas 82 when it passes through the plasma chamber 72 and is partially converted into nitric oxide and nitrogen dioxide. An altitude compensator 84, typically consisting of one or more valves (i.e. proportional, binary, and/or 3-way), is optionally used to provide a back-pressure within the plasma chamber 72 for additional controls in nitric oxide production. Product gases pass through a manifold 86, as needed, to reach a filter-scavenger-filter 88 assembly that removes nitrogen dioxide from the product gas. From the filter-scavenger-filter 88, product gas is introduced to a patient treatment flow directly, or indirectly through a vent cartridge 90. In some embodiments, the vent cartridge 90 includes a flow sensor 92 that measures the treatment flow 93. The treatment flow measurements from the flow sensor 92 serve as an input into the reactant gas flow controller 70 via the treatment controller 80. After product gas 82 is introduced to the treatment flow, it passes through inspiratory tubing. Near the patient, a fitting 96 is used to pull a fraction of inspired gas from the inspiratory flow, through a sample line 98, filter 100, water trap 102 and Nafion tubing to prepare the gas sample and convey it to gas sensors 104. Sample gas exits the gas analysis sensor pack 104 to ambient air. In some embodiments, the system 60 can optionally direct gas through a shunt valve 94 and shunt gas path 95 directly to the gas sensor pack and out of the system. In some embodiments involving the shunt valve 94, the manifold 86 includes a valve (not shown) to block flow to the filter-scavenger-filter when the shunt valve 94 is open.

Figure 3:
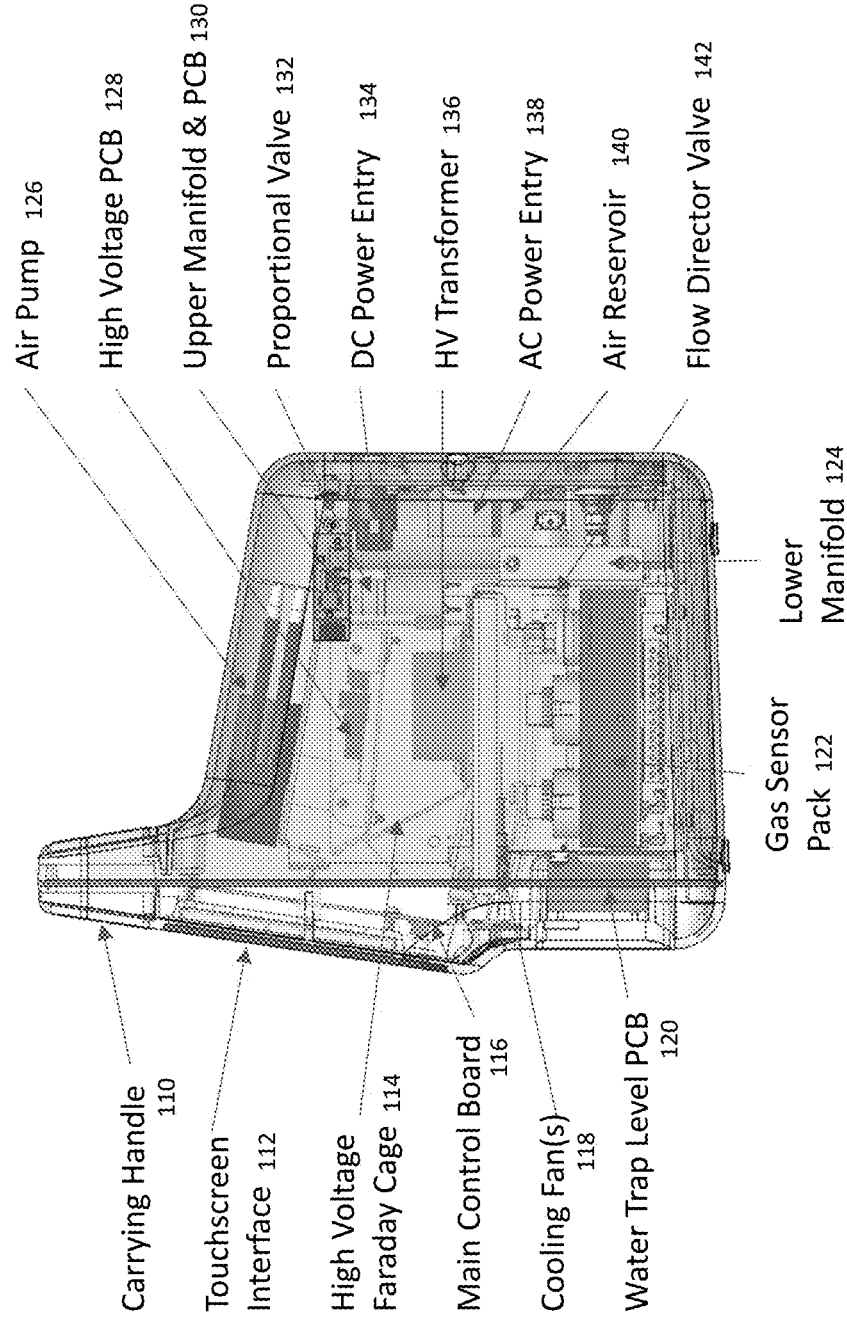
FIG. 3 is an exemplary embodiment of a NO generation system.

Another exemplary embodiment of a NO generation system is shown in FIG. 3, which includes a carrying handle 110, an interface 112, a high voltage cage 114, a control board 116, one or more cooling fans 118, and a water trap PCB 120. The system also includes a gas sensor pack 122, a lower manifold 124, an air pump 126, a high voltage PCB 128, an upper manifold 130, a proportional valve 132, a DC power entry 134, a high voltage (HV) transformer 136, an AC power entry 138, a reservoir 140, and a flow director valve 142.

Figure 4:
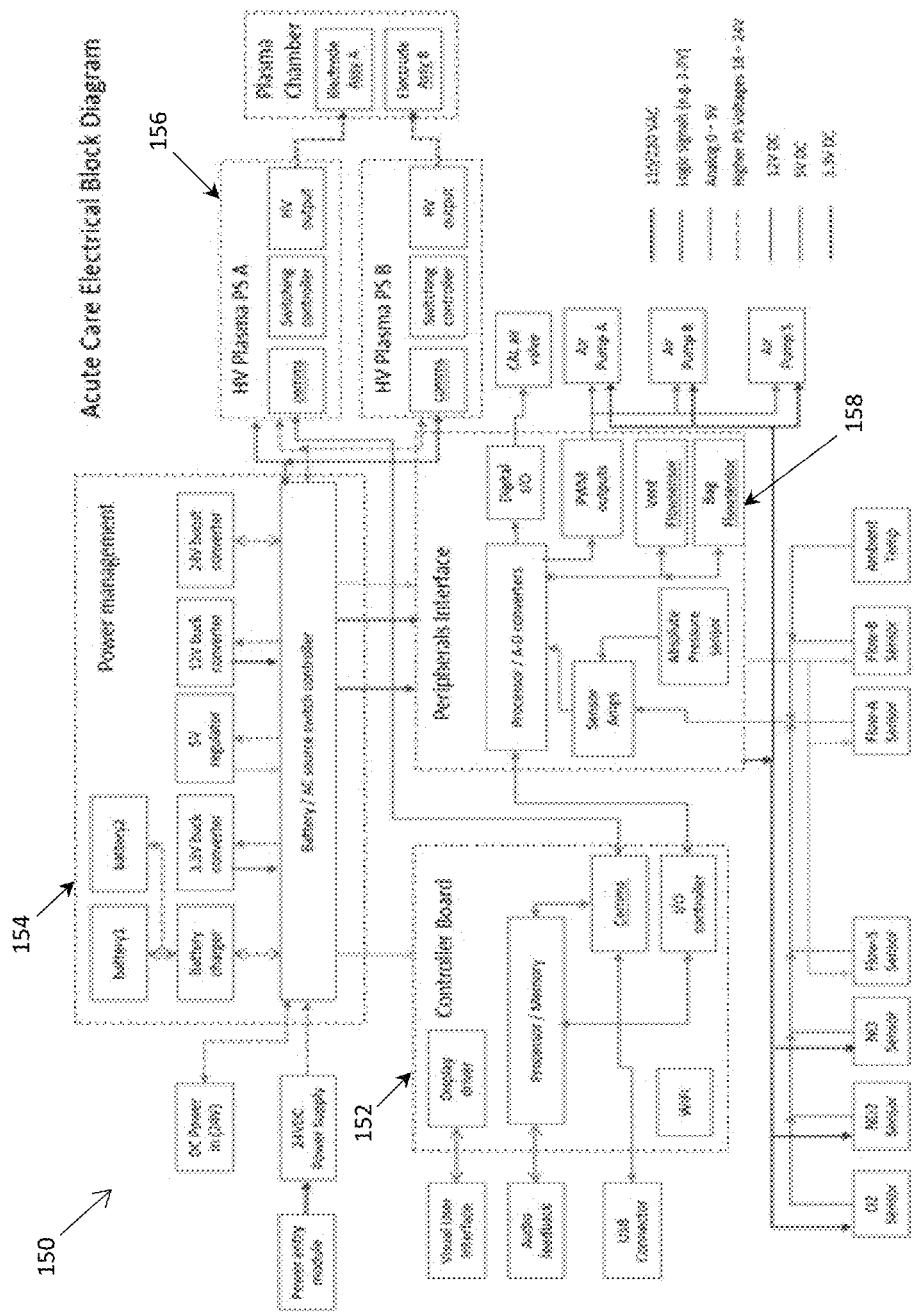
FIG. 4 illustrates an embodiment of a schematic of a controller of a NO generation system.

FIG. 4 depicts a schematic showing all the components of an embodiment of a NO device 150, including a control board 152, a power management circuit 154, one or more electrode assemblies 156, and a peripherals interface 158. A plasma chamber can be part of the reusable controller or easily removed and disposable.

Figure 5:
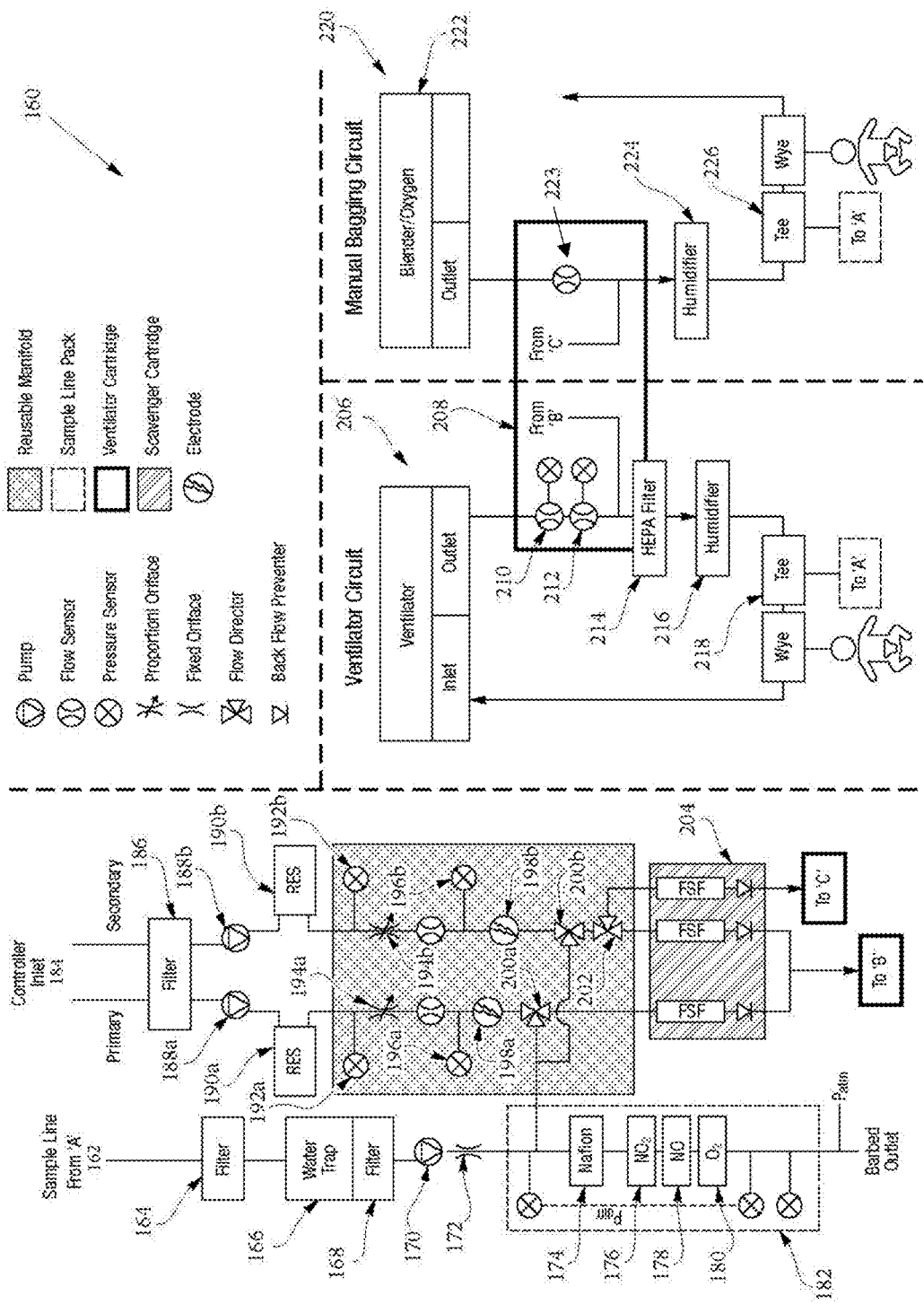
FIG. 5 is an embodiment of a pneumatic circuit.
Figure 6:
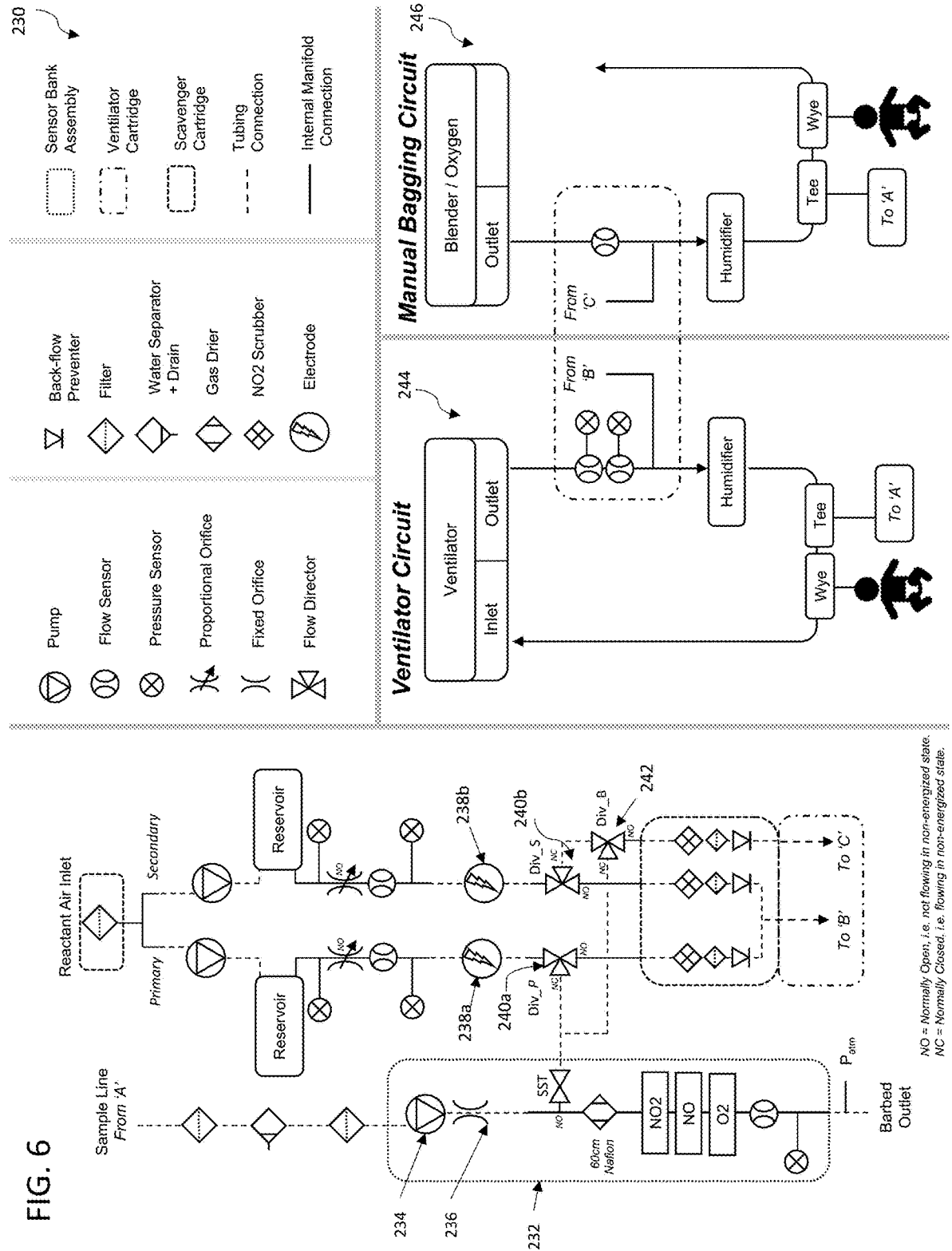
FIG. 6 is another embodiment of a pneumatic circuit.

FIG. 5 and FIG. 6 depict embodiments of NO generation and delivery systems with redundant NO generators. FIG. 5 depicts an exemplary pneumatic design 160 for a NO generation and delivery system. In the upper left of the diagram, sample gases 162 originating in the treatment circuit (lower right of FIG. 5 labeled 'A') enter the system through a hydrophilic filter 164 and travel through a water trap 166. In some embodiments, this filter 164 is disposable so that user can replace it as needed when it clogs. An additional filter 168 after the water trap 166 protects the gas analysis sensors from contaminants. In some embodiments, the additional filter 168 can be hydrophilic to prevent liquid contents from the water trap from entering the gas sensor assembly. Sample gases then flow through a pump 170 and then through a fixed orifice 172 that limits the gas flow rate through the sensors and diminishes pulsatility in the sample gas flow. Some gas sensors, electrochemical sensors for example, are sensitive to the amount of water content within the sample gas and require the gas to have roughly 50% relative humidity. Gas flows through Nafion tubing 174 to add humidity to the sample from the atmosphere in the event that sample gases are very dry as can be the case when calibration gases are used. Conversely, if the gas sample is too humid, Nafion tubing 174 removes humidity from the gas sample, driving the sample gas humidity towards ambient levels. Next, the sample gas flows through one or more gas analysis sensors. Sensor 176 measures $NO_2$, sensor 178 measures NO, sensor 180 measures $O_2$. A differential pressure sensor shown on the left side of the sensor manifold block is used to measure the flow rate through the gas sensor manifold 182. This flow rate can be used to ensure that the sample pump is functioning and that the sample line, disc filter, and water trap are not clogged or kinked. An absolute pressure sensor near the end (bottom) of the sensor manifold is used to measure atmospheric pressure. Gases exit the sensor manifold and flow through a T-fitting, where one leg is connected to atmospheric pressure and the other leg is connected to an external port in the device. The second leg is connected to atmosphere to prevent hospital vacuum from affecting the flow rate through the gas sensor manifold and potentially affecting patient treatment. The external port can be connected to hospital vacuum or just vented to atmosphere.

Moving to the right in FIG. 5, at the top of the diagram there is an inlet 184 to receive reactant gas into the system. In some embodiments, this is a 22 mm medical air connection. Incoming reactant gas flows through a filter 186 to remove particulate then bifurcates into two parallel NO generation paths. Each path consists of a pump 188a, 188b, a reservoir 190a, 190b, a reservoir pressure sensor 192a, 192b, a proportional flow valve 194a, 194b, a fixed orifice, a plasma chamber pressure sensor 196a, 196b, and a plasma chamber 198a, 198b. After the plasma chamber 198a, 198b, each flow path has a flow director 200a, 200b that can direct gases to either the gas sensor manifold 182 or towards the patient inspiratory air. These side paths to the gas sensor manifold 182 enable a system to evaluate the gas produced and/or redirect gases within the plasma chamber away from the patient. After the gas analysis side paths, one of the gas paths utilizes a flow director 202 to select whether product gases will flow to a ventilator circuit (B in the figure) or to a manual bag outlet (C in the figure). Gases then flow through one of three parallel scrubber passages in a disposable cartridge 204. The scrubber passages consist of a filter, scrubber material, a second filter and a one-way valve. The one-way valve ensures that pressures and materials outside of the system do not enter the cartridge and controller.

In the lower right corner of FIG. 5, a treatment setup is depicted. In a ventilator circuit 206, inspiratory gases exit the ventilator and enter a ventilator cartridge 208. The gases flow through two flow sensors 210, 212. In some embodiments, the flow sensors measure pressure, humidity and temperature in addition to flow. NO-containing product gas is merged with the inspiratory flow after the flow sensors. Inspiratory flow continues through a HEPA filter 214, a humidifier 216 and on to a "T" fitting 218, where sample gases are pulled, then on to the patient.

Also shown in the lower right corner of FIG. 5 is a manual bagging circuit 220. Inspiratory gases are sourced from a blender/wall outlet/cylinder 222 and enter the ventilator cartridge 208. Flow is measured within the ventilator cartridge 208 prior to adding NO-containing gas. Gases flow through an optional humidifier 224 and on to a "T" fitting 226 where sample gases are pulled and then on to the patient.

FIG. 6 illustrates a similar system to the embodiment of the system shown in FIG. 5. As explained above, FIG. 5 depicts how the filter-scrubber-filter assemblies can be grouped into a cartridge 204, and FIG. 5 also depicts how gas sensors (176, 178, 180), Nafion tubing 174, a manifold, and pressure/flow sensors can be grouped into a gas sensor assembly 182. In FIG. 6, a gas sensor assembly 232 includes a pump 234 and a flow sensor 236. FIG. 5 depicts how vent flow sensors 210, 212, a bag flow sensor 223, pressure sensors, and NO injectors can be grouped into the vent cartridge 208. A HEPA filter 214 can connect to the vent cartridge 208 to keep the vent cartridge clean. In some embodiments, the HEPA filter utilizes a standard, 22 mm pneumatic connection for ease of replacement and optional use. In some embodiments, the HEPA filter connects to the vent cartridge with a proprietary connection to ensure that the system can not be used without it. FIG. 5 and FIG. 6 further differ in pneumatic design post-plasma chamber. In FIG. 5, in both NO generation channels, a first flow-director (200a, 200b) directs product gases to either the gas sensor pack 182 or the gas scrubber cartridge 204. In the secondary channel, a second flow director directs product gases to either a vent circuit (path B) or a bag circuit (path C). In FIG.

6, the pneumatic pathway differs in that a first flow director selects between vent circuit and the sensors while a second flow director selects between shunting to the sensors and bag circuit. The pneumatic design in FIG. 6 has an advantage over the flow design of FIG. 5 due to having equal flow restriction in both channels between the plasma chamber and the vent flow injector. This relates to minimizing the flow path length and having the flow restriction of the two paths be substantially identical so that they can have similar if not identical calibration settings and NO production.

In some embodiments, a scrubber cartridge can be used for demonstration purposes. The demo device can be identified by RFID, memory device, 2-d bar code, mechanical interface, optical interface, lower flow restriction, or other means by a controller to enable a demonstration mode for training purposes. In some embodiments, the demonstration scrubber cartridge is non-functional for clinical purposes.

Architectures with Multiple Flow Paths

In some embodiments, the system can track ventilation flow and sets the injected product gas flow based on a fixed or variable dilution ratio. At low ventilation flows, the system may not be able to produce low enough NO, so the system produces its minimum production with any excess NO diverted away from the patient. Diverted flow can be released to the environment in an open system or recirculated back through part or all of the NO generator in a closed system. The term "production" is meant to represent the mass flow rate of nitric oxide, which may be expressed in moles per unit time, micro-liters per minute, or ppm-lpm. In some embodiments, excess NO diverted away from the patient is directed through a NOx scrubbing material, such activated charcoal. The amount of excess NO to divert is practically controlled by a diverted flow rate. In some embodiments, a NO generation system calculates NO production based one or more of the following parameters: reactant gas flow rate, electrode gap, plasma power, plasma current, plasma duty cycle, discharge frequency, and measured NO. The system then subtracts the actual NO produced from desired NO production, to determine the amount of excess product gas generated, if any. In the event that excess product gas has been generated, the system can divide the excess NO production by the product gas concentration to determine the flow rate required for the exhaust path. In some embodiments, NO production and exhaust flow calculations can be performed at a high frequency, such as 100 Hz or more.

An NO generation system can provide a combination of continuous and pulsatile NO delivery. For example, a system could dose bias flow and inspiratory flow with different approaches.

Multiple Flow Paths to a Single Destination

Figure 7:
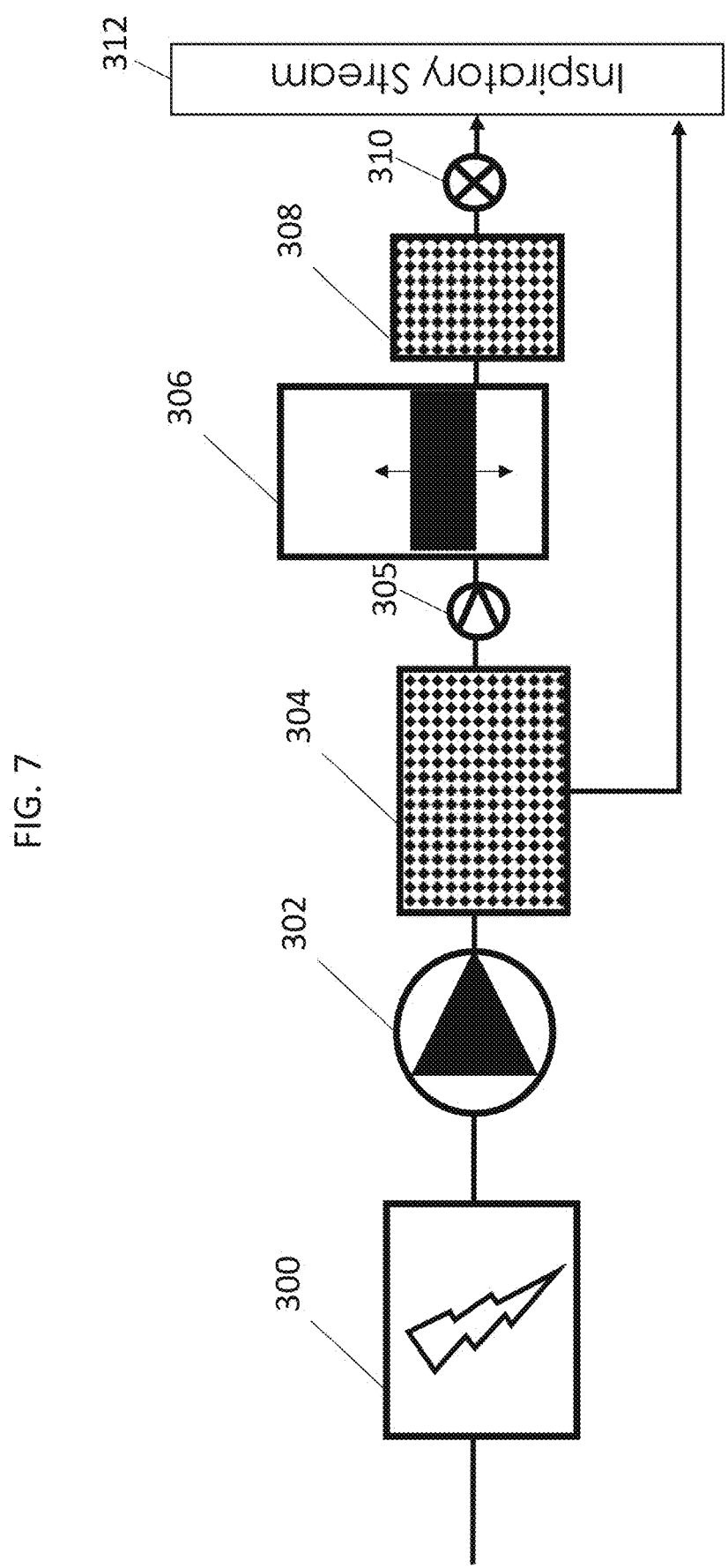
FIG. 7 depicts a NO generation system with a pump and a plasma chamber that can produce a constant amount of NO.

In some embodiments, as shown in FIG. 7, a reactant gas source or pump 302 and a plasma chamber 300 can produce a constant amount of NO, as needed for a specific patient treatment. A bias flow gas is directed to a patient, and the piston is used for an inspiratory bolus. For constant inspiratory flow treatments, product gas passes directly from a first scrubber 304 to a patient inspiratory stream 312. A valve 310 located past the piston pump or chamber 306 prevents product gas from exiting the system through the piston pump 306. For pulsatile treatments, a portion of product gas produced passes directly from the first scrubber 304 to the patient to dose the bias flow. The balance of product gas passes through a check valve 305 and fills a piston chamber 306. The piston displaces to fill the chamber at a rate that ensures accurate flow to the patient during the bias flow. During the inspiratory event, the piston pushes out the product gas through a valve 310. The check valve 305 prior to the piston chamber prevents retrograde flow of product gas back into the first scrubber. In some embodiments, an optional second scrubber 308 can clean product gas as it exits the piston chamber 306. In some embodiments, NO generation can be at constant levels based on minute volume and can be at atmospheric pressure. There can be constant NO production with a low flow restriction after the piston pump. In some embodiments, the simple flow controller can produce boluses of approximately 15 to 50 ml.

Figure 8:
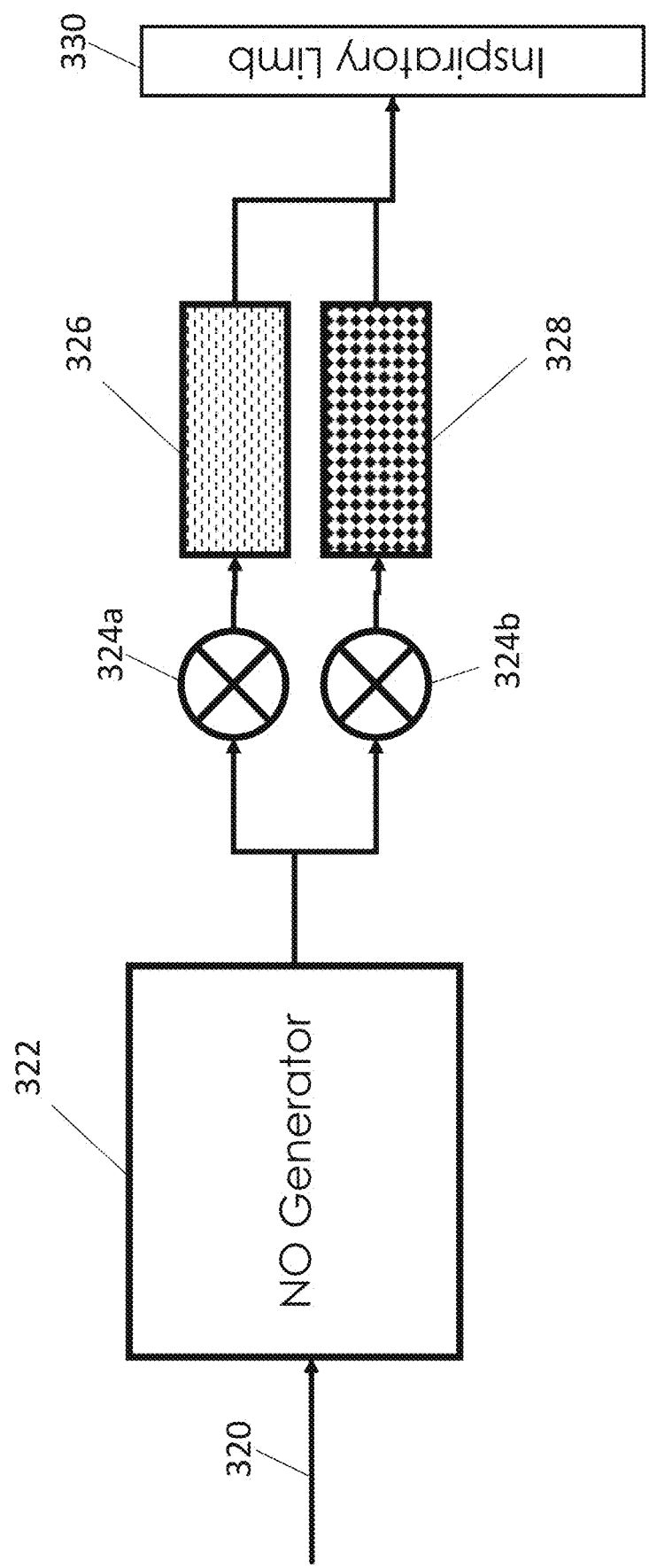
FIG. 8 is an embodiment of a NO generation system where product gas from a NO generator passes through a flow diverter to either a NOx scrubber or a $NO_2$ scrubber before being introduced to a gas stream.

In some embodiments, a low dose of NO can be generated by the system. In some embodiments as shown in FIG. 8, reactant gas 320 can flow through an NO generator 322 to generate product gas, and that product gas flow can be divided by one or more valves operating as a variable flow diverter. One portion of the product gas is scrubbed for $NO_2$ while the balance of product gas is scrubbed for NOx. The product gas flow is merged prior to injection into a patient inspiratory stream. This approach can be advantageous in the generation of low levels of NO because the ratio of NOx-scrubbed to $NO_2$-scrubbed gas provides a lever in addition to plasma control for lowering the inhaled NO concentration. In some embodiments, as shown in FIG. 8, product gas passes through one or more flow diverters 324a, 324b to either a NOx scrubber 326 or a $NO_2$ scrubber 328 before being introduced to a gas stream, such as a medical gas and/or a patient inspiratory stream 330. The NOx scrubber 326 removes both NO and $NO_2$. This design enables low doses of NO to be delivered to the gas stream, based on the concentration of NO exiting the NO generator and the fraction of gas passing through the NOx scrubber versus the $NO_2$ scrubber (i.e., the ratio of NO-scrubbed vs. NO-containing gas). Flow control through the two scrubbers can be done many ways, including but not limited to a proportional diverter valve, manifold with binary valves, manifold with multiple proportional valves, and multiple pumps. In some embodiments, the reactant gas flow is generated by patient inhalation and the product gas flows directly to the patient (not shown).

Figure 9:
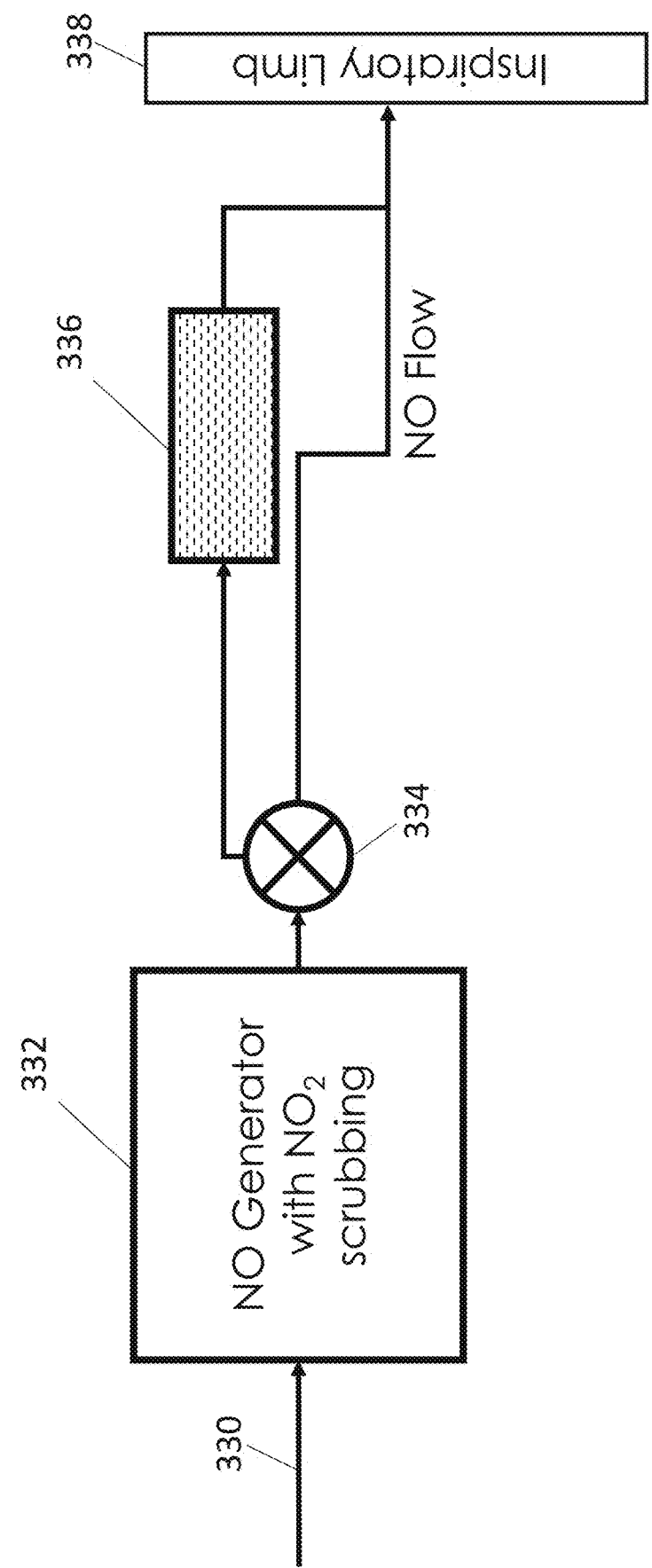
FIG. 9 is an embodiment of a NO generation and delivery system that can pass a portion of product gas through a NOx scrubber.

In some embodiments of a design for low dose NO production, all product gas is first scrubbed for $NO_2$ by an NO generator and scrubber 332 into which a reactant gas 330 flows. Then, a flow divider 334 sends a variable amount of product gas directly to the patient inspiratory stream 338 while the balance of the product gas is scrubbed for NOx by an NOx scrubber 336 and enters the patient inspiratory stream 338. For example, an NO generation and delivery system can pass a portion of product gas through a NOx scrubber, as shown in FIG. 9. This enables a system to continuously produce NO-containing gas while delivering very low doses. In some embodiments, dilution of the patient inspiratory flow remains constant while NO concentration in the product gas varies due to the fraction of product gas that passes through the NOx scrubber. This system can achieve low NO production levels by the ratio of NO-scrubbed vs. NO-containing gas. In some embodiments, this system can cycle at the frequency of patient breaths. In some embodiments, the NOx scrubber could just be an No scrubber because $NO_2$ was scrubbed upstream.

Figure 10:
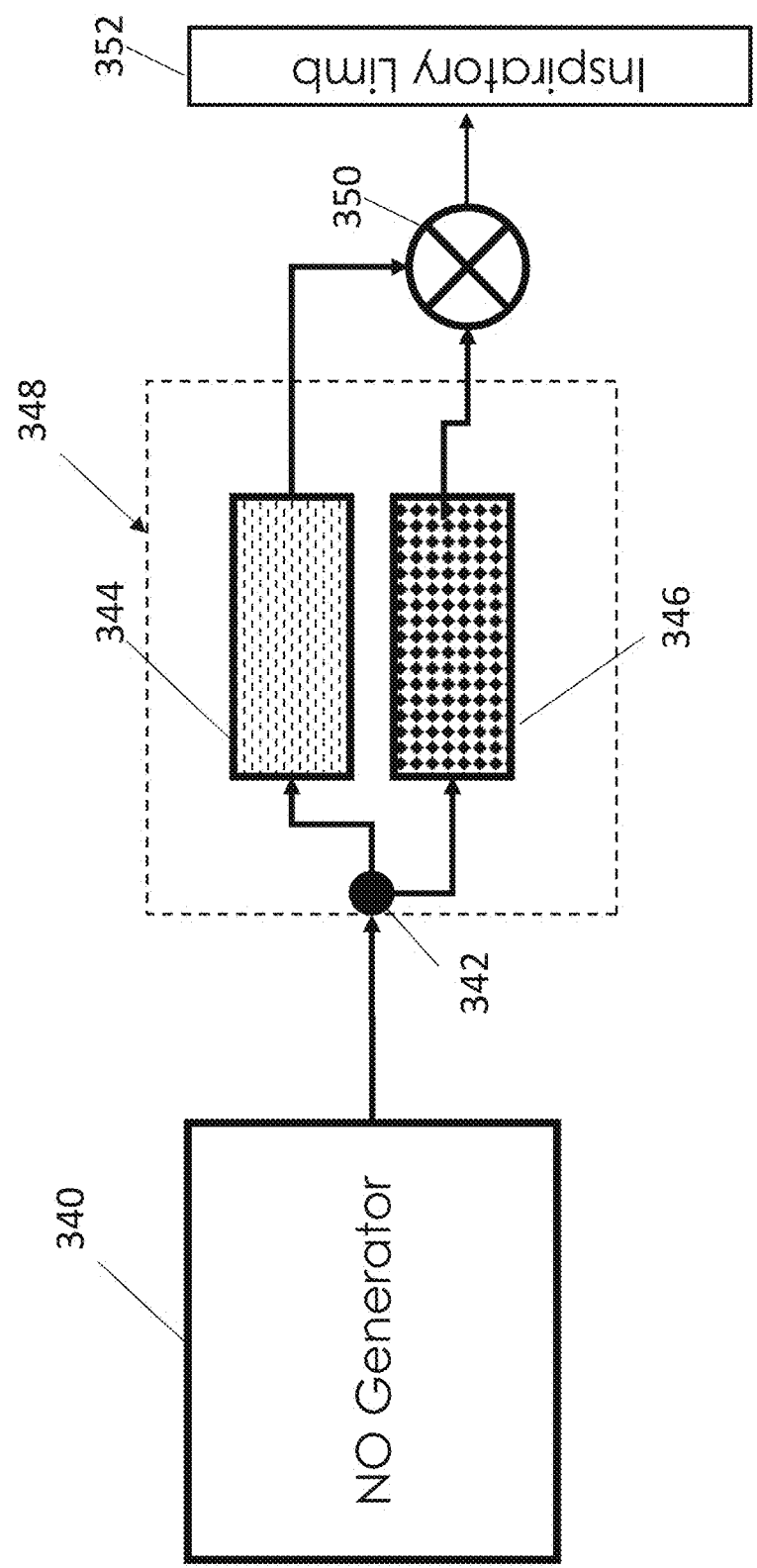
FIG. 10 is an embodiment of a NO generation system with a NOx scrubber that is removable and can be replaced.

In some embodiments of a design for low dose NO production, an $NO_2$/NOx scrubber cartridge can be used. As shown in FIG. 10, product gas from an NO generator 340 diverts at a T-fitting 342 in the product gas path. A portion of the gas can flow through a $NO_2$ scrubber 346 while the balance flows through a NOx scrubber 344. A flow controller 350 blends a mixture of $NO_2$-scrubbed and NOx-scrubbed gases prior to injection into an inspiratory stream 352. The NO₂ and NOx scrubbers can be provided together in a single, removable cartridge 348 or separately. In some embodiments as shown in FIG. 10, the NOx scrubber is combined with a NO scrubber in the form of a user-replaceable cartridge. In some embodiments, a NOx scrubber is removable from the NO generation system and can be replaced. It will be understood that the removable and/or replaceable cartridge can include the NOx scrubber, the NO scrubber, or both. In some embodiments, the system is able to achieve low NO production levels by ratio of NO-scrubbed vs. NO-containing gas and can cycle at the frequency of patient breaths.

Dump Architecture

Figure 11:
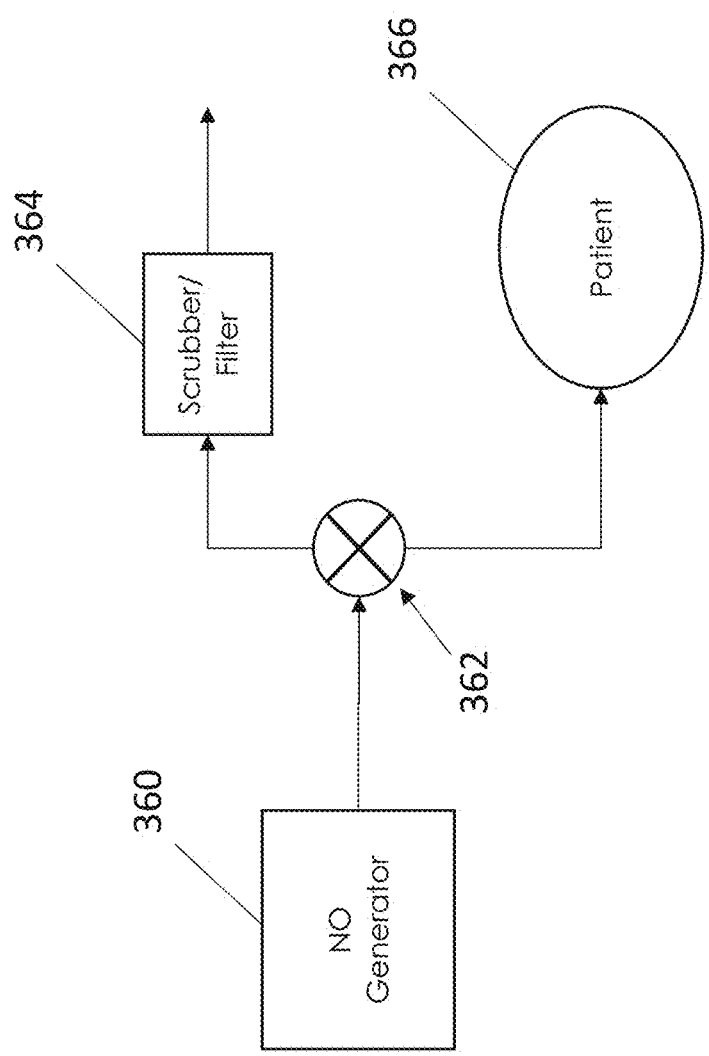
FIG. 11 depicts a NO generation system where excess product gas is directed to a filter/scrubber.

In some embodiments, the system can make more NO than is needed for a particular patient therapy and can direct the excess product gas to a filter and/or scrubber prior to releasing it to the environment or house vacuum. NO that is generated for the patient therapy can be delivered directly to the patient (such as via cannula) or indirectly (injected into the inspiratory limb of a ventilator circuit, for example). As shown in FIG. 11, product gas containing NO from an NO generator 360 can be directed to a scrubber 364 or to a patient 366 using a valve 362. An optional NO₂ scrubber on the patient line can be used, however this may not be necessary if NO₂ levels are sufficiently low in the product gas and the transit time to the patient is short. A dashed line around the NO₂ and NOx scrubbers shows the NO₂ and NOx scrubbers can be packaged in a single cartridge in some embodiments. Direction of the product gas can be controlled by a multitude of pneumatic mechanisms, such as a diverter valve or an array of binary valves. In some embodiments, the filter and/or scrubber is activated charcoal. In some embodiments, excess gas is directed towards house vacuum. In some embodiments, one or more valves are PWM-controlled to vary NO output as needed. In some embodiments, NO that is not directed towards the patient is recirculated through the system.

Figure 12:
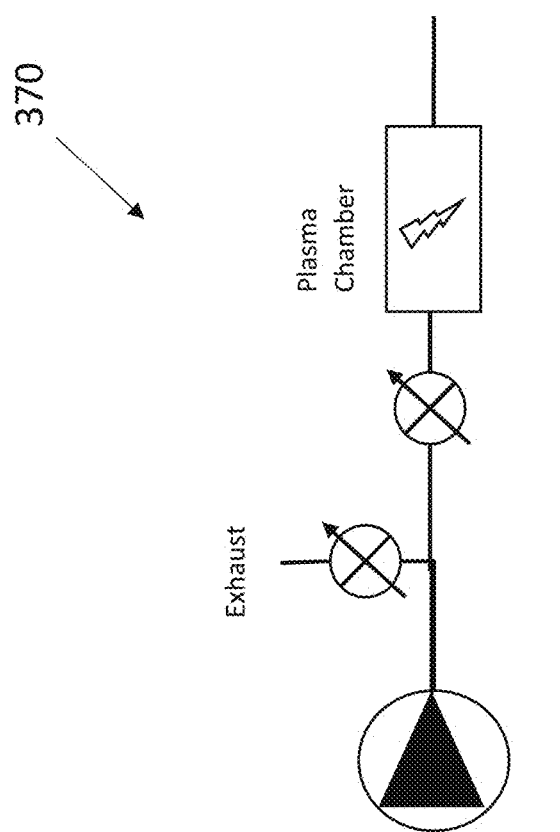
FIG. 12 shows a NO generation system where a pump is combined with a proportional flow dividing valve.

In some embodiments, a system 370 can include a pump combined with a proportional flow dividing valve, such that a desired flow can be directed into the reactant gas flow path and the rest of the flow can be routed to exhaust, as shown in FIG. 12. This enables faster injected product gas flow rate changes (increases and decreases) than possible with pump alone, without utilizing a pressurized reservoir and proportional valve architecture. The pump can also run continuously, which can be more energy efficient and/or more acoustically pleasing than starting and stopping a pump. The proportional flow dividing valve can be a single valve, a pair of proportional valves (shown), an array of binary valves, or a combination of the aforementioned types of valves.

Figure 13:
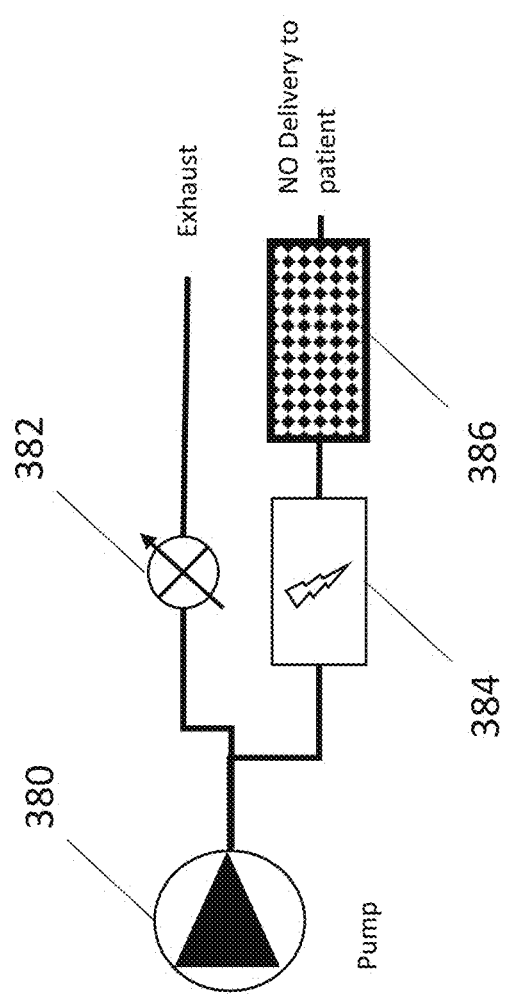
FIG. 13 depicts a NO generation system with a flow controller that performs closed-loop flow control on the exhaust side of a proportionally divided flow.

A flow controller can be used that performs closed-loop flow control on the exhaust side of a proportionally divided flow in order to achieve a desired flow on the side that is routed to the reactant gas circuit, as shown in FIG. 13. It can be understood that in some embodiments a flow controller can be a mass flow controller and can include a flow sensor and a flow control element (for example, a valve). In some embodiments, this facilitates flow control on a path that is unaffected by pressure fluctuations and flow noise generated from the plasma discharge events. In the system depicted in FIG. 13, a pump 380 supplies reactant gas to a system at a constant flow rate. This flow rate can be measured by a flow sensor (not shown), if required to achieve sufficient reactant gas flow accuracy. The constant flow rate of reactant gas divides into a flow towards a patient and a flow towards exhaust. A flow controller 382 on the exhaust leg operates to ensure that the flow through a plasma chamber 384 is proportional to the patient inspiratory flow. Patient inspiratory flow is either measured by the system directly or received from an external device. Flow to the patient passes through the plasma chamber 384 where NO is generated in the reactant gas, producing product gas, and then passes through a scrubber/filter 386 prior to introduction into the patient inspiratory flow stream.

Figures 14A, 14B:
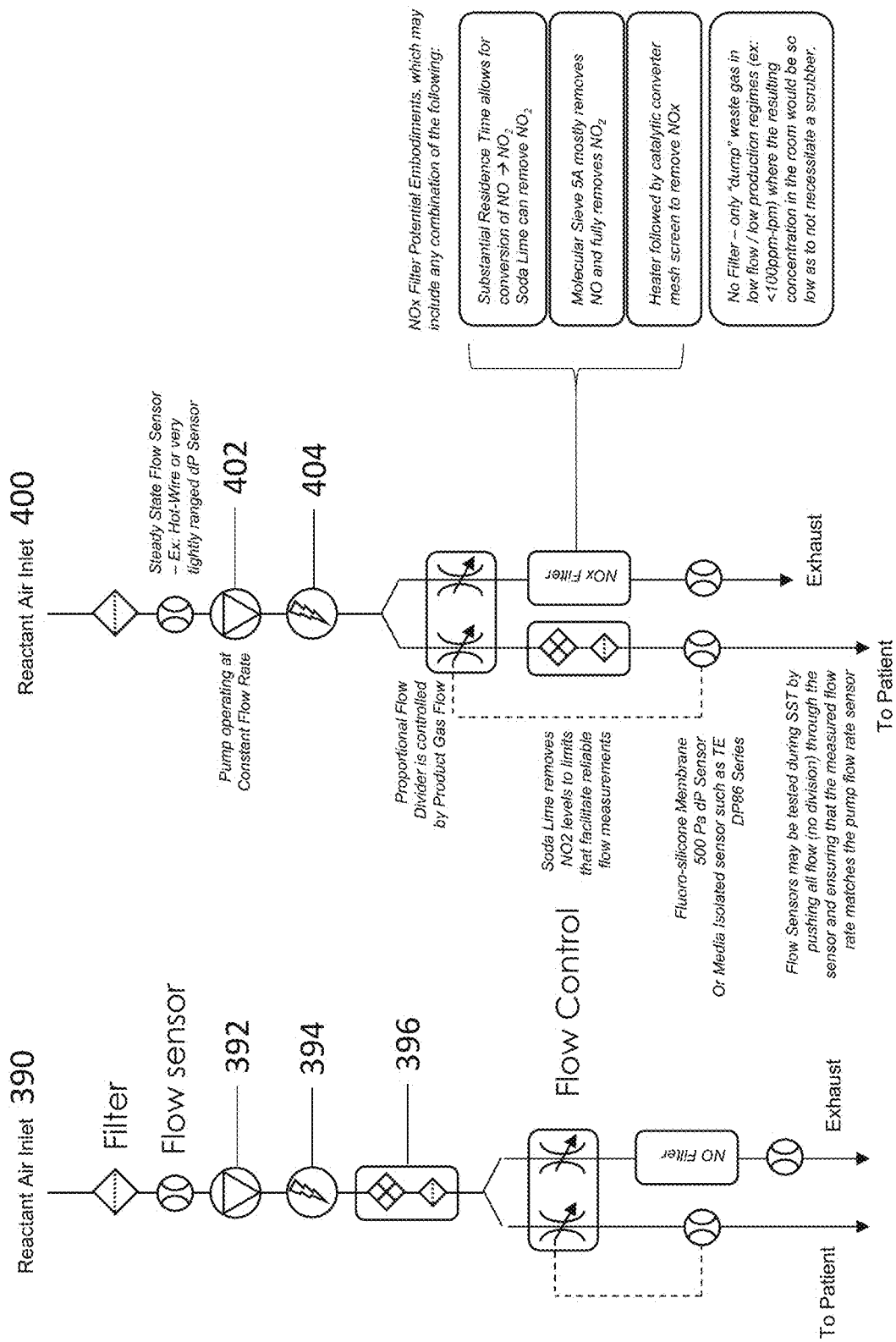
FIG. 14A and FIG. 14B are embodiments of a NO generation system that generates either a constant production or no production.

In some embodiments, an NO generation system can generate either a constant production or no production, as shown in FIG. 14A and FIG. 14B. The NO generation systems shown in FIG. 14A and FIG. 14B source a reactant gas from a reactant gas inlet 390, 400 and push it through a plasma chamber 394, 404 via a pump 392, 402. Inside the plasma chambers, the flow, NO concentration, and NO production can be constant. In FIG. 14A, product gas can be scrubbed by a scrubber/filter 396 for NO₂ prior to a manifold that sends product gas to either the patient or to an NOx or NO scrubber (FIG. 14A includes an NO filter). A flow sensor after the patient-side flow controller is used for closed loop control of the flow to the patient. The NO generator controller selects the proportion of product gas that goes to the patient vs. exhaust based on factors including one or more of the following: the target NO production required by the treatment, the dilution ratio, and the concentration of the product gas. In some embodiments, this system operates at a constant reactant gas flow rate and plasma activity level, typically the maximum production level required for a specific patient treatment and dose. For example, the plasma chamber 394 can include electrodes that operate at constant production to achieve constant NO concentration. Flow sensors on the exhaust side can be used for safety alarms to ensure flow is within the expected range and closed loop control of the exhaust valve (not shown).

FIG. 14B depicts an embodiment where product gas flow is split between patient and exhaust prior to any scrubbing. The patient flow is scrubbed for NO₂ while the exhaust flow is scrubbed for NO and NO₂ (NOx). In some embodiments, the pump operates at a constant flow rate, simplifying the control of plasma production by eliminating NO production variance from flow rate itself, cooling effects from flow rate, and back pressure from flow rate. In some embodiments, the plasma settings and flow rate are constant for a given patient treatment, producing a constant concentration of product gas. The flow divider operates to direct flow to the patient proportional to the inspiratory flow rate of the patient. The proportion of product gas to inspiratory gas can vary from 1% of the inspiratory gas to 100% of the inspiratory gas, where all of the inspiratory gas is flowing through the system. In some embodiments, the system measures the inspiratory flow rate with a sensor (not shown). In some embodiments, the system receives the inspiratory flow rate from a separate device, such as a ventilator or CPAP system.

Figure 15:
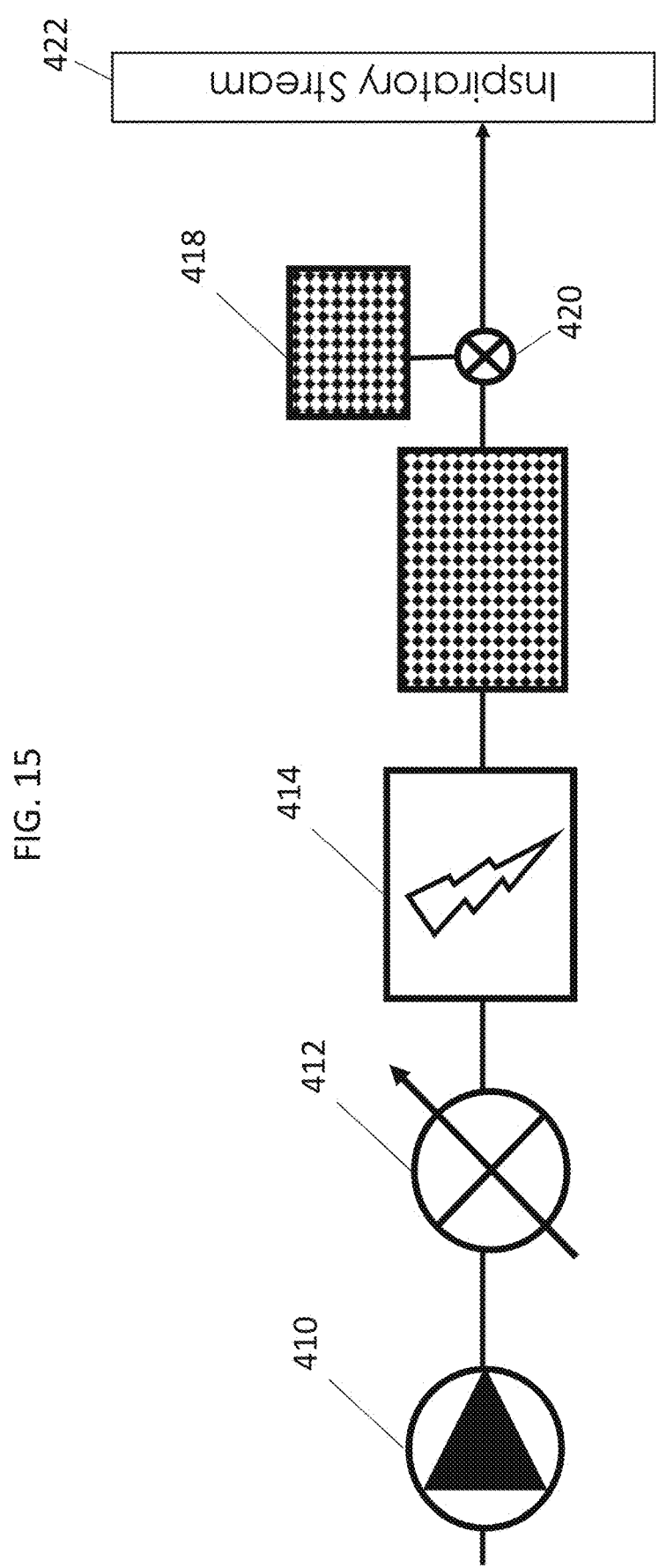
FIG. 15 depicts a NO generation system that directs product gas to a diverter valve.

In some embodiments, constant concentration, NO₂ scrubbed NO is available to a fast flow controller (<100 msec response time). In some embodiments, the fast flow controller is a flow diverter comprising one or more digital valves, proportional valves, or three-way valves. The flow diverter directs the required amount of NO to the patient inspiratory circuit with the balance of NO being routed to a NOx scrubber that eliminates NO and NO₂. This approach has a benefit of operating the NO generator at a constant production rate. In some embodiments, the NO generator operates at a factory-set, maximum production level. In some embodiments, the NO generator operates at a NO production level at or slightly above the required NO production level for a specific patient treatment. In some embodiments, a NO generation system, shown in FIG. 15, directs product gas, generated from a reactant gas from a reactant gas source which is directed through a flow controller 412 into a plasma chamber 414, to a diverter valve 420. The diverter valve 420 can be configured to direct an appropriate amount to the patient for an accurate dose. In some embodiments, the NO generation system operates at a constant production level (flow rate and plasma activity) and the diverter valve directs an appropriate fraction of the product gas to the patient, with the remainder of the flow directed to a released into the environment. Operating where the pump and plasma chamber at a constant rate can improve dose precision by eliminating and/or reducing the effects of pressure fluctuations in the reactant gas, inaccuracies in the reactant gas flow rate, calibration error in the NO generator and other contributing factors. In some embodiments, product gas is scrubbed of NO and $NO_2$ prior to being introduced to the environment by an NOx scrubber 418. This approach can reduce lag in NO delivery to an inspiratory circuit and provide additional control for generating low doses. In some embodiments, the diverter valve is only used for delivering low doses to an inspiratory flow. A NO system can modulate reactant gas flow and plasma activity over a wide range of NO production levels, however some systems are unable to reduce flow and plasma activity sufficiently to deliver extremely low NO production (NO concentration and/or flow rate). For low NO-production scenarios, a system can divert excess NO away from the patient so the target low dose is accurately delivered. Diversion of patient flow can be done in an analog means with continuous adjustments to the fraction of product gas sent to the inspiratory flow vs. the environment or digitally, where a binary valve toggles between the two flow paths in a PWM fashion. It should also be obvious to those skilled in the art that a single diverter valve can be replaced with other means to achieve accurate flow control to two destinations, such as a manifold with multiple binary valves and/or solenoid valves. In some embodiments, sample gas is routed to a source of vacuum, rather than to a NOx scrubber.

Recirculation Flow

Figure 16:
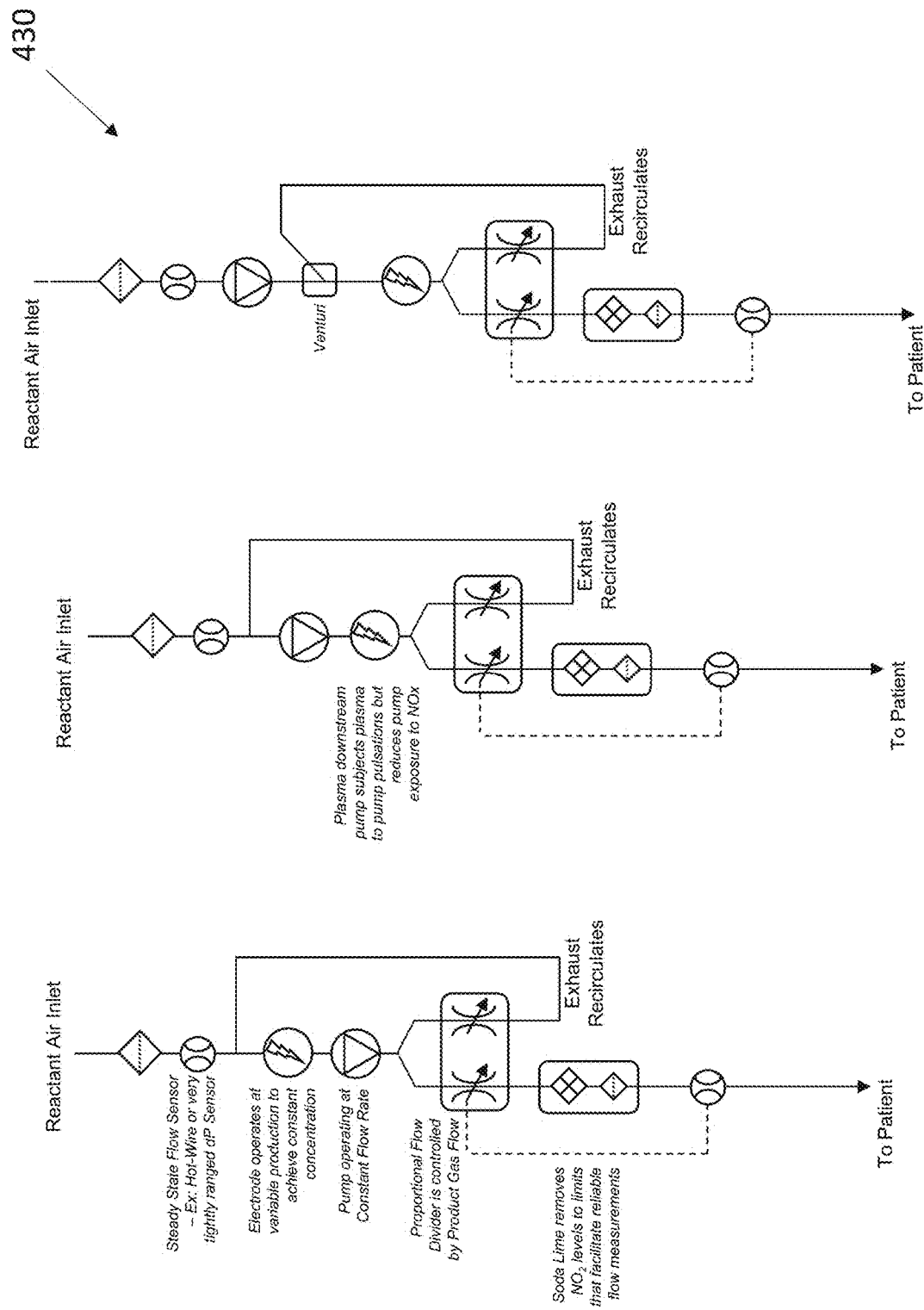
FIG. 16 is an embodiment of a system that utilizes recirculation and includes two proportional valves.

In some embodiments, a system 430 that utilizes recirculation can include two proportional valves, as shown in FIG. 16. The stream to the patient and a return stream can each have a proportional valve. In some embodiments, reactant gas mass flow through the plasma chamber is constant. The system pulls make-up air from ambient when the return flow is not 100% of the target reactant gas flow. Gas can be scrubbed with each cycle so that $NO_2$ does not build up. In some embodiments, the system calculates the NO loss due to aging within the recirculation loop and generates additional NO to make-up for losses. By operating at a constant reactant gas flow rate, a NO generation system can improve dose accuracy by eliminating flow inaccuracies and NO production variations due to dynamic flows. In such an embodiment, the NO generator is always attempting to create a constant-concentration gas stream within the recirculation loop, carrying equal to or greater than the maximum NO. The flow and concentration of NO in the plasma chamber can be constant, while production demanded by the patient (for example, the concentration multiplied by the peak inspiratory flow) can be variable. If a patient needs more or less NO (for example, during a spontaneous breath), less or more flow is diverted from the concentrated gas stream, respectively. The system then replenishes moles of NO in the plasma flow by generating the same moles of NO which is being delivered to the patient. This results in a constant concentration of NO within the device. When a clinician changes the desired therapy (in PPM), then the NO generator changes the target concentration in the recirculating gas stream.

This embodiment can be thought of as a NO reservoir where the reservoir gas concentration is set by the controller. In some embodiments, the gas concentration may be set between 10 and 5000 ppm. In some embodiments, the concentration is selected based on one or more of the following: the clinicians desired PPM setpoint, the peak therapy flow rate, upper limits of system flow rates and scrubbers, minimizing NO loss within the system, and other constraints within the system. In some embodiments, the path from diverter valve to plasma chamber is as short as possible to minimize degradation of NO to $NO_2$ within the recirculation loop. A NO generation system can estimate the amount of NO lost within the recirculation loop based on one or more of the following properties of the recirculating product gas: NO concentration, temperature, time, pressure and oxygen level, thereby improving the accuracy of the calculated target amount of NO generate.

In some embodiments, the system produces NO at or above the highest production level required by a particular patient treatment. In some embodiments, a venturi is used to pull recirculation gas into the flow to avoid exposing the pump to $NO_2$-laden gas. In some embodiments, the bypass leg is dumped to ambient air. Exhausted gas can be treated with a NOx-scrubbing material which can include but is not limited to activated charcoal filter, soda lime, potassium permanganate, heated molybdenum, catalytic converter of various precious and noble metals and their alloys, or other oxidizing agents.

In some embodiments, the flow restriction of a recirculation loop is matched to the flow restriction of the NO injection path to improve the consistency of flow through the recirculation loop as the system sends variable flows to patient. If the flow restrictions are not matched, the backpressure of elements downstream of the flow divider may result in variable reactant gas flow as flow is alternately directed to the injector and recirculation paths. In some embodiments, a fixed restriction is added to the recirculation loop to match the elements in the injection path. In some embodiments, the flow restriction of the recirculation loop is added to the control of the proportional valve or valves.

In some embodiments, a controller selects an NO concentration and flow within the recirculation loop based on peak NO injection required by a patient therapy. In some embodiments, an NO generator selects the lowest possible recirculation flow rate (resulting in higher NO concentration) to minimize acoustic noise from the pump. In some embodiments, an NO generator selects the highest possible concentration to minimize dilution of the patient oxygen. In some embodiments, an NO generator's highest possible concentration is determined as a function of the turn-down accuracy of the injection flow controller. In some embodiments, an NO generator's lowest possible concentration is determined by the accuracy and resolution of an NO sensor used to measure the product gas concentration.

Figure 17:
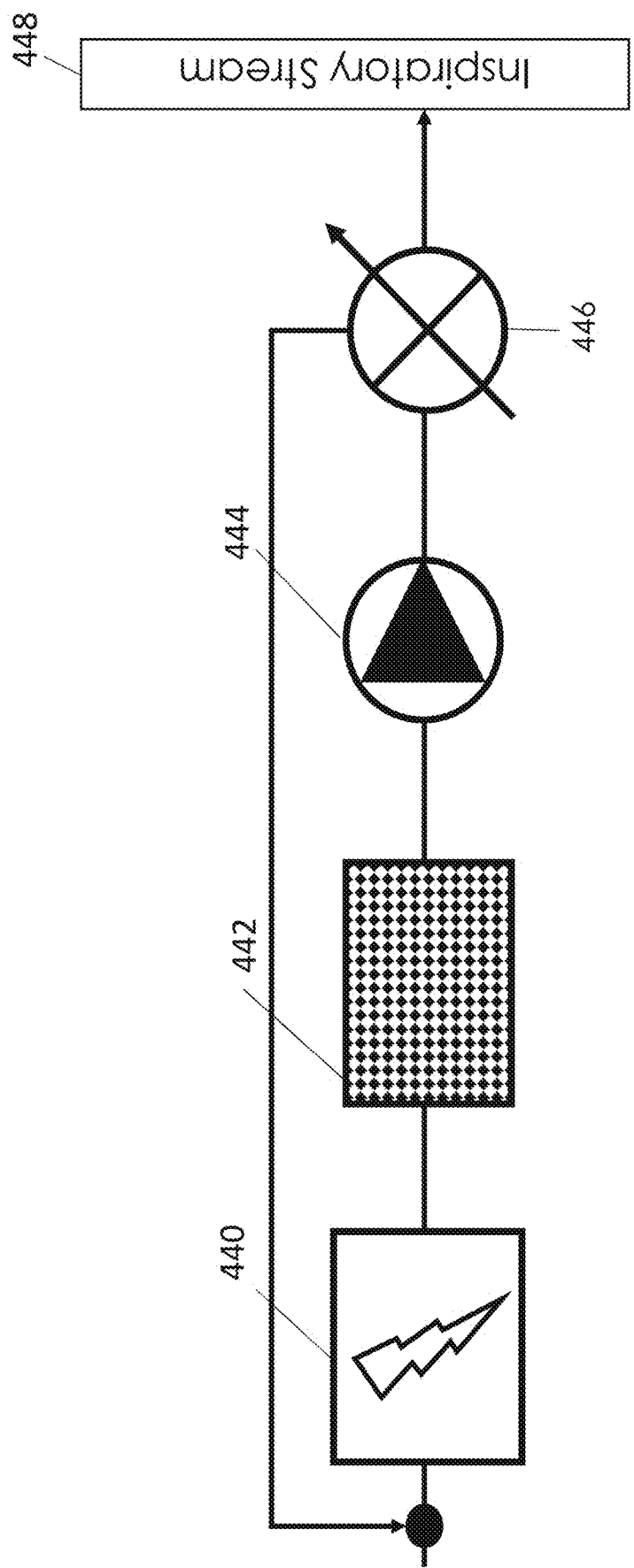
FIG. 17 depicts a NO generation system with a recirculation loop comprising a plasma chamber, scrubber, pump, and a proportional diverter in series with a recirculation path back to before the plasma chamber.

In some embodiments, a recirculation loop, shown in FIG. 17, comprises a plasma chamber 440 with one or more electrodes, a scrubber/filter 442, a pump (reactant gas source) 444, and a proportional flow diverter (or flow controller) 446 in series with a recirculation path back to before the plasma chamber 440. In some embodiments, flow control is at the injector, as shown in FIG. 17, and the system can have pressurized NO on tap for the flow controller. In some embodiments, the plasma is protected from pulsatility in pressure and flow from the pump by a scrubber and filter.

In some embodiments, the flow sensor is protected from pulsatility in pressure and flow by a filter and scrubber (FIG. 17). Furthermore, the pump is protected from $NO_2$ from the product gas because it is located after the scrubber/filter. In some embodiments, the scrubber/filter is tuned so that it can serve as an accumulator to provide product gas volume for dosing rapid increases in inspiratory flow 448. In some embodiments, the recirculation flow rate produced by the pump is set to at or above the maximum injected NO flow rate for a given patient treatment. In some embodiments, plasma activity is controlled to maintain a constant NO concentration within the circulating gas. There can also be a constant flow through the plasma chamber. In some embodiments, the flow through the recirculation loop can be equal to a maximum treatment amount so that the flow through the scrubber is a target amount which prevents lag.

During constant inspiratory flow treatments to a patient (e.g. face mask), the diverter valve (or equivalent flow divider) can be set to 100% flow to the patient. The system selects reactant gas flow rate and plasma activity level based on the NO production needed by the patient.

Figure 18:
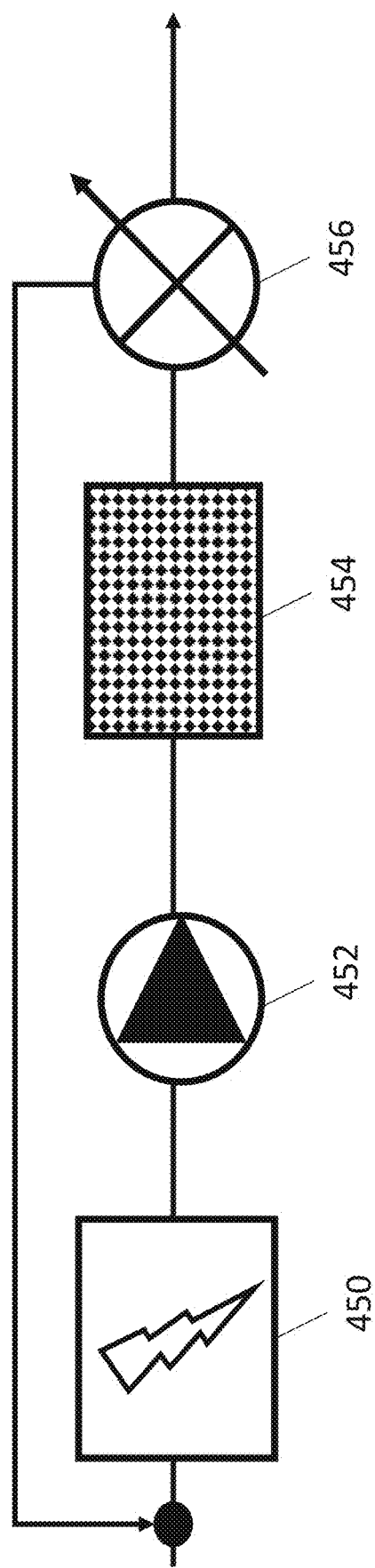
FIG. 18 depicts an embodiment of a NO generation device with recirculation.

In some embodiments, excess NO from the flow diverter is routed back to prior to the plasma chamber. In this approach, generated NO is not immediately destroyed and nearly all NO that is generated is sent to the patient. Furthermore, this embodiment can operate with a constant flow rate through the plasma chamber, simplifying the inputs to the NO generation algorithm. Operating at a constant flow rate also improves the accuracy of reactant gas flow measurements and minimizes dead volume between the plasma chamber and flow diverter, thereby reducing NO loss in the system. FIG. 18 depicts an embodiment of a NO generation device with recirculation that uses a flow diverter (or flow controller, such as a proportional diverter valve) 456 to route gas flow back to a plasma chamber 450 which produces the product gas that flows through a pump 452 and a scrubber 454. In some embodiments, gas that is recirculated re-enters the system prior to the plasma chamber. In some embodiments, the amount of NO in the recirculation loop can be tracked computationally or via a gas concentration sensor with plasma activity modulated to maintain a constant concentration of NO in the system. In some embodiments, the flow rate through the plasma chamber is constant to improve the precision of NO generation. In some embodiments, the flow through the recirculation loop can be equal to a maximum treatment amount so that the flow through the scrubber is a target amount which prevents lag.

Figure 19:
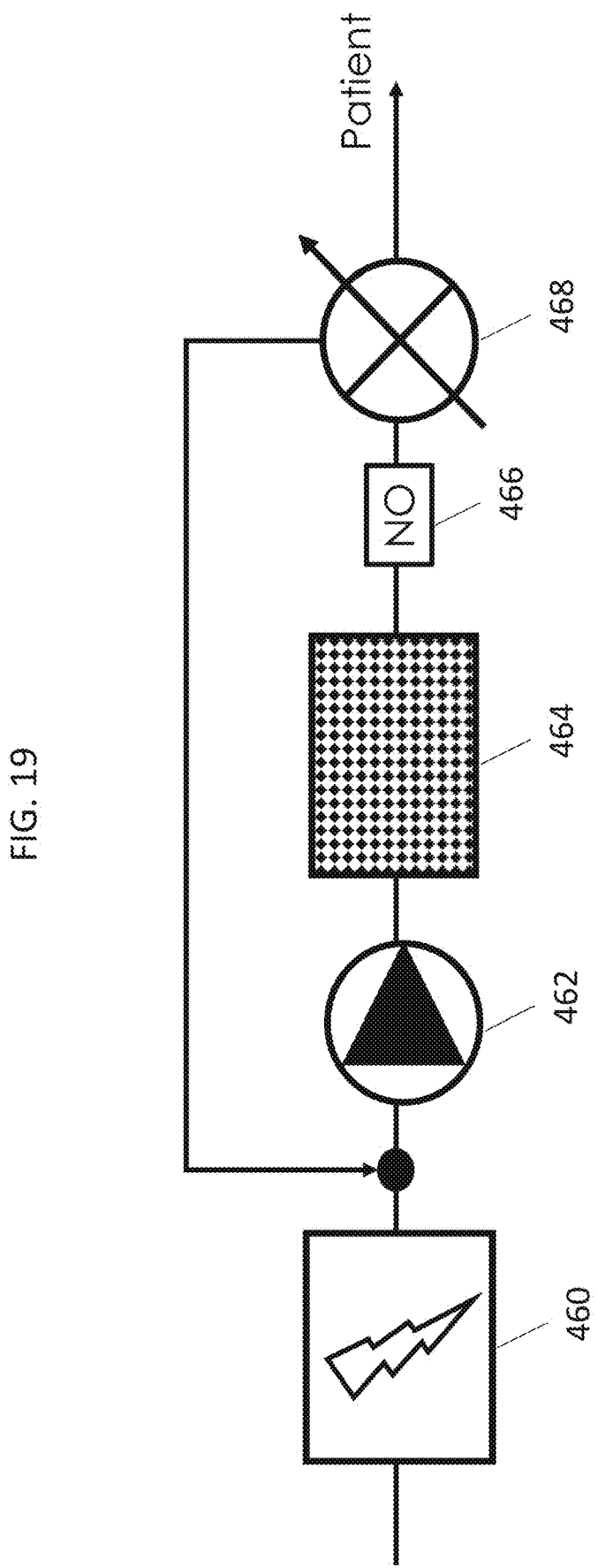
FIG. 19 depicts an embodiment of a NO generation system with a recirculation loop.

In some embodiments, excess NO is routed back to a location after the plasma chamber but before the pump. In this embodiment, the pump operates at a continuous flow rate which simplifies controls and lowers acoustic noise levels. FIG. 19 depicts an embodiment of a NO generation system with a recirculation loop. Ambient air is pulled into a plasma chamber 460 by a pump 462. Product gas passes through a scrubber 464 to an optional NO sensor 466 and on to a proportional diverter valve (flow controller) 468. When used, the NO sensor can provide NO concentration information to a controller that adjusts flow to the patient accordingly to maintain the desired dose level. In some embodiments, an NO sensor with sufficient response time is used for closed-loop control of NO production. Slower NO sensors with t90 times of up to 60 seconds can be used to quantify NO loss within the system to inform a feed-forward term in the NO production algorithm. In some embodiments, the flow through the recirculation loop can be equal to a maximum treatment amount so that the flow through the scrubber is a target amount which prevents lag. In some embodiments, this configuration can have a smaller recirculation volume.

The proportional diverter valve releases from the system the desired amount of NO to the patient with the balance of product gas looping back to before the pump. This approach allows the pump to operate at a constant speed and the flow controller has pressurized NO ready for patient delivery. The flow controller can also be comprised of an array of proportional valves and/or binary valves and/or pumps connected to a manifold. Plasma activity is at ambient pressure and NO is only made to make up for NO delivered to the patient and/or NO lost within the system. In some embodiments, the pump speed is set to deliver the maximum flow rate required for a given patient treatment. In some embodiments, the pump flow rate is set to its maximum for all patient treatments. This approach can help eliminate NO oxidation by minimizing residence times through the system.

Figure 20:
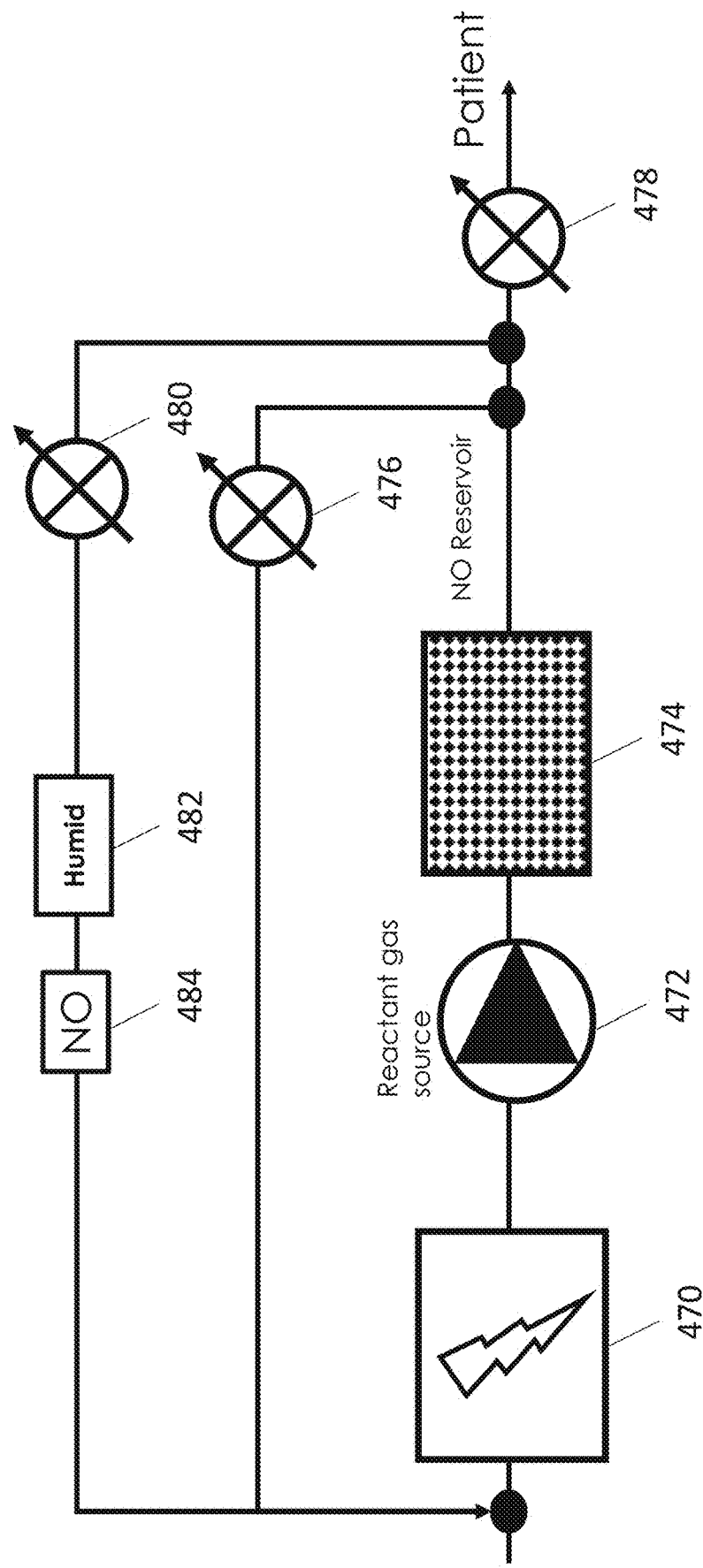
FIG. 20 is an exemplary embodiment of a recirculation architecture.
Figure 21:
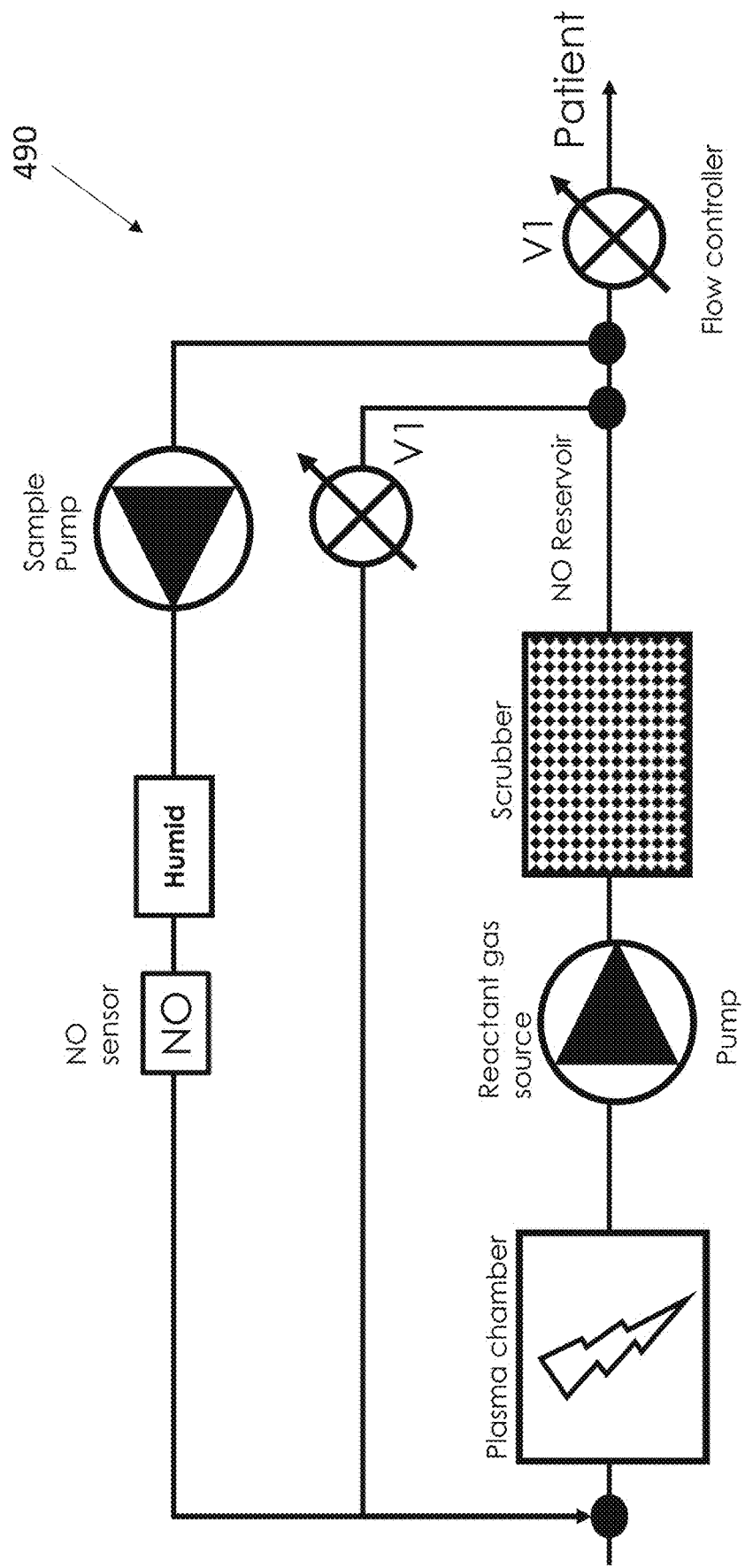
FIG. 21 is an exemplary embodiment of a recirculation architecture.

In some embodiments, there is an independent product gas flow path for the NO sensor to provide one or more of humidity control for the sensor, flow control, and/or pressure control. This approach can add dead volume to the recirculating loop but may be necessary depending on the input requirements of the NO sensor. By controlling the environment of the NO sensor, the sensor output can be more accurate. FIG. 20 depicts an architecture including a plasma chamber 470, a pump 472, and a scrubber 474. A valve 476 and a valve 478 operate as a flow divider to deliver a known quantity of product gas to the patient. In some embodiments, the concentration of the product gas is constant within the system to simplify the control scheme. A valve 480 regulates the flow of product gas to the NO sensor 484. A humidity control element protects the NO sensor from dry product gas which can dry-out some types of sensors, such as electrochemical sensors. In some embodiments, the humidity control element 482 is bypassed when the product gas has sufficient humidity. FIG. 21 depicts a similar system 490 where the flow rate across the NO sensor is controlled by a pump to provide flow control.

Figure 22:
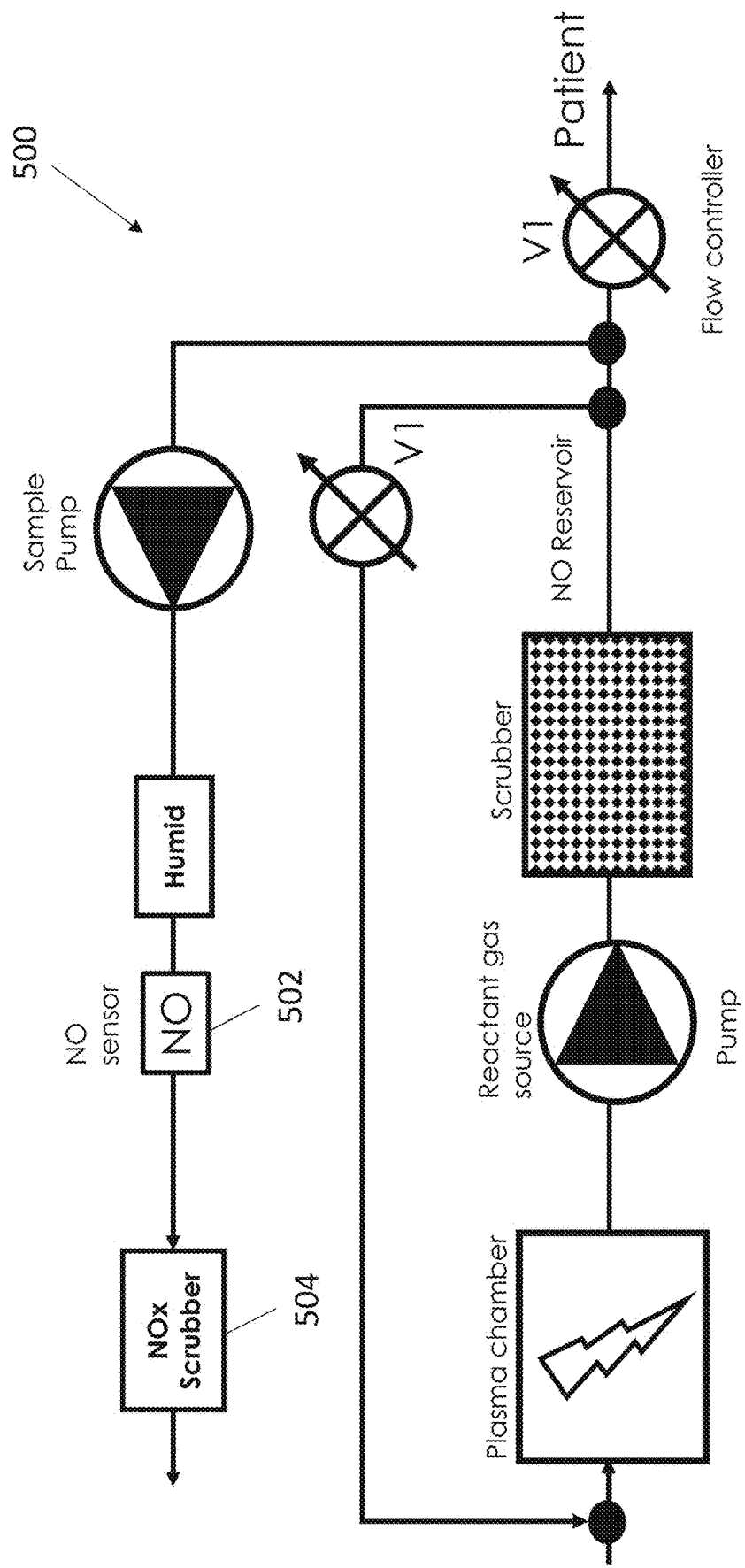
FIG. 22 is an exemplary embodiment of a recirculation architecture.

FIG. 22 depicts a similar system 500 where the flow through the product gas sensor does not return to the recirculation loop. This approach allows for improved pressure and flow control to the NO sensor 502. In some embodiments, a NOx scrubber 504 at the outlet of the sample gas flow path removes NO and $NO_2$ prior to release into the surrounding environment.

Figure 23:
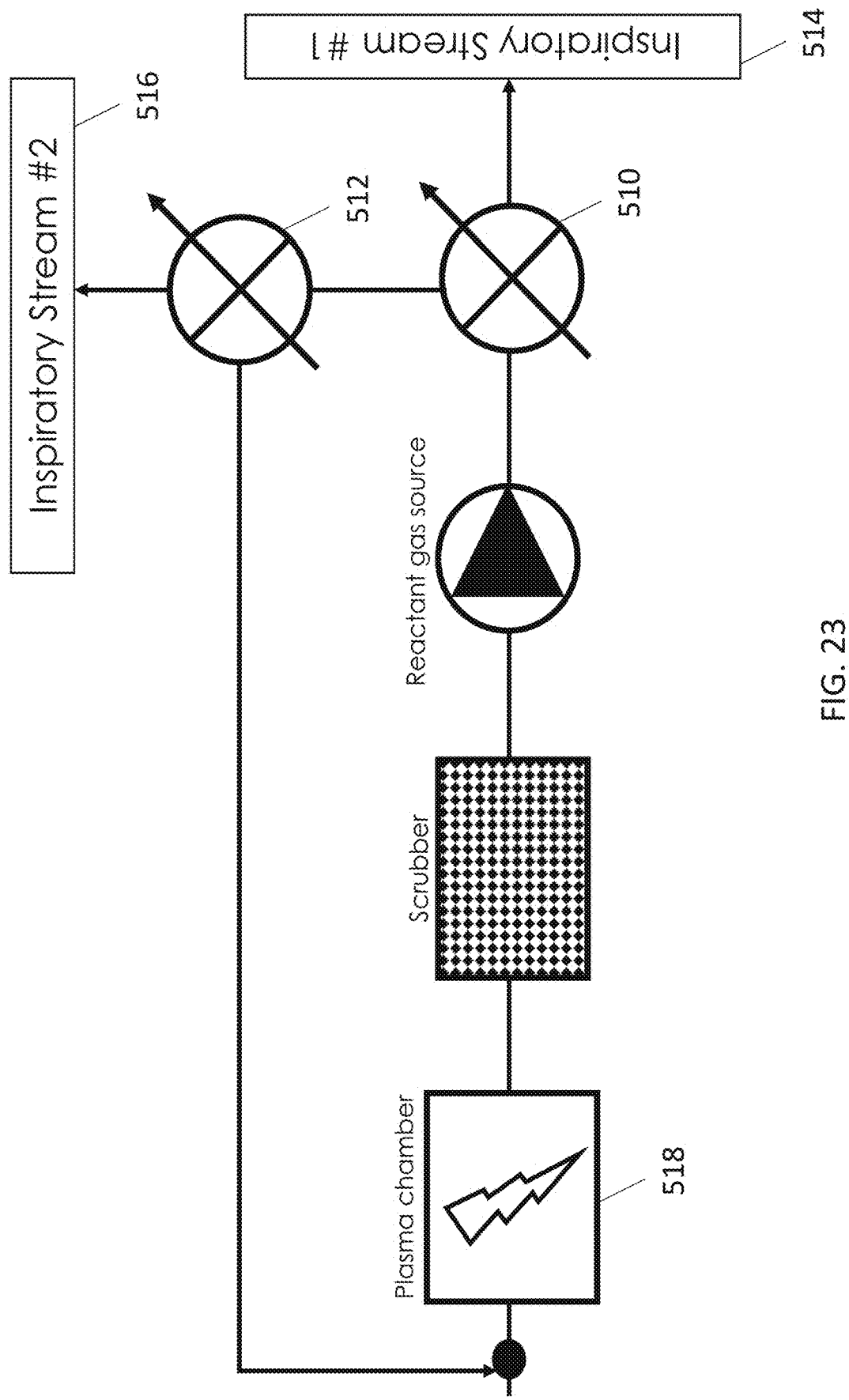
FIG. 23 is an exemplary embodiment of a recirculation architecture.
Figure 24:
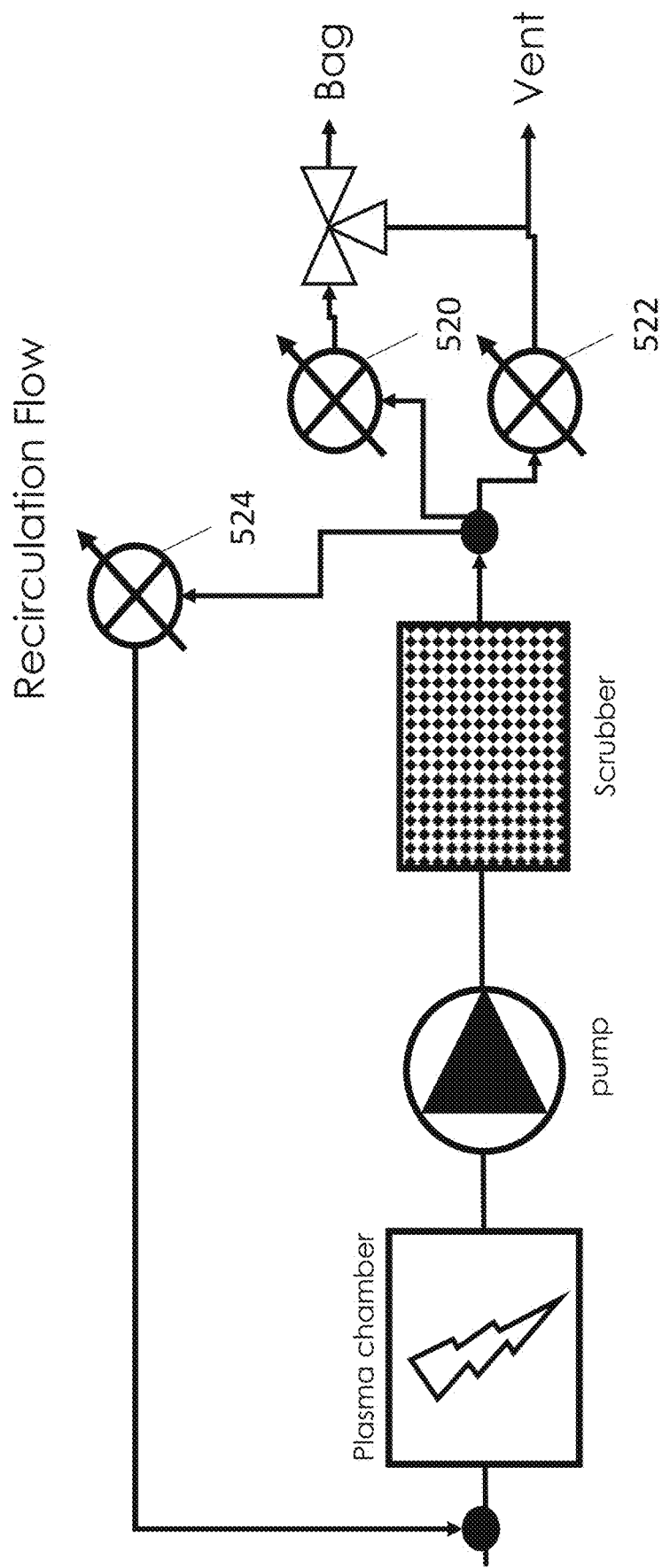
FIG. 24 is an exemplary embodiment of a recirculation architecture.

In some embodiments, a single recirculation loop is used to dose more than one treatment. FIG. 23 depicts an embodiment where scrubbed product gas is delivered to a first patient treatment 514 via a first flow controller 510 before traveling to a second flow controller 512. The second flow controller directs a portion of the product gas to a second patient treatment 516 with the balance of product gas returning to the plasma chamber 518. In some embodiments, product gas is scrubbed further between flow controller 510 and flow controller 512. In some embodiments, a NO sensor between the two flow controllers 510, 512 provides information on NO concentration and/or NO loss within the recirculation loop. A system with recirculation loop that is providing NO to multiple therapies requires an NO production level and recirculating flow rate that exceeds the NO-demand from the connected therapies FIG. 24 depicts a NO generator with recirculation architecture that can be configured to deliver NO to two different therapies. Three flow controllers 520, 522, 524 are utilized to control product gas flow to either a constant flow bag treatment, a ventilator treatment or the recirculation loop return path. A high flow rate flow controller 520 is utilized for the bag treatment and high flow levels in the ventilator treatment. In some embodiments, the high flow rate flow controller provides flows up to 15 slpm. In some embodiments, the high flow rate flow controller provides flows up to 3 slpm. A low flow rate controller 522 provides fine flow control at low flow levels, as needed for dosing neonate treatments and bias flow. In some embodiments, the low flow rate controller provides flows up to 1 to 2 splm. A three-way diverter valve is used to select between bag and ventilator treatments. It should be understood that bag and ventilator treatments are presented as examples, but this architecture could provide flow to other treatment modalities as well. In this architecture, the flow rate through the plasma chamber is constant and the plasma chamber is at constant, low pressure.

Figure 25:
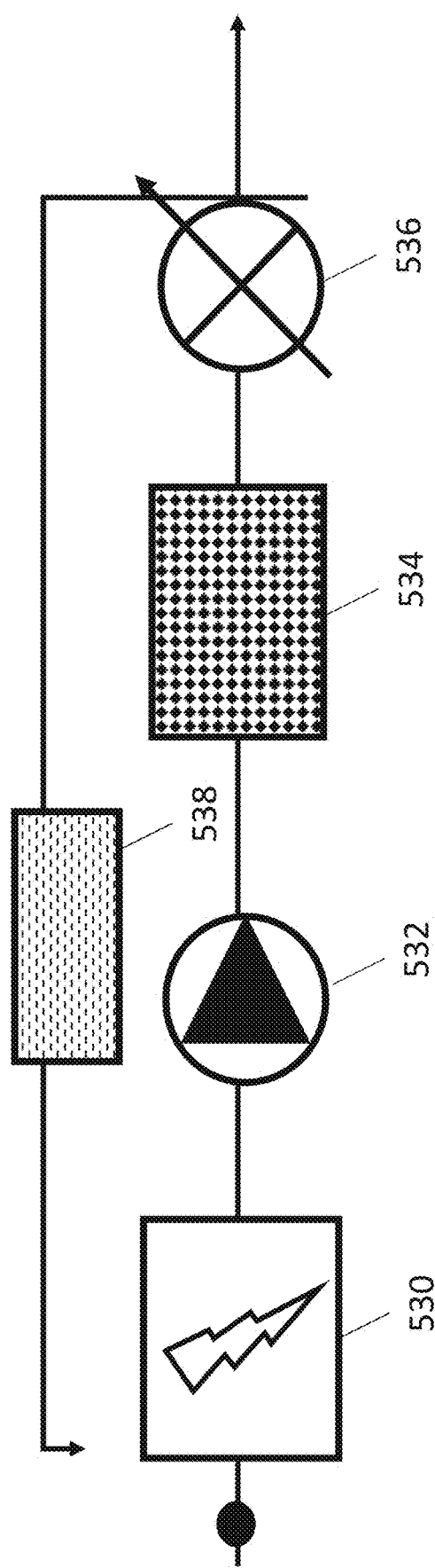
FIG. 25 is an exemplary embodiment of a recirculation architecture.

FIG. 25 depicts a NO generator with a recirculation architecture. Reactant gas enters and passes through a plasma chamber 530 that is at or near atmospheric pressure. Plasma generation within the plasma chamber 530 generates product gas containing NO and $NO_2$. A pump 532 propels product gas through a $NO_2$ scrubber 534. In some embodiments, the pump operates at a constant flow rate to facilitate precise NO production control. Typically, the pump operates at or above the maximum flow rate that will be injected into the inspiratory flow stream. This ensures that there is sufficient NO on tap for the flow diverter to deliver accurate NO product gas during peak demand. In some embodiments, plasma activity is operated to maintain a constant concentration of product gas exiting the $NO_2$ scrubber. Product gas flow exiting the $NO_2$ scrubber is diverted to either the patient or a return path. In some embodiments, the flow diverter (flow controller) 536 sends a flow of constant concentration product gas to the patient that is proportional to the patient inspiratory flow. Gas that is not directed to the patient is scrubbed for NO and $NO_2$ using a NOx scrubber 538 prior to merging with incoming reactant gas. One advantage of this architecture is that the flow controller is located at the injector, reducing system lag in injecting NO into an inspiratory stream. Another advantage is that gas entering the plasma chamber is at constant flow rate and devoid of NO and $NO_2$, simplifying the calculations for plasma settings.

Continuous Delivery

Inhaled nitric oxide at therapeutic levels has the effect of relaxing the smooth muscle in the walls of the pulmonary vasculature. Muscles, such as vascular smooth muscles, relax quickly in the presence of NO with pulmonary artery pressure decreasing within tens of seconds. This relaxation in pulmonary artery pressure decreases the load on the right heart and increases the flow of blood through the lungs, thereby increasing $O_2$ delivery to tissues. Just as NO has rapid onset, its physiologic effects are quickly diminished when NO delivery ceases and pulmonary artery pressure rapidly returns to untreated levels. In some cases, this NO rebound effect can generate pulmonary artery pressures that are worse than pre-treatment levels due to suppression of endogenous NO generation and the patient generating a degree of dependency on exogenous NO. NO delivery systems often include back-up systems or require a second system at the ready for this reason. In the event of a NO delivery failure, it is important to re-establish the NO supply as rapidly as possible. Failures are not the only cases where NO supply can be interrupted. NO tank replacement or $NO_2$ scrubber replacement are routine tasks related to NO therapy. Errors and complications with these steps can also occur from time to time which could prolong the reestablishment of NO delivery and put patient lives at risk. Thus, continuous delivery of NO is important for patient safety.

In some embodiments, a NO system enables replacement of an exhausted scrubber cartridge without interruption in NO therapy. In some embodiments, the system has more than one scrubber cartridge so that the system uses one cartridge while the other is being replaced. In some embodiments, a bypass scrubber is used when the primary scrubber is being replaced. The primary scrubber, itself may have one or more scrubber channels. The bypass scrubber can be positioned within the controller, a vent cartridge or an independent cartridge.

Figure 26:
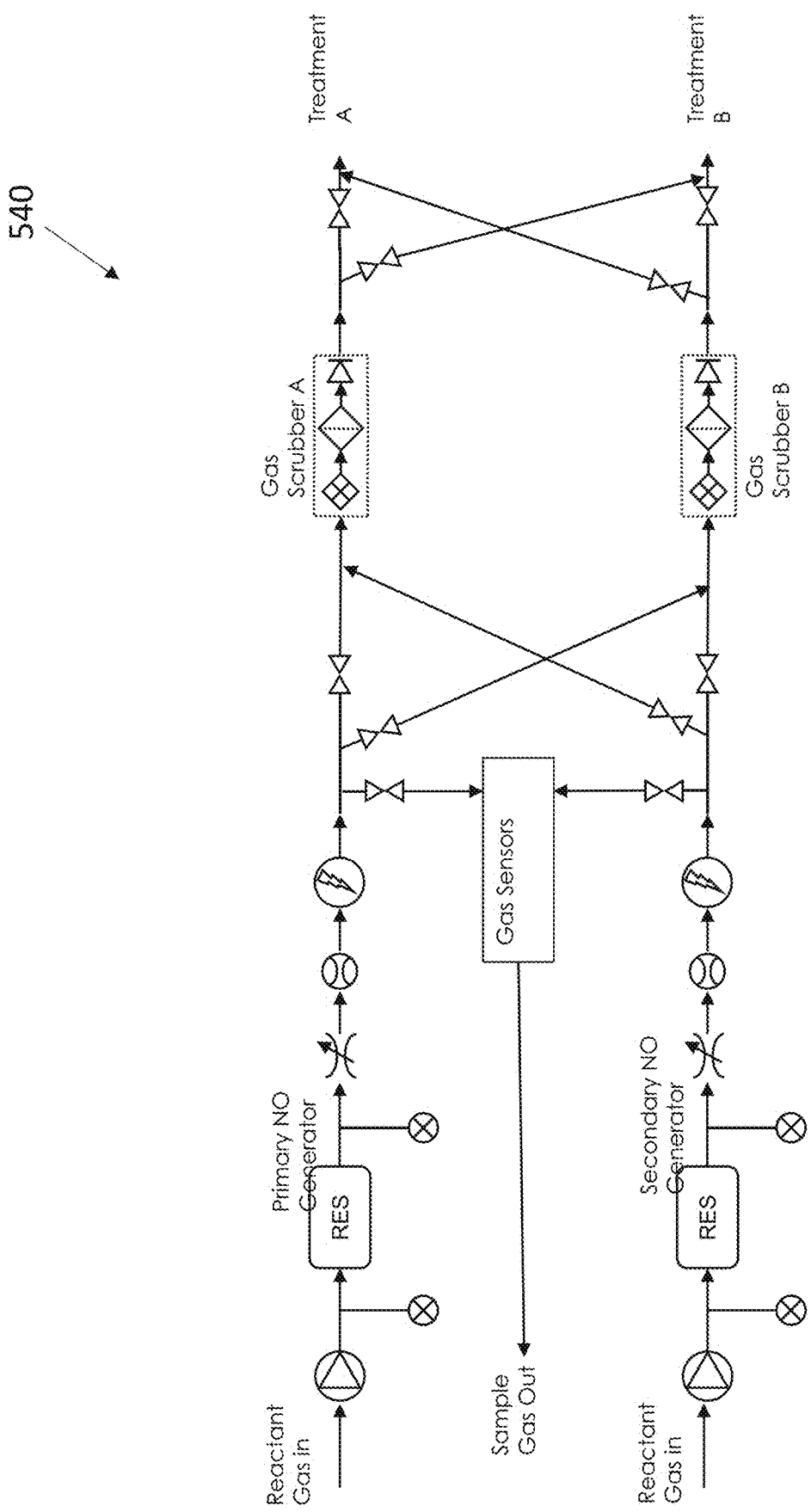
FIG. 26 shows an embodiment of a nitric oxide generation device that can provide continuous NO delivery during scrubber cartridge replacement.

FIG. 26 depicts an embodiment of a nitric oxide generation device 540 that can provide continuous NO delivery during scrubber cartridge replacement. The system includes two parallel NO generation systems. Product gas exiting the plasma chamber from either NO generator can be directed to the gas sensors by shutting downstream valves. All valves downstream of the scrubber can be closed to pressurize the entire system for a self-test. Product gas from either NO generator can be directed to either of two $NO_2$ scrubbers. Each scrubber includes at least scrubber material and a filter. After $NO_2$ removal from the product gas, valves can be programmed to direct the product gas to one of two treatments. In some embodiments, the two treatments include a manual resuscitation bag treatment and a ventilator treatment. In some embodiments, both NO generators can be operated simultaneously to provide NO to concomitantly to both treatments. In some embodiments, one NO generator can be delivering an NO dose to one treatment while the other NO generator is being tested by either the gas sensors or a pressure leak-down test. This allows for a pressure leak-down test as it includes testing the gas scrubber cartridge and its removable connections. As can be seen in FIG. 26, either scrubber can be replaced while treatment is delivered to either treatment. This eliminates the potential for a pause in NO delivery during scrubber cartridge replacement, which could lead to an adverse patient response.

An NO generator designed for continuous NO delivery can have a scrubber available for product gas scrubbing. In the case of the embodiment depicted in FIG. 26, the system can use a lockout feature to ensure that only one cartridge is removed from the system at a time. In some embodiments, the lockout feature can be software-controlled. In some embodiments, the lockout feature can include a manually-actuated lever that blocks either the left scrubber or the right scrubber so that only one scrubber can be removed at a time.

Figure 27:
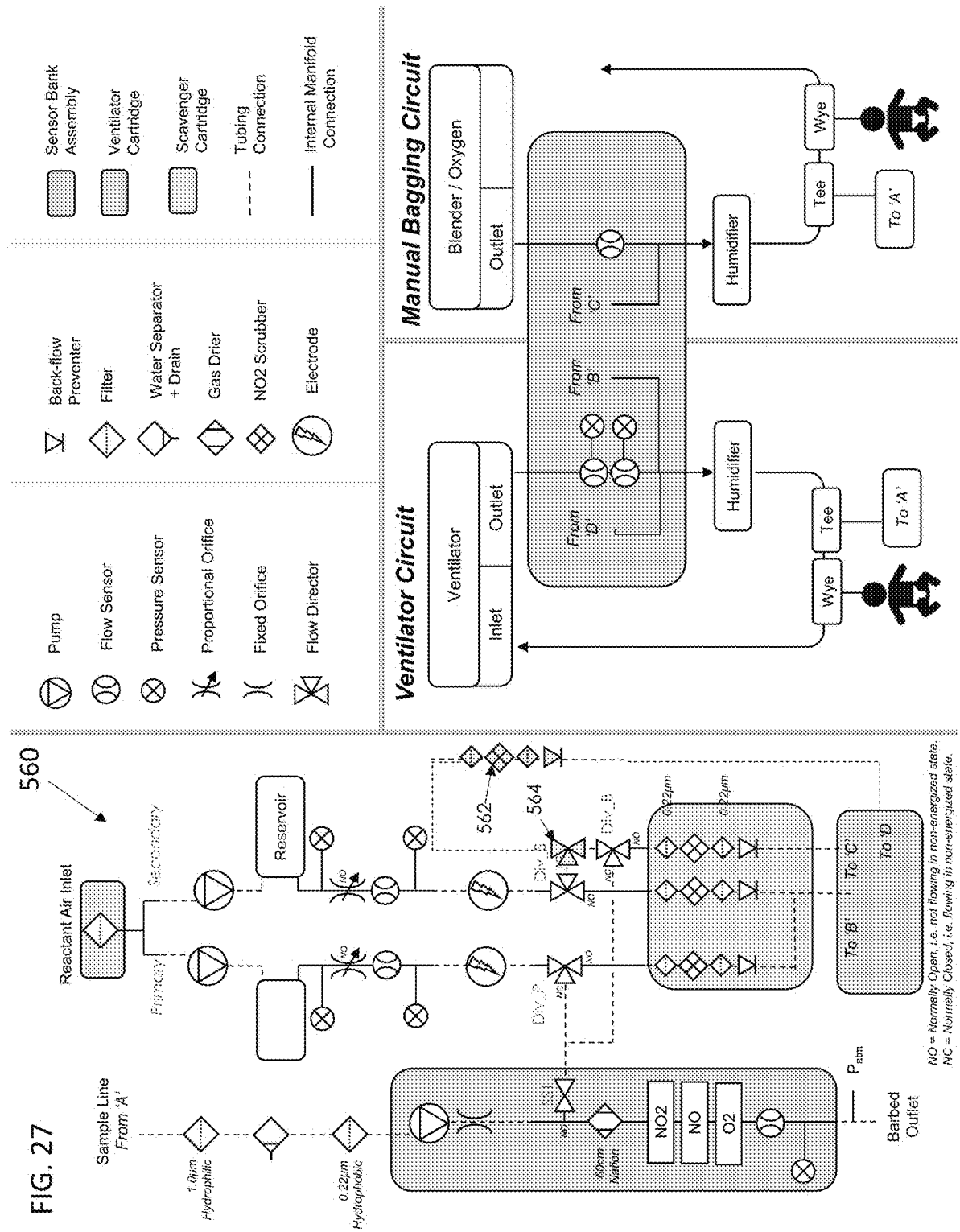
FIG. 27 shows an embodiment of a system that enables the scrubber cartridge to be replaced without interrupting NO delivery.

FIG. 27 depicts an embodiment of a system 560 that enables the scrubber cartridge to be replaced without interrupting NO delivery. A scrubber module independent from the cartridge is located within the controller and is utilized when the primary scrubber cartridge is removed. This design allows a user to replace the scrubber cartridge without having to rush the time it takes for installing the replacement. As shown in FIG. 27, the controller has a scrubber module 562 that can be replaced, for example, annually. The module is used only for times when there is no scrubber cartridge. An additional flow diverter 564 can be used to divert flow when the optical sensor indicates there is no scrubber cartridge. In some embodiments, the flow diverter is a 3-way valve.

Additional Architectures

In some embodiments, the plasma chamber is located before the pump so that pressure within the plasma chamber is low. This is advantageous because pressurizing the plasma chamber increases the necessary voltage to initiate arc breakdown. At some pressures, arc breakdown becomes intermittent or impossible for a reasonably sized high-voltage power supply.

Figure 28:
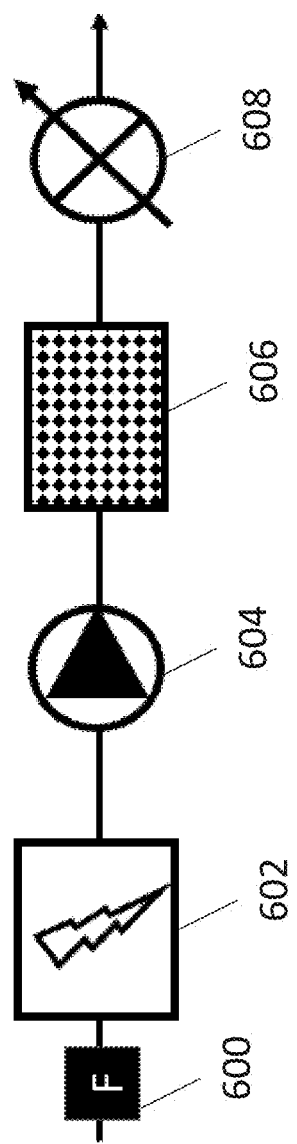
FIG. 28 is an embodiment of a NO generation system wherein a flow controller is located after the plasma chamber and scrubber.

In some embodiments, a flow controller 608 is located after the plasma chamber 602, pump 604, and scrubber 606, as shown in FIG. 28. This allows for a faster response time of the NO flow controller by eliminating the effects of dead volume and flow restriction presented by the scrubber. In some embodiments, a flow sensor 600 is located before the plasma chamber to measure reactant gas flow into the plasma chamber as an input to the NO generation control algorithm.

In some embodiments, there are two NO-containing product gas paths which are used one at a time. When the scrubber of one path is exhausted, the system changes to the other path and requests the user to replace the exhausted scrubber.

Figure 29:
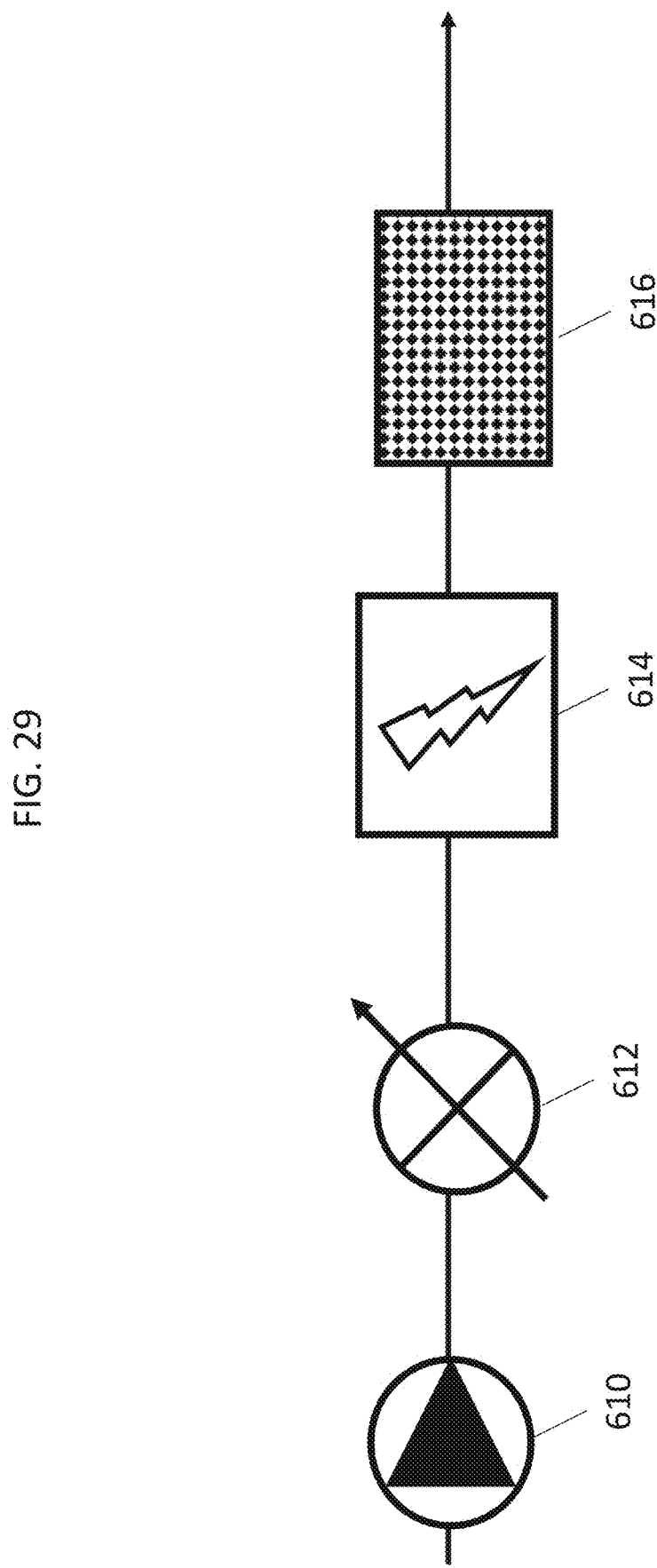
FIG. 29 is an embodiment of a NO generation system that can keep flow control sensors from being exposed to NO and $NO_2$.

FIG. 29 depicts an embodiment of a NO generation system. The system configuration shown in FIG. 29 can keep flow control sensors from being exposed to NO and $NO_2$. Furthermore, product gas is injected immediately after scrubbing so that NO oxidation is minimized. The pump (reactant gas source) 610 shown in FIG. 29 can be modulated to save energy and reduce noise. All NO generated by the system in the plasma chamber 614 goes to the patient. The system confirmation shown in FIG. 29 can also attempt to minimize dead volume between the flow controller 612 and the scrubber 616 to minimize lag in NO delivery with respect to an inspiratory flow and decrease flow restriction from the scrubber element to decrease the delay of NO being introduced into a ventilator flow for optimizing performance of the system.

The rate of NO oxidation to $NO_2$ is proportional to the absolute temperature of the product gas. In some embodiments, product gas passes through a heat sink after the plasma chamber to cool the product gas and reduce the rate of $NO_2$ formation. A heat sink can be passive, such as thermally conductive tubing or a thermally conductive mass with cooling fins and forced air. Alternatively, a heat sink could be active such as a Peltier cooling device. In some embodiments, both sides of a thermo-electric device (e.g. Peltier device) can be used to simultaneously warm incoming reactant gas and cool product gas.

Figure 30:
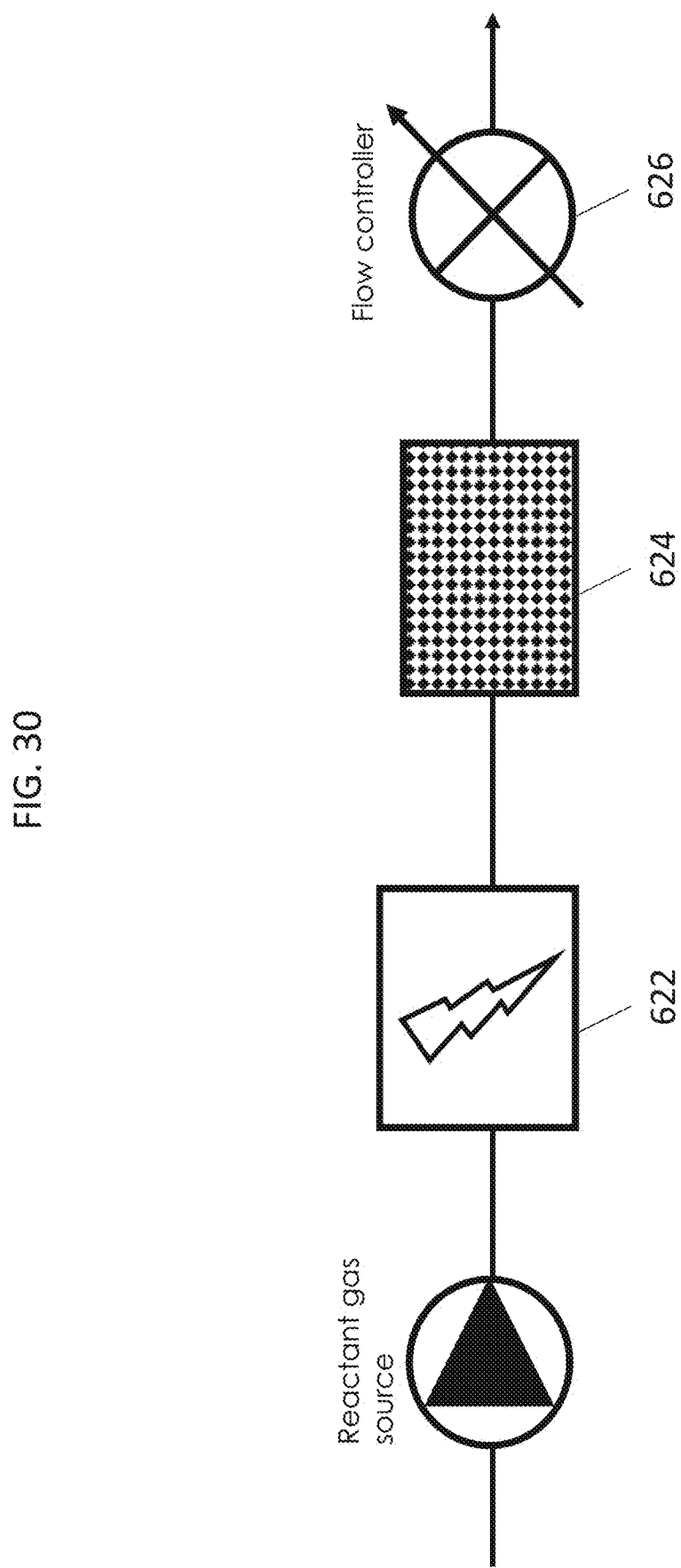
FIG. 30 is another embodiment of a NO generation system where the flow controller is located after the scrubber.

FIG. 30 depicts an embodiment of a NO generation system where the flow controller has been located after the scrubber. This provides pressurized NO to the flow controller and little to no dead volume or flow restriction between the flow controller 626 and introduction into the patient inspiratory stream. In some embodiments, the scrubber 624 can serve as a reservoir, simultaneously storing and scrubbing product gas. The scrubber connections in this system configuration can be under high pressure which can be overcome to allow the scrubbers to be replaceable. Furthermore, the plasma chamber 622 operates at elevated pressure, which can increase NO production to some extent, however high pressure reactant gas can suppress electrical discharges.

In some embodiments, an NO generation system includes a reservoir downstream of the plasma chamber for collecting of NO gas prior to injection through a flow controller. In order to minimize $NO_2$ levels in the downstream scrubber, the reservoir can be filled with a scrubber material. In some embodiments, the scrubber-filled reservoir is user-replaceable.

Figure 31:
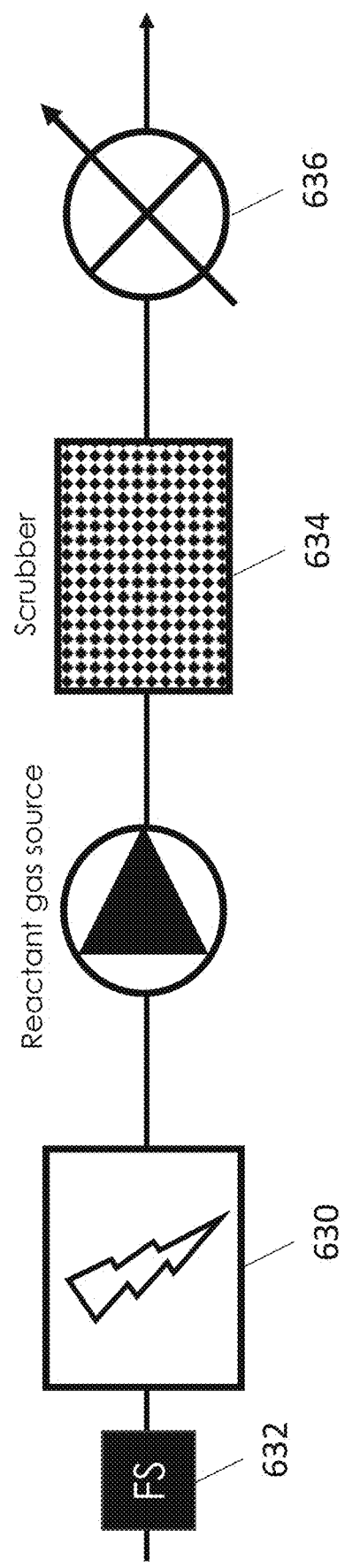
FIG. 31 depicts an exemplary embodiment of a NO generation system with the plasma chamber first.

FIG. 31 depicts an exemplary embodiment of a NO generation system with the plasma chamber 630 first so that NO is generated at near-atmospheric pressures. A flow sensor 632 is placed adjacent to the plasma chamber 630 for a measurement of reactant gas flow into the plasma chamber. The flow controller 636 is located at the end, eliminating the effects of scrubber flow restriction and dead volume on NO delivery timing. In some embodiments, the scrubber 634 can serve as a reservoir.

Figure 32:
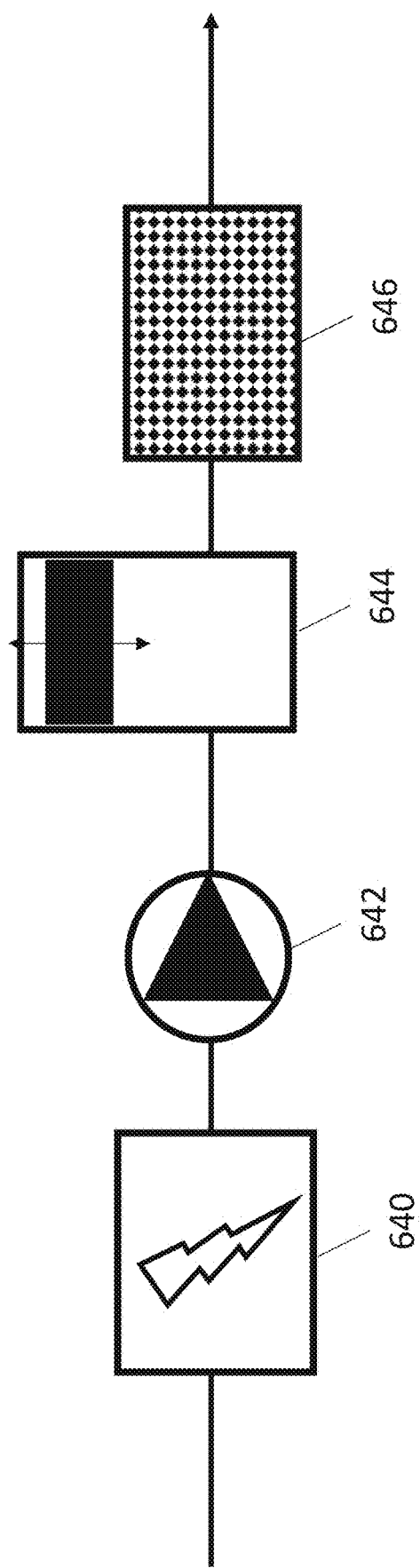
FIG. 32 is an embodiment of a NO generation system consisting of a plasma chamber, pump, piston chamber, and scrubber.

In some embodiments, a NO generation system, shown in FIG. 32, can include a plasma chamber 640, pump 642, piston chamber 644 and scrubber 646 in series. The pump flow rate and plasma activity are at constant rate based on the minute volume of NO required for a specific patient therapy. During constant flow treatments, the piston is in a fixed position that minimizes dead space (the lower, or bottom, portion of the piston chamber as shown in FIG. 32) and the pump delivers all of the treatment gas. In pulsatile NO treatments, like ventilator treatments, the piston slowly draws product gas into the chamber during the bias flow so that the balance of product gas exits the system to accurately dose the bias flow. When an inspiratory event occurs, the piston pushes out a bolus of NO to dose the bolus of inspiratory flow. In some embodiments, the NO bolus flow rate is proportional to the inspiratory flow rate. In embodiments where the piston provides only the inspiratory NO dose (i.e. not the bias flow dose), the volume of the piston chamber is roughly the volume of an inspiratory tidal volume divided by the dilution ratio. For example, for a 500 ml tidal volume and dilution ratio of 10:1, the piston chamber volume is a minimum of 50 ml. In some embodiments, during constant flow treatments, the piston is not used.

Lag Compensation

Figure 33:
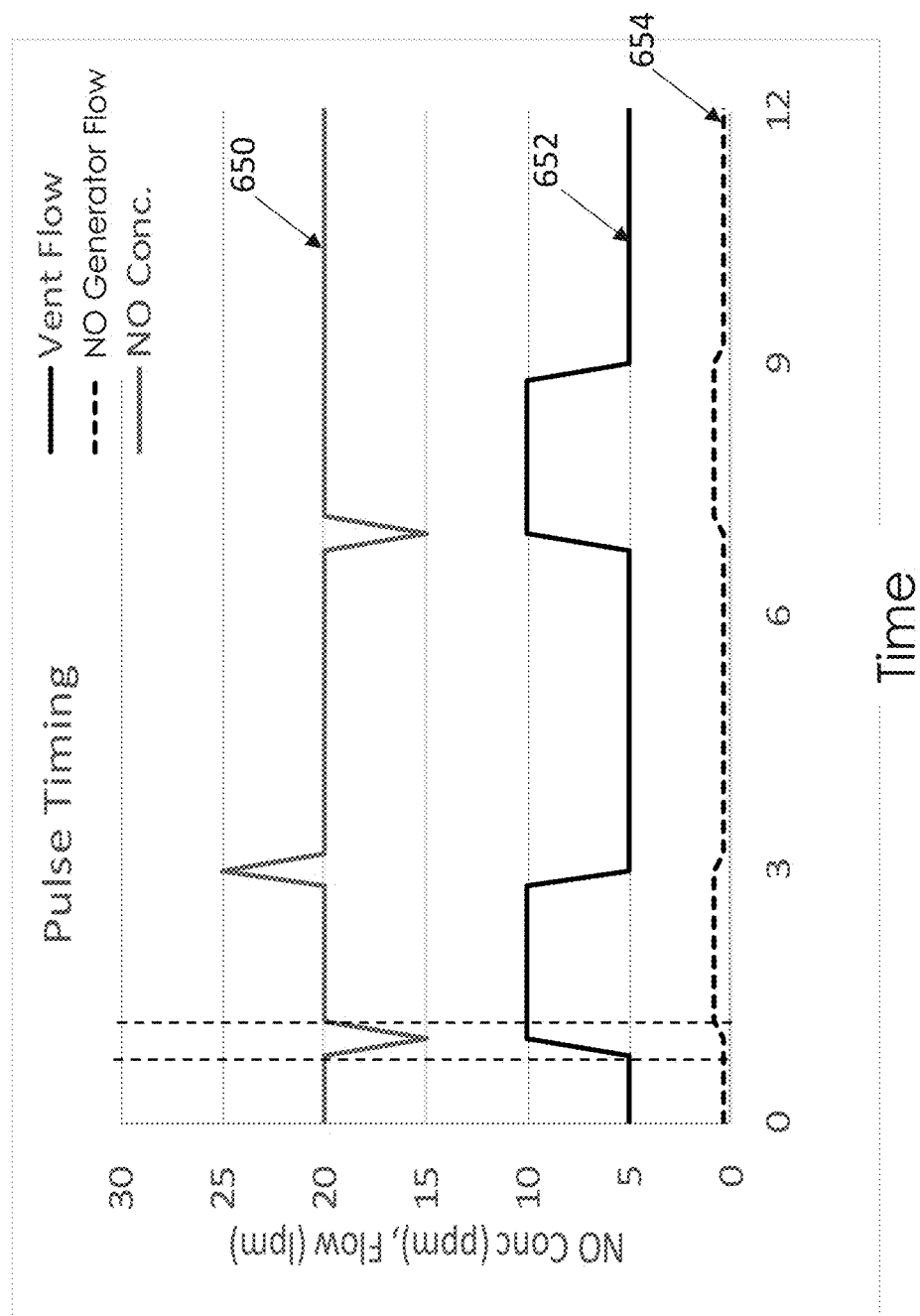
FIG. 33 illustrates an exemplary graph showing the effect of delays in the system's ability to measure, prescribe, and/or deliver NO to a ventilator circuit.

FIG. 33 depicts the effects of lag in product gas delivery to an inspiratory flow. A patient breathes at a periodic rate with an inspiratory flow rate depicted by the solid black line in the middle of the plot. The NO generation device generates a proportional amount of NO product gas that flows at rates shown in the bottom dashed curve. Lag in the NO generation system results in product gas flows that are delayed from the inspiratory flow which manifest as fluctuations in the delivered NO concentration (curve at the top of FIG. 33). Lag in the system can be due to one or more of sensor lag, sensor signal conditioning, digital to analog conversion, signal conveyance, signal processing, dose calculation, flow control response time, plasma control response time, flow restriction of the pneumatic pathway (scrubber, filter, tubing) and transit time through the NO generation system. As a result, the leading edge of an inspiratory event can be underdosed and the trailing edge of an inspiratory event can be overdosed. An NO generation system requires NO of known concentration on tap and rapid, accurate flow control to eliminate lag-related inaccuracies in the delivered dose. In some embodiments, the flow control has a t90 time of less than 50 ms to achieve acceptable dose accuracy.

In an NO generation system designed to dose a variable-flow treatment, delays in the system's ability to rapidly measure, prescribe and/or deliver NO to a ventilator circuit can result in low concentration NO 650 at the beginning of an inspiratory pulse 652 and high concentration NO 650 at the end of the inspiratory pulse 652 within the ventilator circuit, as shown in FIG. 33. FIG. 33 illustrates an exemplary graph showing the ventilatory flow 652, NO generator flow 654, and NO concentration 650. In some embodiments, an NO generation system can mitigate a drop in NO concentration at the onset of a breath by increasing the flow rate through the plasma chamber prior to sensing the breath in the ventilator circuit. This can be achieved in a variety of ways. In some embodiments, the increased flow prior to a breath can be based on the timing of prior breaths. An NO generation system can prevent high NO concentrations at the end of an inspiratory pulse by decreasing NO production prior to the end of the inspiratory pulse. In some embodiments, a system decreases NO production to bias-flow levels when the end of inspiration is detected. The end of inspiration can be detected based on one or more of the following parameters: timing of prior breaths, the rate of change in inspirator flow rate, a magnitude/threshold of inspiratory flow rate, timing of the peak inspiratory flow, a pressure value within the inspiratory circuit, and/or other events that occur prior to the end of an inspiratory pulse. Ending NO product prior to the end of an inspiratory pulse can result in a lower amount of NO being produced for a patient. In some embodiments, a system makes up for losses in NO production during the inspiratory event by producing additional NO.

Figure 34A:
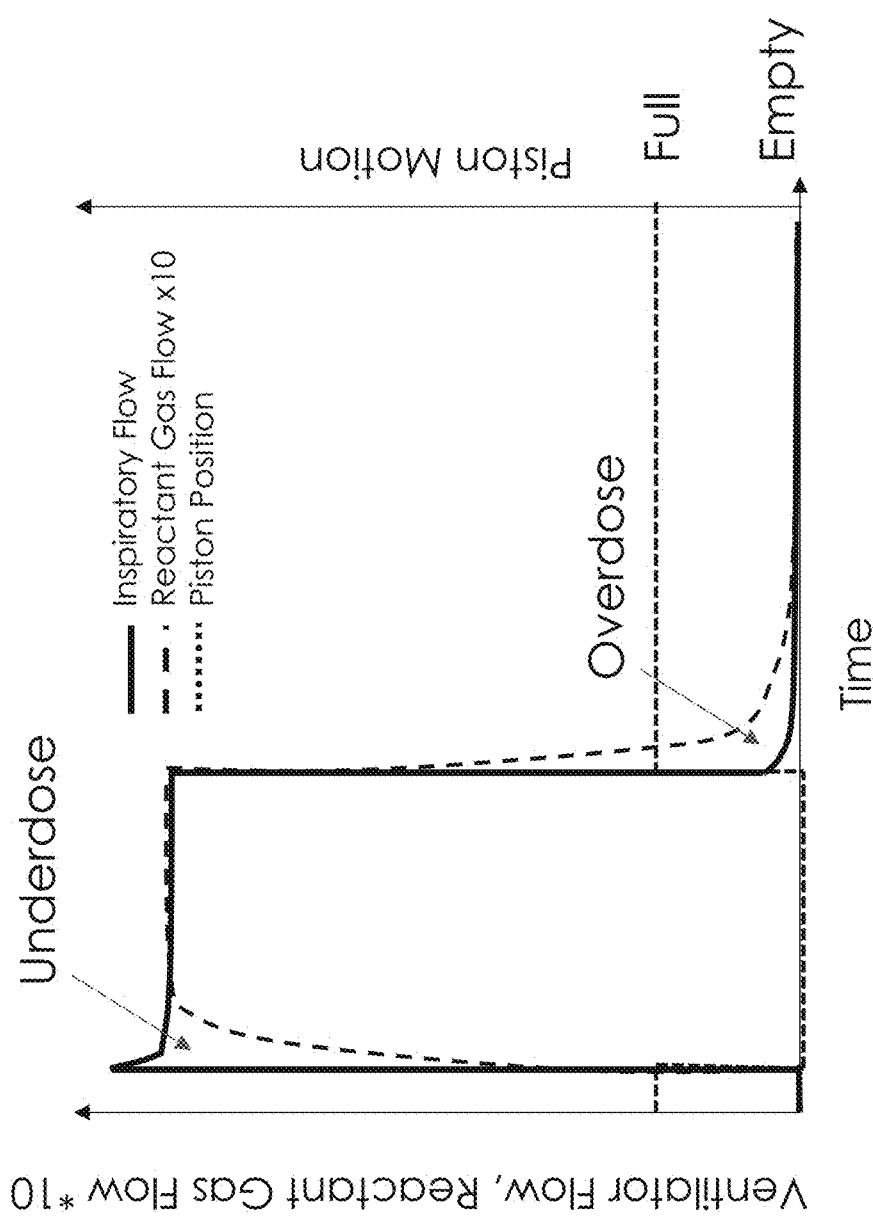
FIG. 34A depicts ventilator flow and reactant gas flow in a NO generation system.
Figure 34B:
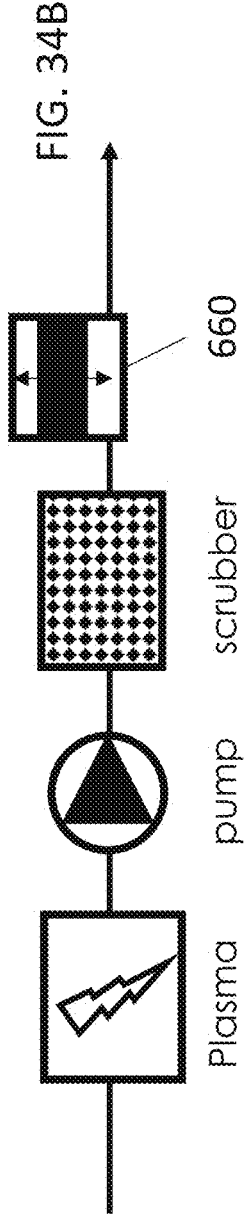
FIG. 34B shows a NO generation system wherein a piston chamber is used to add product gas to an inspiratory bolus at the beginning of an inspiratory event.

In some embodiments, an active flow lag compensator can be used to improve dynamic response of the flow in a NO generation and delivery system. A ventilator flow and reactant gas flow are shown in FIG. 34A. Lag in a NO generation system results in underdosing the beginning of an inspiratory bolus and overdosing after the inspiratory bolus. Ventilator flow, shown as a solid black line, increases rapidly from a low level of zero or bias flow to a high level. The dashed line shows the reactant gas flow through a typical linear system without a lag compensator lagging the ventilator flow. This lag results in inspiratory gas being underdosed during the inspiratory event and over-dosed at the end of the inspiratory event. The dotted line shows the position of the piston in an active lag compensator. The piston chamber fills with NO product gas during patient exhalation with gas that otherwise would have been injected into the inspiratory stream as the scrubber depressurizes. The piston chamber empties at the start of the inspiratory event, adding NO product gas to the inspiratory limb before the system would otherwise be able to inject NO into the inspiratory limb. Utilization of an active lag compensator can significantly reduce, if not eliminate, dose inaccuracies associated with system lag. In some embodiments, a piston chamber 660, shown in FIG. 34B, is used to add product gas to an inspiratory bolus at the beginning of an inspiratory event. The piston chamber can be refilled at the end of the inspiratory event to prevent overdosing the inspiratory flow. The size of the piston chamber can vary. In some embodiments, the piston chamber can be very small, on the order of 1 to 20 ml. It should be understood that any sort of pneumatic component that can increase and decrease gas volume can be used. For example, instead of a piston chamber, a solenoid-actuated diaphragm, an elastomeric balloon actuated by vacuum, a tube with changing diameter, or even the adding circuit volume create by a binary valve in parallel can be used.

Figure 35:
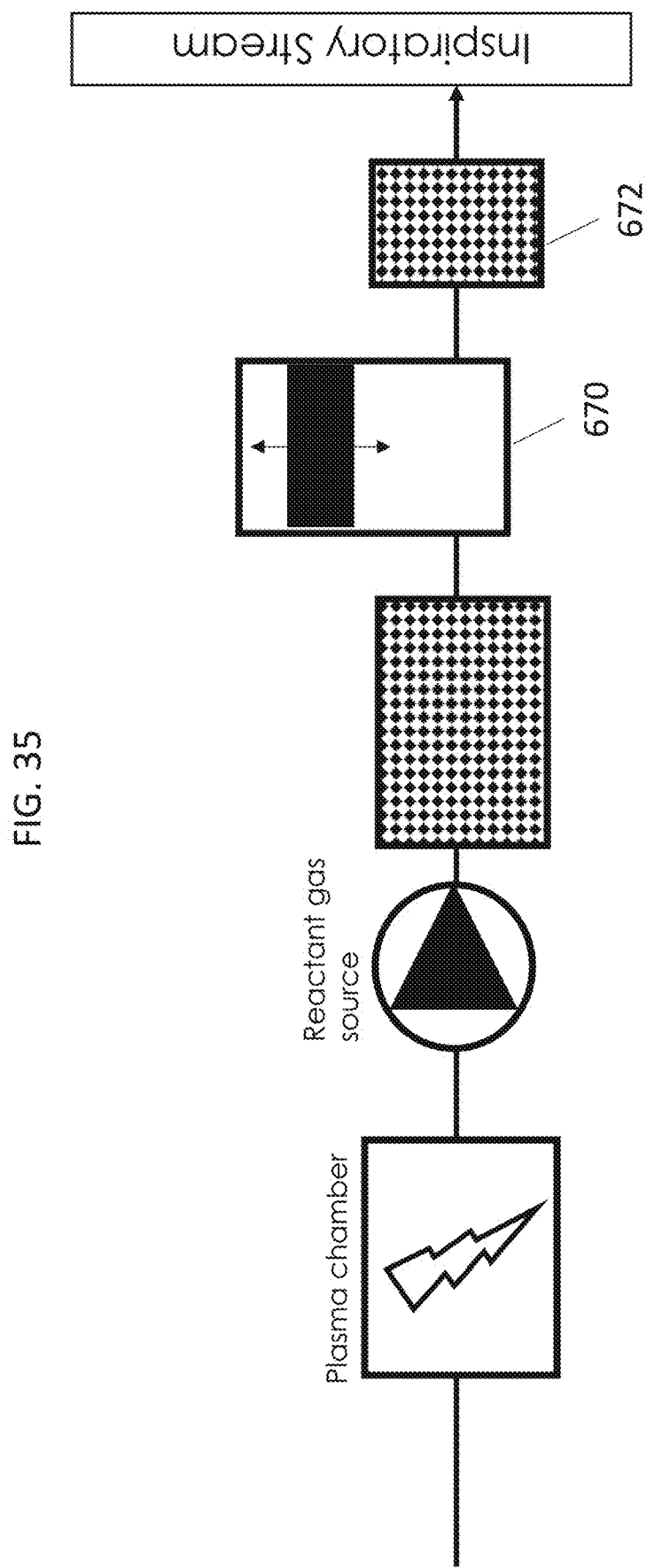
FIG. 35 is an embodiment of a NO generation system wherein the piston actuator is used to deliver pulsatile NO in proportion to an inspiratory flow.

In some embodiments, as shown in FIG. 35, a piston actuator or chamber 670 can be used to deliver pulsatile NO in proportion to an inspiratory flow. A secondary scrubber 672 can be located between the piston chamber and injector to remove $NO_2$ that can form in the piston chamber between breaths. In this embodiment shown in FIG. 35, NO generation is at constant levels and at atmospheric pressure with constant NO production. There can be low flow restriction after the piston pump.

In some embodiments, both product gas flow entering the inspiratory stream and plasma activity are pulsed.

Ventilator Interface

Figure 36:
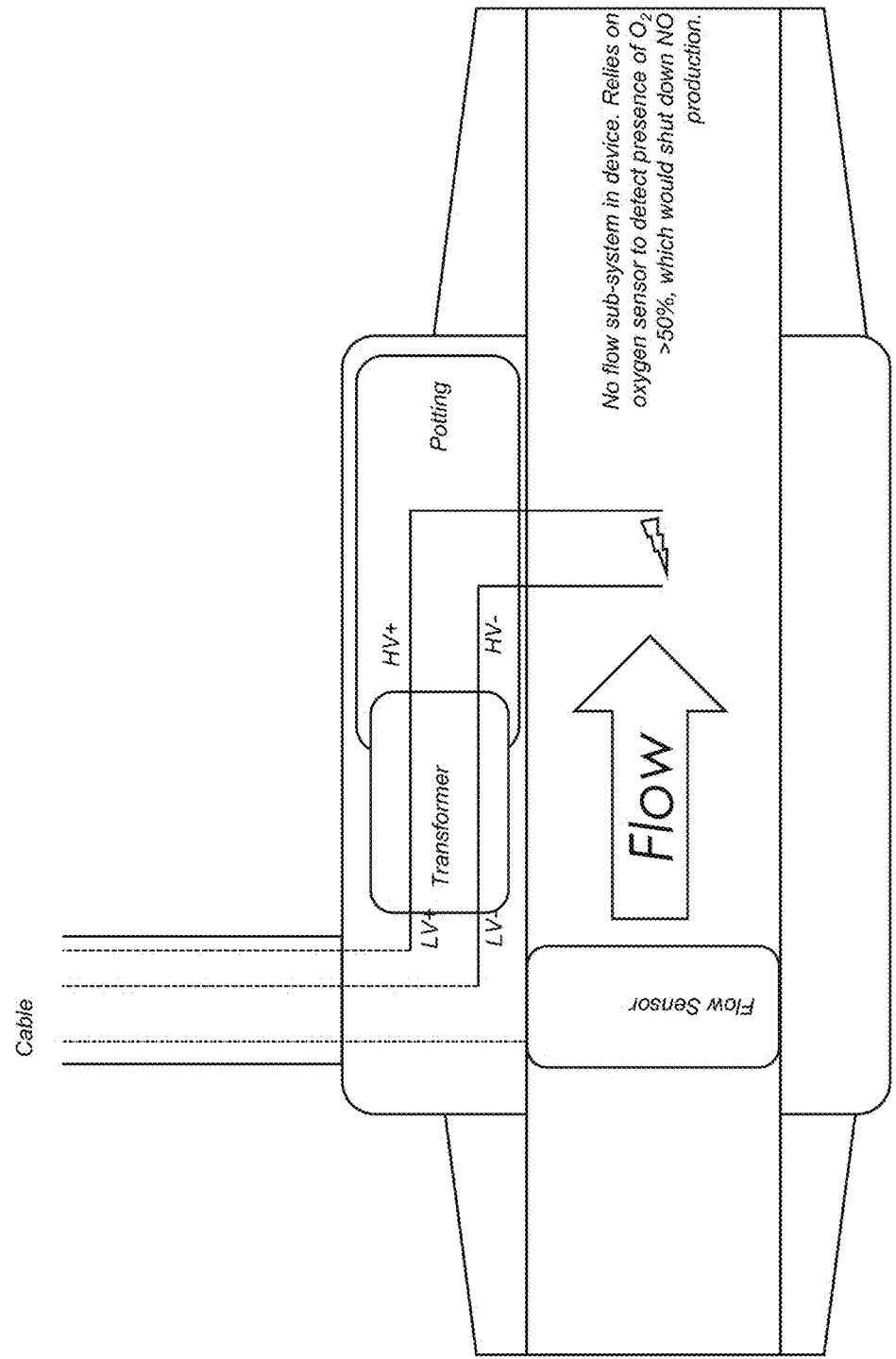
FIG. 36 shows a plasma chamber located in an injector module at the patient inspiratory limb with reactant gas supplied from a NO generation device.

In some embodiments, the plasma chamber is located in an injector module at the patient inspiratory limb with reactant gas supplied from a NO generation device, as shown in FIG. 36. In some embodiments as shown, the high voltage transformer is located in the injector module as well, eliminating the need for high voltage cables extending from the NO generation device controller to the injector. In the embodiment shown in FIG. 36, a scrubber is not required due to the high NO to $NO_2$ ratio. Reactant gas flow into the injector module is controlled upstream by the treatment controller. In some embodiments, a scrubber and/or particle filter is located within the injector module downstream from product gas injection. In some embodiments, product gas is injected into an inspiratory stream and scrubbed for $NO_2$ after mixing.

Figure 37:
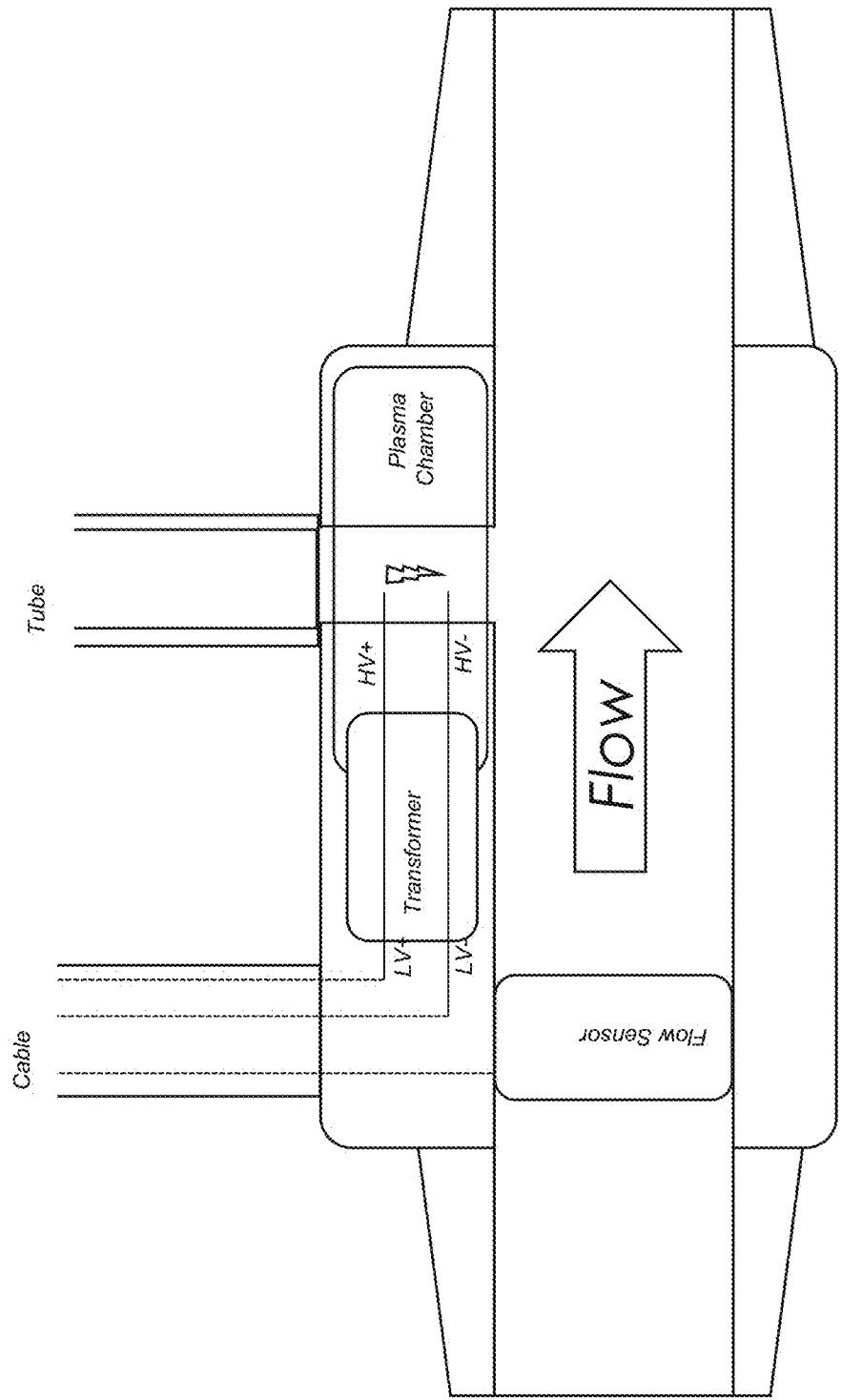
FIG. 37 depicts an injector module that includes electrodes and high voltage transformer.

In some embodiments, NO is generated within an injector module that houses an inspiratory flow sensor, as shown in FIG. 37. An injector module includes electrodes and high voltage transformer, eliminating the need for high voltage lines between NO generation controller and injector module. This approach offers advantages of generating NO immediately prior to injection. This approach includes some safety benefits in that only lower voltage electrical cables and a reactant gas flow extend from the treatment controller to the injector module, thereby eliminating the risk of users handling high-voltage connections and leaks from high concentration NO tubing. By diluting the high concentration NO product gas so rapidly, less NO is lost prior to dilution into the inspiratory flow. In some embodiments, a scrubber and/or filters is located between the plasma chamber and inspiratory flow. In some embodiments, a scrubber and/or filters is located within the inspiratory flow post-NO injection. In some embodiments, the injector module is disposable.

Ambulatory Architecture

Figure 38:
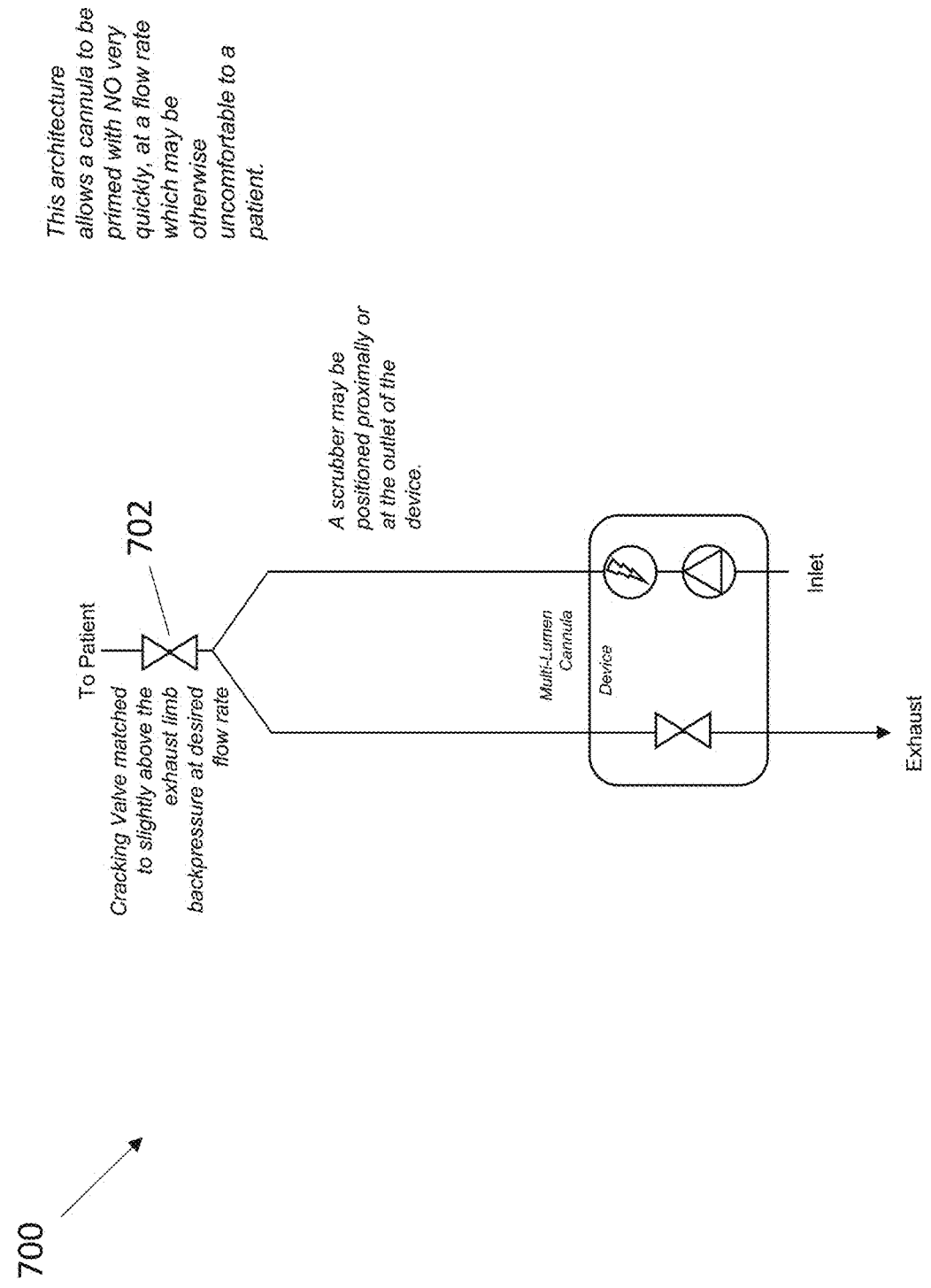
FIG. 38 shows NO gas flowing to the patient and returning to the NO generation and delivery device within the cannula.

In some embodiments, NO gas can flow to the patient and return to the NO generation and delivery device within the cannula. This architecture, as shown in FIG. 38, enables a cannula to be primed with NO very quickly at a flow rate which may be otherwise uncomfortable to a patient. The cannula can also be flushed with reactant gas by turning the plasma off and continuing to flow gas through the cannula. A scrubber location can vary, and can be located within the controller, before the cannula, at the proximal end of the cannula, or at the distal end of the cannula. When the valve in the exhaust pathway is closed, flow passes through the cracking valve at the patient end of the cannula. In some embodiments, a second pump is used on the exhaust limb instead of a valve. To recirculate, both pumps operate at the same flow rate. To deliver gas to the patient, the pump in the exhaust/return path stops.

As shown in FIG. 38, the NO device has a flow circuit 700 with a cracking valve (or orifice) 702 at the patient and an exhaust valve. NO travels through the circuit. When the exhaust valve is closed, flow exits the cracking valve to the patient. The exhaust valve can be PWM-controlled or have variable position. Flow rate through the system can vary based on at least one of pump effort, reactant gas pressure, or flow controller upstream. In some embodiments, purging happens at a faster flow rate (for speed) than patient gas delivery. The gas path can be primed rapidly to reduce transit time then gas delivery to the patient could be slower for comfort. In some embodiments, a scrubber and/or filter is located at the cracking valve to clean product gas before delivery to the patient. The exhaust valve closes (to start delivery to patient) in response to a patient parameter (breath detection, for example). A NOx scrubber can be located at the exhaust to clean product gas.

Product Gas Sensing and Calibration

Product gas is the gas produced when reactant gas passes through the plasma chamber, converting a portion of the $N_2$ and $O_2$ within the reactant gas into NO and $NO_2$. In a NO generation system, it can be beneficial to measure the amount of NO and $NO_2$ being generated to inform the NO production process and monitor the performance and safety of the device. Various types of gas analyzers can be utilized to measure product gas, including but not limited to electrochemical sensors, optical sensors and photo-ionization detectors (PID), each of which will be described further in the sections below.

In some embodiments, an optical sensor analyzes product gas circulating within a recirculation loop of a NO generator. In some embodiments, the optical sensor is comprised of a light source and a photo detector. Various frequencies of light, filters and the like can be used to provide measurements specific to the molecule being measured. In some embodiments, one or more optical sensors are utilized to measure one or more of NO, $NO_2$ and $H_2O$. The NO measurement can be used for closed loop control of NO production and/or calculation of feed-forward terms to account for NO loss. Either the NO and $NO_2$ measurements can be utilized to monitor NO production to ensure that the plasma is active and $NO_2$ levels are acceptable. An $NO_2$ measurement within the recirculation loop can be used to determine whether or not an $NO_2$ scrubbing component is installed and/or functioning properly. In some embodiments, a NO generation system generates an alarm when $NO_2$ levels within the recirculation loop exceed a threshold. In some embodiments, scrubber replacement is recommended by the system when $NO_2$ levels exceed a threshold within the recirculation loop. $H_2O$ measurements within the recirculation loop can provide inputs into the determination of plasma settings.

An optical sensor can be located in multiple locations within a recirculation loop. In some embodiments, the optical sensor is located after the $NO_2$ scrubbing component. $NO_2$ measurements at this location can provide information on whether or not the scrubber is working properly, and/or needs to be replaced.

Accurate product gas NO measurement within a NO generation system is paramount for accurate NO dosing. Thus, it is important to calibrate a NO measurement sensor and ensure that the sensor continues to be in calibration. In some embodiments, an optical sensor can calibrate itself. A mesh can be moved into position between the source and the receiver. The mesh blocks a known fraction of light, enabling a system to self-calibrate based on the change in input. In some embodiments, a prism splits light from the light source, and one channel of light travels through the product gas sample. The other channel of light travels through vacuum. The system can compare sensed vs. reference to account for shifts in light source intensity.

Variation in an optical measurement comes from source and sensor variation. In some embodiments, a mirror is used to switch between sources. In some embodiments, a chopper wheel is used to switch between sources so that a comparison can be made between sample and reference. In some embodiments, the source can be a broad band light and the sensors have collimators and filters to select certain frequencies associated with different gases and a reference to measure gas concentration and self calibrate.

A photoionization detector can be utilized to measure product gas constituents as well. Photoionization detectors operate by exposing gas to photons. The photons ionize molecules within the gas by driving one or more electrons from a gas molecule. Positively charged gas molecules interact with charged plates within the gas pathway to elicit a detectible charge/signal. PID gas analyzers do not provide measurements for a single gas species are commonly used to obtain a combined measurement of VOCs within a gas stream. In a NO generation device, a PID can be utilized to measure NO and $NO_2$ within a product gas stream. By placing a PID downstream of the $NO_2$ scrubber, the output of a PID sensor is, for practical purposes, entirely from NO. Thus, a PID sensor can be used for measurement of NO within a NO generation system. As a scrubber is exhausted, $NO_2$ levels within a product gas stream can increase. This increase in $NO_2$ levels could manifest as an upward drift in the signal from a PID, thereby indicating the need for scrubber replacement. One benefit to use of a PID sensor to analyze product gas is that unlike electrochemical sensors, the longevity of PID sensors is not affected by gas water content. Thus, PID sensors do not require product gas humidity management, although some level of humidity and temperature compensation may be required during post-processing of PID data streams.

Measurement of NO, $NO_2$ and $H_2O$ in product gas has been presented in the context of a recirculation architecture, however, it should be understood that product gas measurement is beneficial in other architectures as well. In some embodiments, a product gas sensor measuring one or more of NO, $NO_2$ and $H_2O$ is located in the architecture after the scrubber to provide feedback to the NO generator and monitor the effectiveness of the scrubber.

Accurate measurement of product gas can be utilized to calibrate other sensors within a NO generation and delivery system. For example, accurately measured product gas can be conveyed to other gas analysis sensors within a system. In some embodiments, product gas is precisely diluted and passed to patient inspiratory gas sensors to confirm/check/make their calibration. Dilution of the product gas and passage to the inspiratory gas sensors can be done entirely within a NO generation and delivery system, forgoing the need for user involvement in calibration. In some embodiments, this type of calibration occurs automatically at precise timing intervals. In some embodiments, calibration occurs on an as-needed basis, such as when an inspiratory sensor has drifted, ambient conditions have changed significantly, or at the request of the User.

It is important that product gas sensor remains accurate over time. State of the art is to pass an external source of zero gas through a gas sensor followed by a flow of calibration gas from an external source. In some embodiments, a NO generation and delivery system includes a source of calibration gas onboard which is replenished during periodic maintenance. In some embodiments, the calibration gas is stored within a gas cylinder in the device and outflow is controlled with a valve. Calibration gases can be one or more concentration of one or more of NO, $NO_2$, and oxygen. In some embodiments, a gas canister of nitrogen is used for zeroing gas sensors. High concentrations of calibration gas enable a smaller gas cylinder to be used for a given service life, however accurate dilution of calibration gas must also be achieved. In some embodiments, steel gas canisters with a foil seal, as used with whipped cream nitrous oxide, are used to store calibration gas within a NO generation and/or delivery system. In some embodiments, a NO generation and delivery system includes a reference gas sensor. The reference gas sensor is only exposed to product gas during calibration. Owing to the less-frequent use, the reference sensor can remain in calibration longer than the primary gas sensor and be used to determine the actual concentration of a product gas so that calibration coefficients of the primary sensor can be modified.

In some embodiments, calibration canisters as described above are externally connected to a NO generation and/or delivery device by a User. In some embodiments, gas sensor calibration is achieved by flowing calibration gas across the sensors. In some embodiments, a pressure regulator and/or flow regulator would be required to meter the calibration gas flow to ensure a reproducible environment for the sensors to be calibrated and to ensure that the calibration gas supply lasts a sufficient duration of time for the sensor to reach a level that it can be calibrated at, typically steady state. Calibration gases flow through the gas sensor chamber and out of the NO generation and delivery device. In some embodiments, the calibration gases flow into a vacuum source. In some embodiments, calibration gases flow through a $NO_2$ and/or NOx scrubber.

In some embodiments, the chamber containing gas sensors to be calibrated is closed off and calibration gas is introduced to the chamber so that the concentration of calibration gas equalizes. In some embodiments, the gas sensor chamber is evacuated prior to introducing the calibration gas to improve the accuracy of the concentration of calibration gas. Higher degrees of calibration accuracy can be achieved by taking into account one or more of volume of the gas sensor chamber (Vs), Volume of the calibration gas cartridge (Vc), Final temperature of the system (Tf), Starting pressure of the sensor chamber (Ps), Final pressure of the sensor chamber (Pf), and Initial temperature of the sensor chamber (Ti). In some embodiments, the concentration of the mix of sensor chamber gas and calibration canister gas (C) is calculated as:

$$C=[(Pf(Vs+Vc))-(PsVs/(R*Ti)]/(Pf(Vs+Vc)/(R*Tf))$$

where R is the ideal gas law constant.

Concentration C can be converted to ppm by multiplying by 1,000,000. If the calibration gas canister contains liquids instead of gas, then the above calculation needs to compensate for the enthalpy of vaporization. If a known concentration of calibration gas is used, instead of pure calibration gas, then the final concentration can be determined by multiplying by the known concentration.

Figure 39:
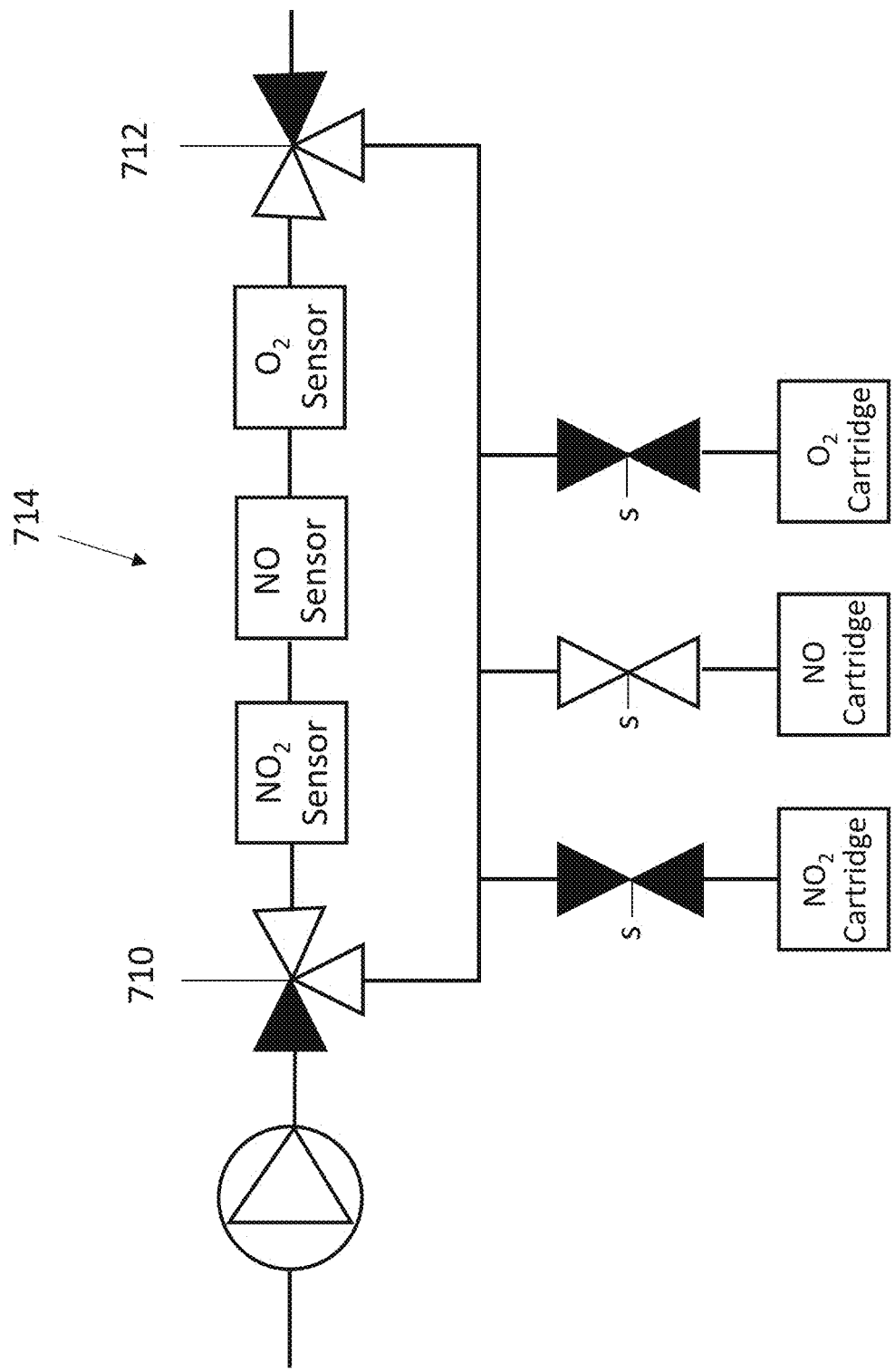
FIG. 39 is an exemplary embodiment of a gas sensor chamber.

In some embodiments, as depicted in FIG. 39, calibration gas canisters are in fluid communication with the gas sensor chamber. Three-way valves 710, 712 before and after the sensor chamber 714 in combination with binary valves at each calibration gas are used to control the exposure of gas sensors to one or more calibration gases. The three-way valves can be positioned to either flow sample gas through the gas sensor chamber or to close the gas sensor chamber off so there is a closed volume that can be exposed to a calibration gas. In some embodiments, gas sensors are exposed to calibration gas a predetermined time interval. In some embodiments, gas sensors are exposed to calibration gas during the system power-on self-test (POST). The calibration gas canisters are at a higher pressure than the gas sensor chamber. In some embodiments, the calibration gas binary valves are opened for a finite amount of time to deliver a known amount of calibration gas to the sensor chamber. This prevents the sensor chamber from being over-pressurized and prevents the calibration gas from being diluted by the sensor chamber gas.

Figure 40:
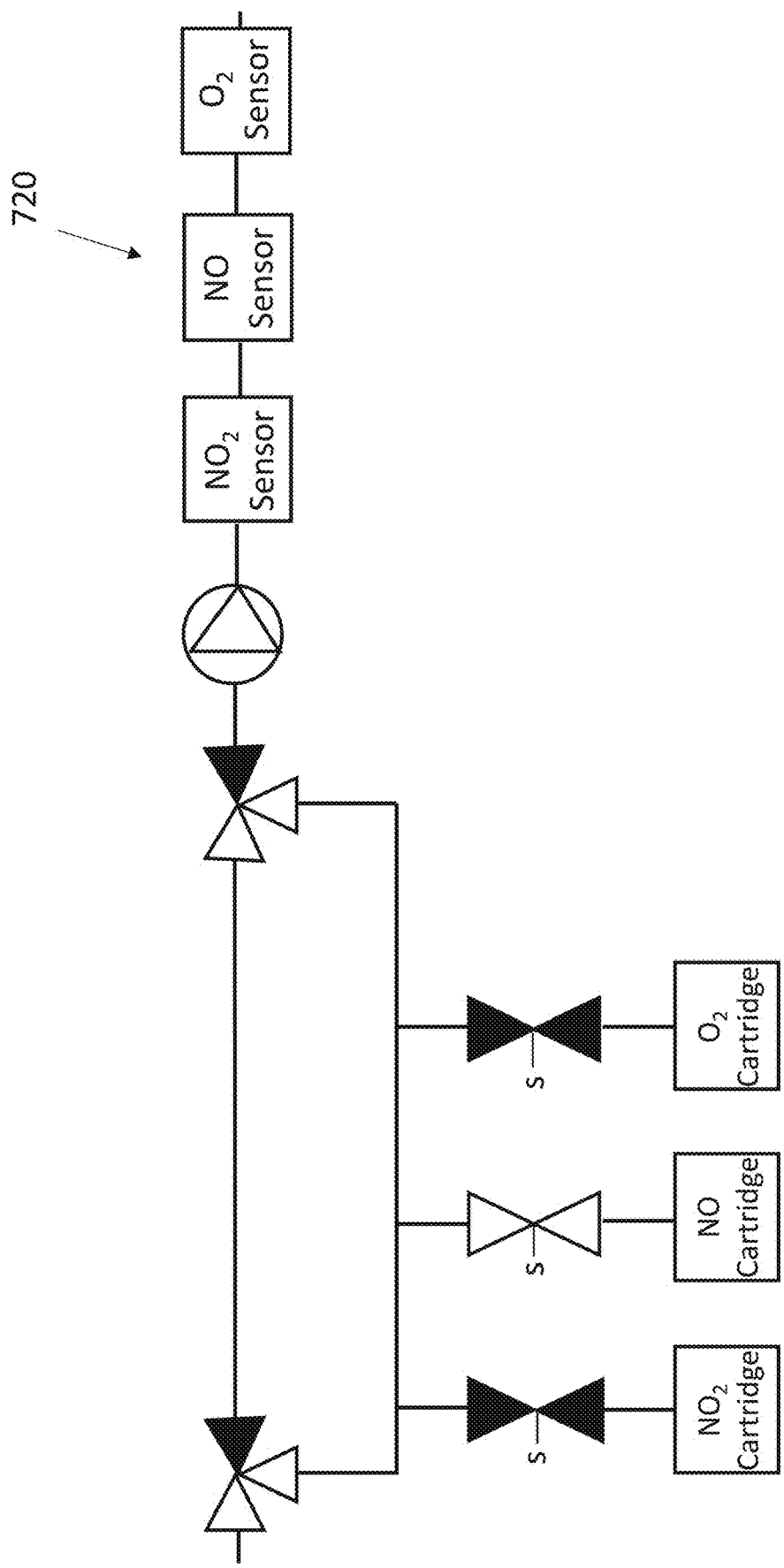
FIG. 40 is an exemplary embodiment of a gas sensor chamber.

FIG. 40 depicts an embodiment where the gas sensor sample pump can push either sample gas or calibration gas through the gas through the gas sensor chamber 720, depending on the position of three-way valves. Binary valves with flow controllers at each calibration gas meter the flow of calibration gas from the calibration gas canisters. In some embodiments, calibration gas flow is metered with one or more of a critical orifice, flow regulator, or pressure regulator.

Given that different batches of calibration gas may have varying concentration, additional accuracy can be achieved during gas sensor calibration by informing the controller of the actual calibration gas concentration. In some embodiments, the actual concentration of the calibration gas is manually entered into the user interface of the controller. In some embodiments, this information is entered via bar-code scan, RFID, Bluetooth, cloud communication, wired connection, pogo pins to an EEPROM chip and other means.

Not only can the steady-state calibration of a gas sensor be assessed with the aforementioned methods, but so too can the response time. In some embodiments, the T90 response time of a sensor is assessed by measuring the duration of time from initial expose of calibration gas to the point that the sensor reading reaches 90% of the steady state value. Electrochemical sensors can dry-out over time, resulting in slower responses to changes in gas concentration. The T90 time of an electrochemical sensor can be indicative of the condition of the sensor. In some embodiments, a NO generation and/or delivery system generates a warning or alarm notifying the User to replace a gas sensor based on the measured T90 time.

Gas sensor calibration is typically performed by passing a calibration gas of known concentration over a gas sensor so that the sensor outputs can be understood for a known input and adjustments can be made to the post-processing of the sensor output. This is typically done by using calibration gas from an external source that has a known concentration. Given that a NO generation device can generate NO, an alternative method to calibrating the internal gas sensors can be performed. In some embodiments, a NO generation device generates NO gas at a certain level and passes that gas to a calibrated reference sensor. The reference sensor may be internal to the NO generation device or an external NO sensor. In some embodiments, an external NO analyzer is used to accurately measure the output of the NO generator. The reading from the calibrated NO analyzer is entered into the NO generation device either manually by the user, or by a wired or wireless means. After obtaining an accurate concentration measurement, the system continues to generate product gas at the same settings and product gas is directed through the internal gas sensor chamber and measured. Product gas may reach the internal gas sensor chamber via an internal pneumatic pathway or external to the device by the user. The NO generation device then updates the calibration of the internal gas sensors accordingly to match the reading of the calibrated reference sensor. Depending on the complexity of the calibration curve, this could be as simple as gain and offset or involve more complex mathematics. For non-linear sensors, multiple calibration/production points may be necessary. The same approach can be used for $NO_2$ sensor calibration.

In some embodiments, the external NO analyzer is a portable device. In some embodiments, the NO analyzer contains a pump to generate flow through the device. In some embodiments, a NOx scrubber cleans the sample gas before it exits the analyzer into the environment.

In some embodiments, a $NO/NO_2$ gas analysis system has only a NO sensor in the gas bench. The NO sensor is used to measure NO in sample gas. A molybdenum (or other) type of wire/mesh is heated to >300 deg C. to convert $NO_2$ to NO. Then the NO sensor measures NO again, indicating the NOx level. The difference between NOx and NO measurements is the amount of $NO_2$, assuming 100% conversion of $NO_2$ into NO.

Figure 41:
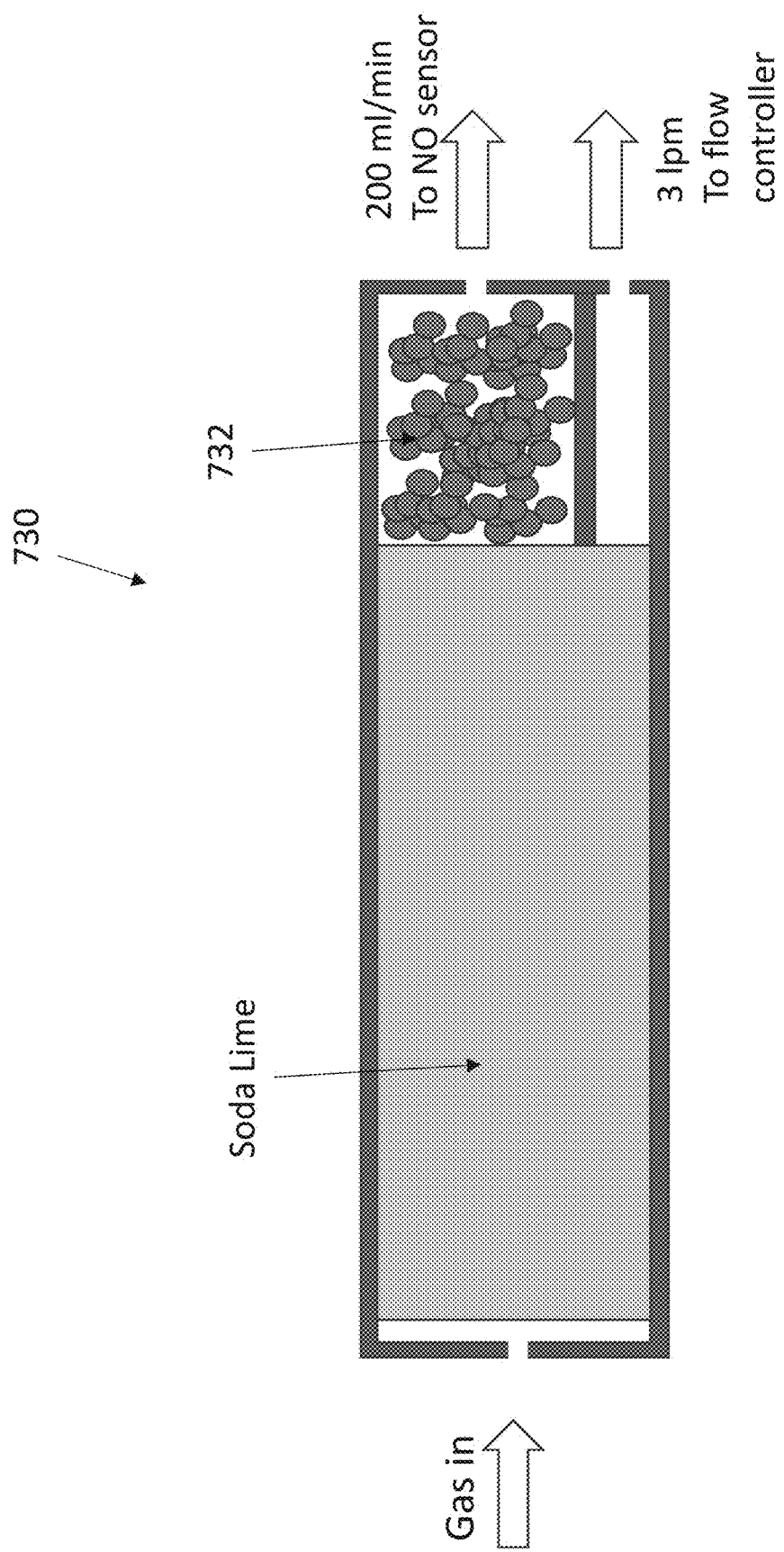
FIG. 41 is an exemplary embodiment of a humidity control element that has been integrated into a scrubber cartridge.

FIG. 41 presents an example of a humidity control element that has been integrated into a scrubber cartridge 730, such as a soda lime scrubber cartridge. A portion of product gas passes through a bed of humidified silica beads 732 prior to traveling to the NO sensor. The remainder of the product gas travels to the flow controller for injection into the patient or around the recirculation loop. In some embodiments, the silica beads are packaged in a separate removable cartridge. In some embodiments, water can be added to a silica bead cartridge to replenish the water content of silica beads. As silica beads dry out, their volume decreases which can increase the dead space within the gas flow path. Increases in dead space can create lag in the sample gas transit to the NO sensor and can result in NO loss due to NO oxidation. In some embodiments, the chamber housing the silica beads decreases in volume as silica beads decrease in volume to maintain minimal dead volume. In some embodiments, an elastomeric bag (balloon) is stretched over the silica beads to hold silica beads together and shrink in volume as the silica beads decrease in size. In some embodiments, a spring-loaded plunger maintains compression on the silica beads to prevent increases in dead volume within the bead chamber.

As beads dry out, their moisture content can be replenished. In some embodiments, a user can introduce water into the bead chamber, where the beads absorb the water. In some embodiments, water is introduced by using a syringe to inject water into the chamber through a syringe-actuated valve. In some embodiments, humid gas is passed through the bead chamber and the beads absorb water from the gas.

In some embodiments, product gas passes through Nafion tubing within a silica bead bed to draw humidity into product gas with less dead volume. In some embodiments, Nafion tubing passes through soda lime to pull humidity from the soda lime into product gas. In some embodiments, a scrubber cartridge also serves as a product gas humidification cartridge for product gas that will pass to an internal NO sensor.

Figure 42:
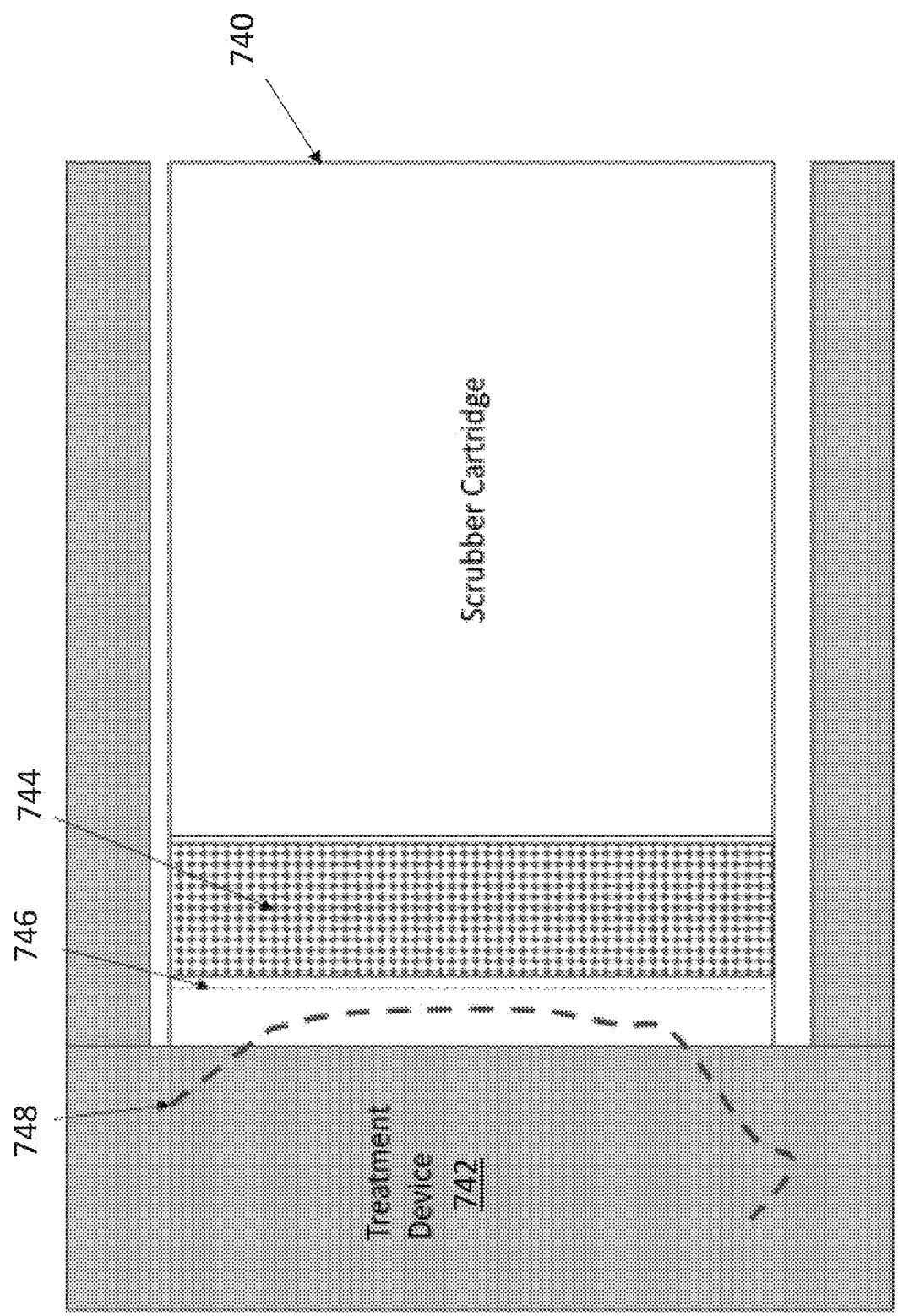
FIG. 42 is an exemplary embodiment a treatment device with Nafion tubing.

FIG. 42 depicts an embodiment where Nafion tubing is part of a treatment device. A removable cartridge 740 is inserted into a treatment device 742. The cartridge includes a chamber filled with humidification media 744 (e.g. silica beads). When the cartridge is fully inserted, a chamber is created by walls of the treatment device and walls of the cartridge. A perforated barrier 746 retains the beads within cartridge, while permitting humidity from the humidification media to permeate the newly-formed chamber. As product gas is passed through the Nafion tubing 748 by the treatment device, the Nafion pulls water into the product gas when the product gas has less humidity. This feature can be used to maintain an acceptable humidity level for gas sensors, soda lime scrubbers and other components of the system that could be affected by dry gas. In some embodiments, the perforated barrier is constructed of one or more of Gore-Tex, screen, filter media.

In some embodiments, Nafion tubing carrying product gas passes through a chamber of liquid water. The Nafion tubing transfers water molecules from the liquid into the gas to increase humidity within the gas. In some embodiments, the water is housed within an elastomeric container within the NO generator that can change in volume as water volume decreases. In some embodiments, water can be injected into the container to replenish the supply. In some embodiments, the entire chamber is replaced periodically. The NO generation system can determine when the water chamber needs to be replaced by the measured humidity of the product gas, the mass of the water chamber, elapsed time, water level within the chamber and other means.

In some embodiments, a $NO_2$ sensor measures product gas concentration within an NO generator. In some embodiments, the output of the product gas $NO_2$ sensor is used for one or more of determining when a scrubber is exhausted, confirming that plasma is functioning, monitoring system performance based on $NO/NO_2$ ratio, confirming that $NO_2$ levels entering the scrubber are acceptable for the scrubber. An $NO_2$ sensor can be located before or after the scrubber within a NO generator, depending on what output is desired. For example, to monitor scrubber performance, the $NO_2$ sensor would need to be located after the scrubber. However, to measure $NO/NO_2$ ratio of the system, the $NO_2$ sensor would be located prior to the scrubber.

In some embodiments, gas sensors located within a NO generation system are duplicated for redundancy. In some embodiments, two or more of an NO sensor, $NO_2$ sensor and PID sensor monitor the product gas within a NO generator. Utilization of two different kinds of sensors improves the robustness of a system by decreasing the potential for common mode failures.

Gas sensors within the recirculation loop may require periodic calibration and/or calibration checks. In some embodiments, a NO generation system has two or more, redundant recirculation paths. In some embodiments, the NO gas from one recirculation path can be plumbed into another recirculation path so that the NO sensors in each can be compared. In some embodiments, a recirculation system uses a source of calibration gas to calibrate the gas sensor(s) within a recirculation loop. In some embodiments, calibration gas enters the system through the same pathway as reactant gas. In some embodiments, a NO generation device includes a port to all calibration gas to enter from one or more of an external source, or an internal canister of calibration gas. In this way, the NO sensor in a recirculation path has fluid communication with an external NO source for calibration.

In some embodiments, the NO sensor is located after the scrubber to minimize effects from cross-sensitivity with $NO_2$. Furthermore, this location is beneficial because the scrubber removes pulsatility from the pump in the gas flow. In some embodiments, calibration of the NO sensor is checked by making measurements of electric NO generated by the system at known calibration set points of the NO generator.

In some embodiments, a NO generation and delivery device delivers low doses to a patient by delivering product gas to the inspiratory limb periodically. In some embodiments, product gas flow is continuous, but plasma generation is intermittent. In some embodiments, plasma activity in a continuous reactant gas flow is turned on for every second, third or nth breath to decrease the amount of NO delivered to a patient. In some embodiments, a patient is weaned from NO therapy by increasing the number of breaths skipped between NO doses. Skipping breaths allows the patient dose to be decreased in a predictable manner, independent of delivery device set-up (tubing length, humidifier presence, etc.).

In some embodiments, the two closed-loop flow controllers are utilized to target a constant plasma chamber flow. In some embodiments, a closed-loop flow control is utilized to control a flow divider delivering the flow to the patient and a closed loop pressure controller is utilized to maintain a constant pressure at the flow divider junction.

In some embodiments, the patient side flow path is used alone (100% of product gas flow) for all treatments except low dose treatments. During low dose treatments, a portion of the NO is trapped by the NOx scrubber in the exhaust side to enable a system to deliver low amounts of NO.

Flow Control

It will be understood that the use of "flow" in this document in the context of control and sensing includes "mass flow" and "volumetric flow" unless otherwise specified.

In some embodiments, a critical orifice in the flow path of an ambulatory device keeps a constant flow rate. In some embodiments, this feature is used to limit the overshoot in flow rate at the onset of a therapeutic gas pulse.

In some embodiments, the flow through a plasma chamber decreases as the pressure in a reactant gas reservoir decreases. In some embodiments, the pressure within the reactant gas reservoir is used as a proxy for flow through the plasma chamber. In some embodiments, plasma activity in the form of frequency, duty cycle, and/or power are adjusted based on the reactant gas reservoir pressure in order to produce a target amount of NO.

Figure 43:
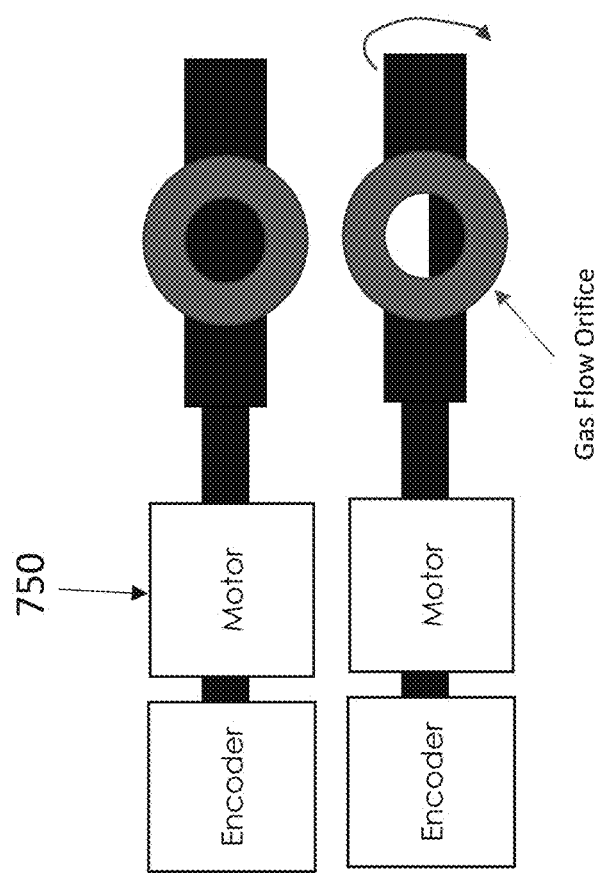
FIG. 43 depicts a NO generation system with a stepper motor that can be used to actuate a valve to control the flow of gas through a plasma chamber.

In some embodiments, a stepper motor 750, as shown in FIG. 43, can be used to actuate a valve to control the flow of gas through a plasma chamber. In some embodiments, the shaft of the stepper motor is directly connected to a butterfly valve. In some embodiments, the shaft of the stepper motor is passes through a gas flow lumen and is shaped to have a non-circular cross section in the area of gas flow so that rotation of the shaft results in varying degrees of gas lumen obstruction to control gas flow. In some embodiments, an encoder on the shaft is used for control purposes. In some embodiments, a gear train, pulley, timing belt or other means is used to increase or decrease the shaft speed with respect to the stepper motor speed. This can provide faster response and/or greater precision than a solenoid valve, depending on the gear ratio. The use of an encoder or other means of flow control is beneficial because it can be more reliable than a flow sensor exposed to NO and $NO_2$ in some applications.

In some applications, NO and $NO_2$ compatibility is a concern with the flow sensor. In some embodiments, one or more of the flow sensing and flow control elements are replaceable. In some embodiments, a flow sensor is included in a scrubber cartridge, for example. In some embodiments, the diaphragm and check valves of a pump are included in a replaceable cartridge.

Figure 44:
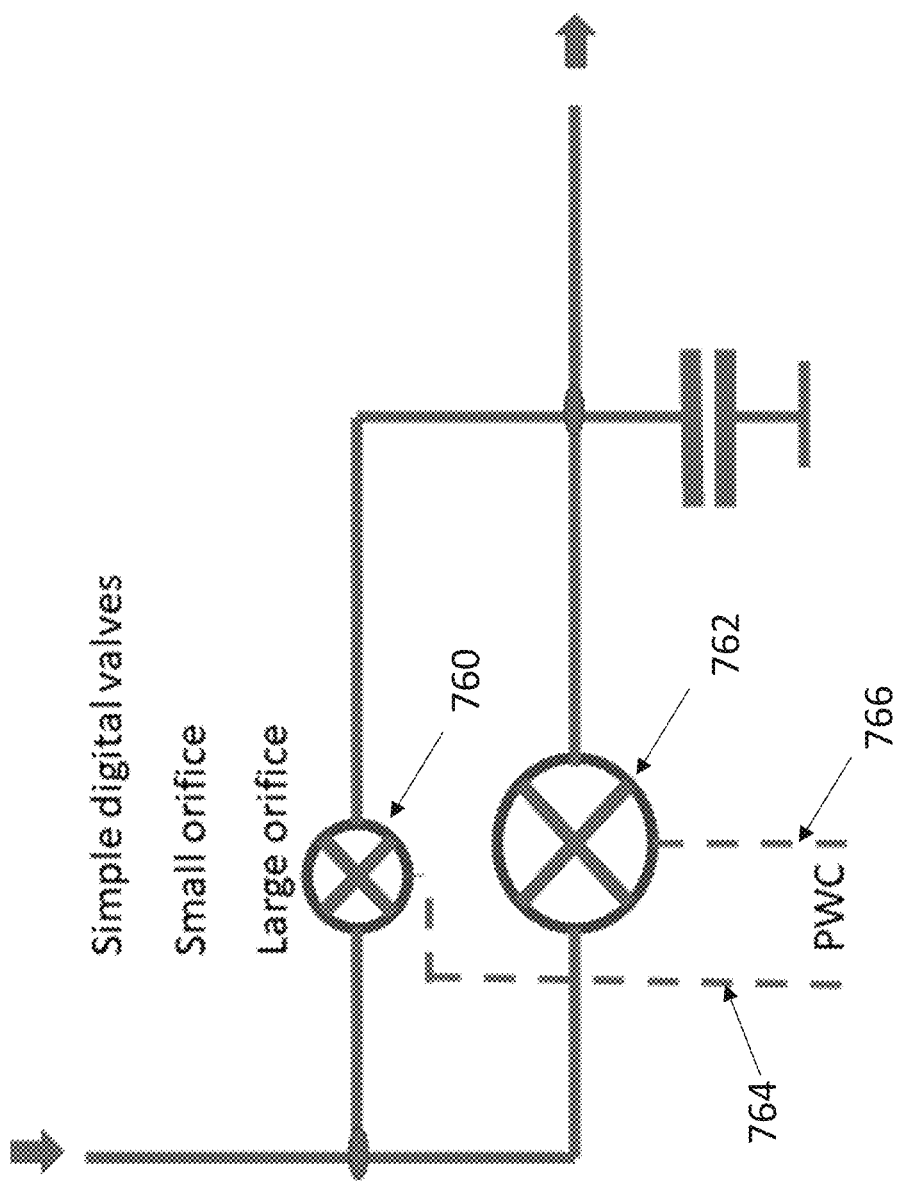
FIG. 44 illustrates an embodiment of an NO generator using two digital values in parallel.

In some embodiments, an NO generation system includes a digital (on/off) valve to control reactant gas flow with a pneumatic capacitor (reservoir and/or scrubber volume) downstream to smooth out the flow. For example, the flow control of a proportional valve can be replicated with a digital valve. It is also possible to utilize multiple digital valves. In some embodiments, two digital valves can be used in parallel to have 4 flow states (no flow, small valve open, large valve open, both valves open). The pneumatic equivalent of a capacitor (a reservoir or accumulator or long tube) can be used to smooth out the transitions between flow states. It can be understood that any number of valves can be used. This approach reduces complexity in the flow control at the expense of resolution/accuracy. FIG. 44 illustrates an embodiment of using two digital valves 760, 762 in parallel. In some embodiments, the valves can be pulse-width modulated to provide flow resolution between each of the flow states. Pulse-width modulation control signals are depicted as dashed lines 764, 766 in the FIG. 44.

A plasma in the presence of an air flow can be elongated and unstable, affecting the stability of NO production. In some embodiments, reactant gas flow increases proportionally with ventilator flow up to a point and then remains constant to ensure arc stability. This effectively clips NO production at a certain level if the system is designed to maintain a constant concentration of NO. In some embodiments, plasma activity (duty cycle, frequency, power, etc.) are increased with concomitant increases in reactant gas flow to further increase in NO production. In some embodiments, plasma activity increases with reactant gas flow rate to ensure constant concentration NO product gas.

System delays in detecting and responding to a pulse can lead to a lag in NO pulse with respect to ventilator pulse. In some embodiments, the NO pulse purposely overshoots the target to make up for lag in NO delivery. In some embodiments, the target level of overshoot is set so that the number of moles of NO delivered per breath correct.

Figure 45:
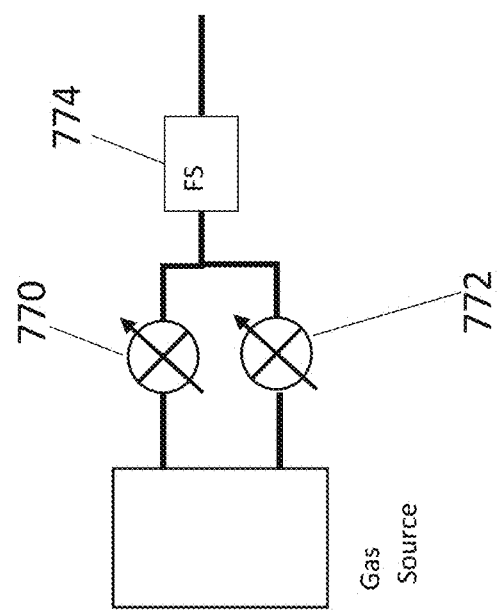
FIG. 45 depicts a NO generation system with a flow sensor that generates an alarm when the measured flow is outside of an expected range.

In some embodiments, more than one flow controller is used to provide greater resolution, dynamic range and control of a reactant gas flow and/or a product gas flow. In some embodiments as shown in FIG. 45, a first flow controller 770 increases flow to a maximum prior to a second flow controller 772 increasing flow to its maximum, the total flow being the sum of the flow through both flow controllers 770, 772. In some embodiments, a low flow controller and a high flow controller are used in parallel to provide reactant gas to one or more plasma chambers. In some embodiments, a low flow controller provides flow from 0 to 1 lpm and a high flow controller provides flow from 1 to 10 lpm, or the ranges are balanced such that two controllers have equal dynamic ranges. In some embodiments, a flow sensor 774 is used to measure the combined flow of one or more flow controllers upstream and generate an alarm when the measured flow is outside of an expected range, as shown in FIG. 45.

In some embodiments, redundant electrodes are placed in series within a single reactant gas flow path, thereby reducing the size and mass while retaining electrical redundancy. In some embodiments, a single pneumatic reservoir can be used to feed two parallel flow controllers in order to minimize size and weight. In some embodiments, two pumps in parallel pressurize a single pressure reservoir to reduce size and weight of an NO generation system.

Figure 46:
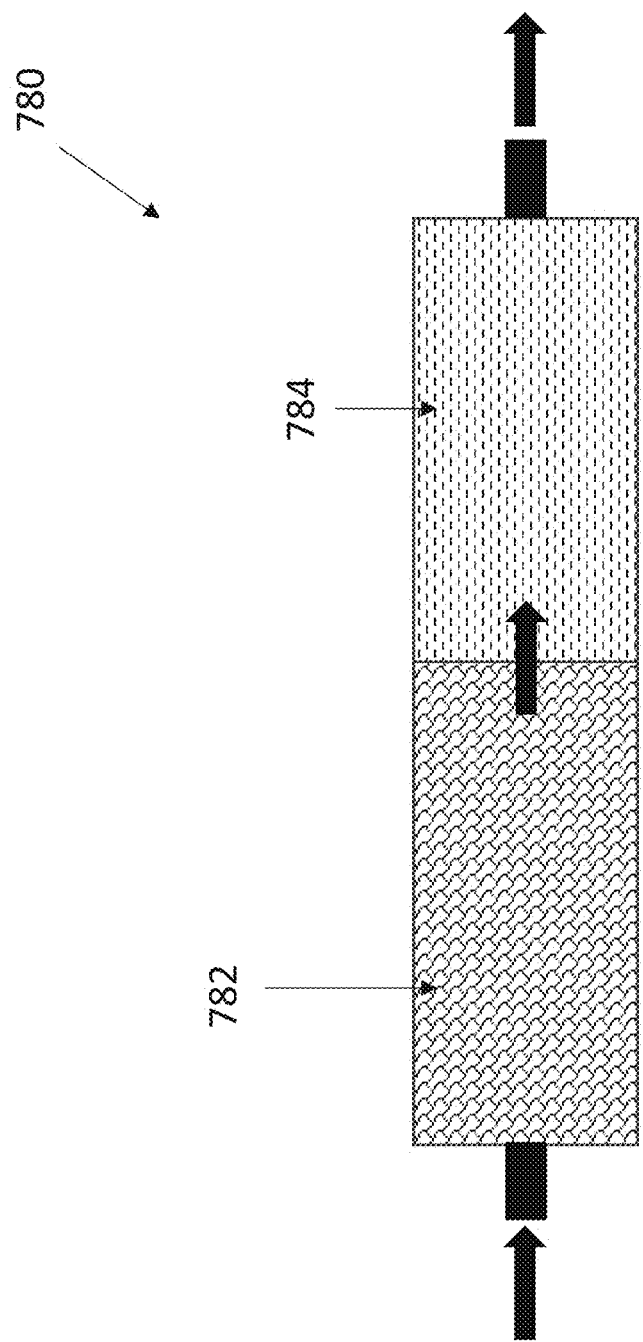
FIG. 46 depicts a potassium permanganate scrubber in series with a soda lime scrubber.

In some embodiments, a purge valve in the system can be used to direct NOx-containing gas out of the system without sending it to the patient inspiratory stream. The purge valve may be located before or after the scrubber. In some embodiments, a NO scrubber and $NO_2$ scrubber scrub the diverted product gas before it is ejected from the system. In some embodiments, excess NO and $NO_2$ produced can be absorbed by a NOx scrubber 780 comprised of a mixed base/potassium permanganate 782 and soda lime 784. FIG. 46 depicts a potassium permanganate scrubber in series with a soda lime scrubber. The potassium permanganate removes NO prior to the soda lime removing $NO_2$. Because NO converts into $NO_2$, it is removed first from a gas stream in this embodiment. In some embodiments, a NOx scrubber is comprised of zeolite.

In some embodiments, flow to the patient and to another place (purge, recirculation, etc.) is controlled by a flow controller comprised of two, complimentary flow controllers. The system includes two proportional flow valves with identical orifices, where the flow through each of the flow valves is controlled to always have the same combined flow. In some embodiments, closed-loop flow control applies a duty cycle ("DC"=range of 0 to 1) to one valve, and the other valve is controlled to 1-DC. In this way, flow will be proportionally divided. In some embodiments, a proportional flow valve is in parallel with a tuned orifice size. The circuit is characterized such that a known flow can be sent through either channel.

In some embodiments, product gas is cooled before it enters the scrubber to ensure that the relative humidity does not dry out the scrubber material. This can slow the reaction rate of NO to $NO_2$. In some embodiments, a humidity exchange membrane (e.g. Nafion) is used to prevent condensation of water from the reactant gas and/or product gas within the recirculation loop. In some embodiments, the temperature of the recirculation loop is kept sufficiently high to prevent condensation within the recirculation loop.

In some embodiments, a NO generator measures inspiratory flow and introduces product gas to a ventilator circuit at or near the ventilator and scrubs inspiratory gas prior to inspired gas sample collection and patient inspiration. In some embodiments, multiple inspiratory flow sensors are used for redundancy. Depending on the $NO_2$ content of the product gas, a scrubber component may be located within the NO generator. Typically, NO is injected after the inspiratory flow sensors to protect the flow sensors from corrosive gas and so that the measured value is not the sum of inspiratory flow+injected flow. One benefit from this approach is that the flow inspiratory flow scrubber near the patient acts as a mixing chamber to homogenize the NO concentration within the inspiratory stream. This enables the use of less accurate, cleanable inspiratory flow sensors in some applications. Additional benefits include the following: enables the NO generation device to be smaller because flow measurement is done externally, inspired $NO_2$ levels are very low. Volume of the NO injection tube should be as minimal as possible to prevent lag in NO delivery. In some embodiments, two scrubber cartridges are located in parallel within the inspiratory limb and used one at a time to ensure continuous NO delivery during scrubber replacement. In some embodiments, the inspiratory scrubber and gas sampling port are located before the humidifier, protecting the scrubber and sampling port from potential condensate. In some embodiments, sample gases are removed from the scrubber component, rather than the inspiratory limb.

Figure 47:
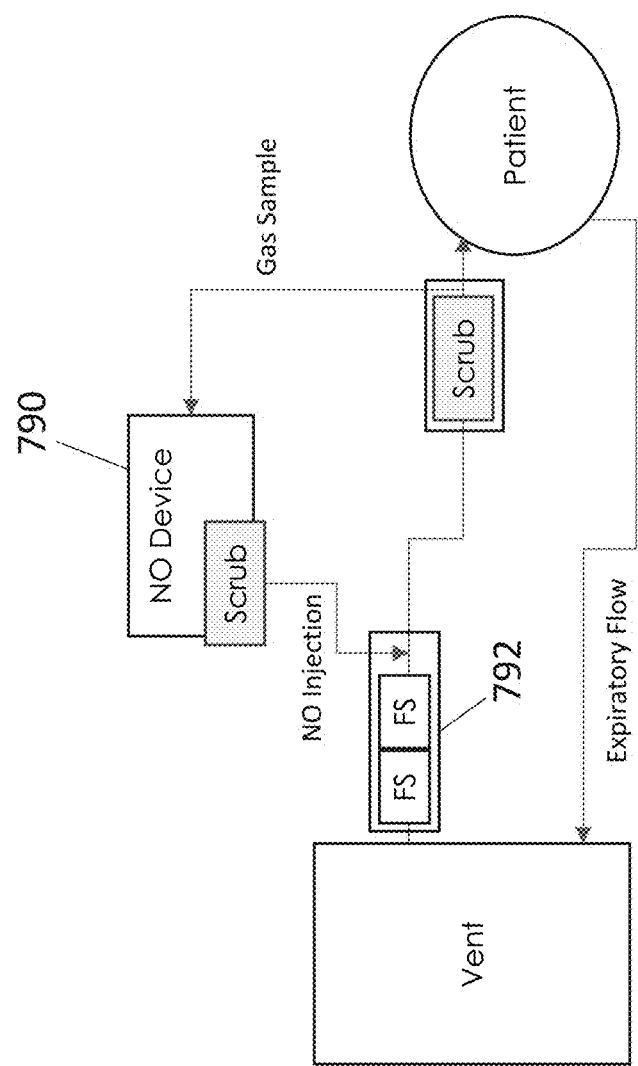
FIG. 47 shows inspiratory gas flow through a module with dual flow sensors and a NO injector.

In FIG. 47, inspiratory gas flows through a module 792 with dual flow sensors and a NO injector. Dual flow sensors can be used to provide a redundant inspiratory flow measurement to aid in detection of a faulty flow sensor. In some embodiments, the ventilator informs the NO device 790 of the flow rate and the injector module does not include the flow sensors. The gases continue through an optional humidifier (not shown) and through a second module containing $NO_2$-scrubbing material and a port for removing gases for sampling. By scrubbing the inspiratory gas near the patient, inspired $NO_2$ levels can be minimized. Combining the scrubber and the sample port does not add any use steps to setting up the sample line.

Figure 48:
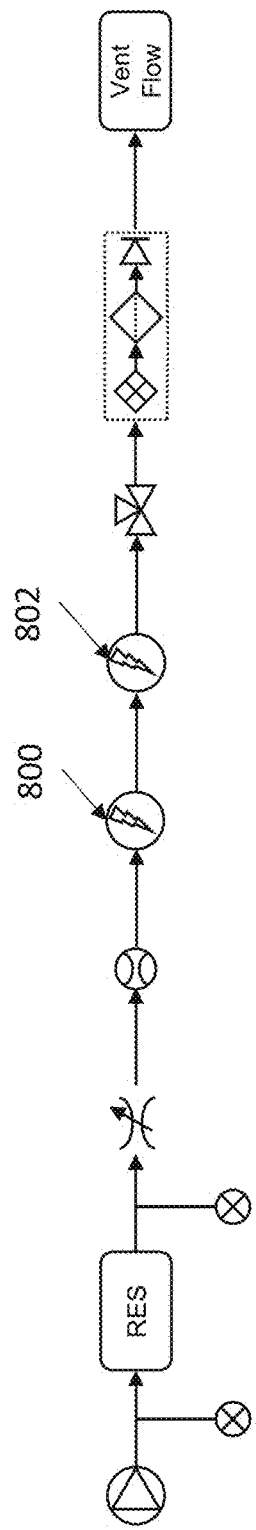
FIG. 48 illustrates an embodiment of the system having multiple plasma generators in a single flow path.

It is possible for the system to function with little or no redundancy as well. In some embodiments, an NO generation system can have one plasma chamber with two or more electrode pairs and two or more high voltage assemblies (HVAs). A system with a single plasma chamber can provide reductions in size and mass while still retaining adequate reliability. In some embodiments, electrode pairs are used one pair at a time with similar reactant gas flow rates to a single electrode pair design. In some embodiments, the additional electrode pairs are used simultaneously, enabling the system to generate higher concentrations of NO. In some embodiments, less flow is needed to generate a target number of moles of NO thereby reducing the reactant gas flow and dilution of the patient inspiratory flow. It will be understood that an electrode can be any device which creates an electric field in the path of the reactant gas flow of sufficient strength to ionize the reactant gas. FIG. 48 illustrates an embodiment of the system having multiple plasma generators, such as plasma generators 800, 802, in a single flow path.

Figure 49:
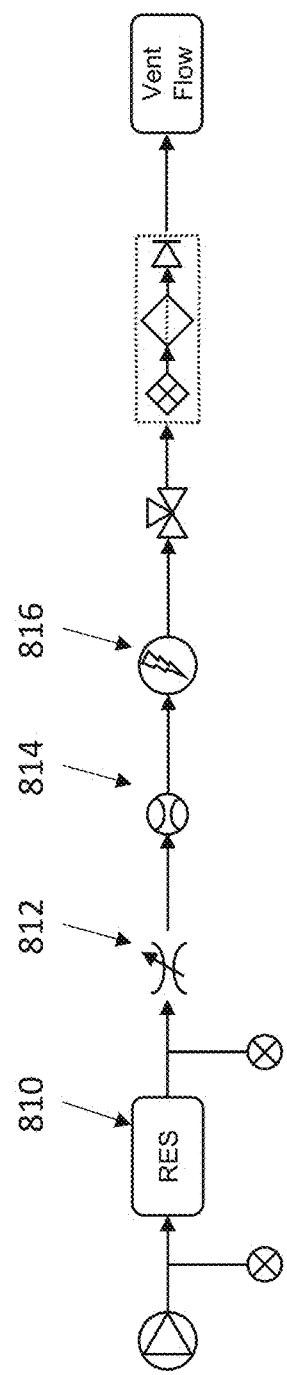
FIG. 49 illustrates an embodiment of a closed loop flow controller having a single flow control and a single plasma generator.

Flow control within an NO generator can be key to generating constant concentration NO within an inspiratory flow. Flow control can be affected by system variables, including but not limited to operating temperature, reactant gas pressure, reactant gas flow rate, flow controller age, flow controller wear, flow controller temperature, and other factors. In some embodiments, a reactant gas flow controller is controlled using a closed-loop approach using the target plasma chamber flow rate and measured plasma chamber flow rate as inputs. In some embodiments, the plasma chamber pressure is used as an input for closed loop control. In some embodiments, the product gas flow rate is used as a control loop input signal. In some embodiments, the reactant gas and/or product gas flow rate are used for partial control to trim the output of a flow controller. FIG. 49 illustrates an embodiment of a closed loop flow controller having a single flow control and a single plasma generator. In FIG. 49, reactant gas enters a pump and enters a reservoir 810. A flow controller 812 at the exit of the reservoir controls the flow of pressurized reactant gas exiting the reservoir. The flow of reactant gas is measured by a flow sensor 814 prior to entering the plasma chamber 816. The measurement of reactant gas flow is used as an input to adjust the flow controller setting (dashed line). After the plasma chamber, a scrubber/filter cartridge cleans the product gas prior to injection into an inspiratory flow.

Figure 50A:
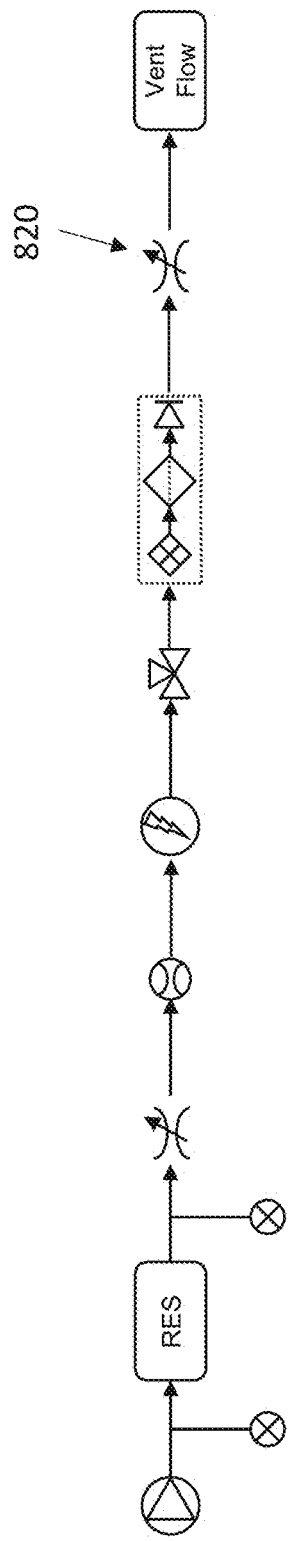
FIG. 50A illustrates an embodiment of a closed loop flow controller with an additional control of injected flow with a second proportional valve.

Multiple flow controllers can also be used. In some embodiments, there is an upstream flow controller that controls the flow of reactant gas into one or more plasma chambers and there is a downstream flow controller that controls flow of product gas into an inspiratory flow. This allows for the build-up of pressure in the product gas flow path in between patient breaths and/or when a bias flow is flowing, enabling a more rapid rise of NO flow during an inspiratory event. In addition, the downstream flow controller can be used to shut off plasma flow more quickly than an upstream flow controller if/when inspiration ends. The space between first and second flow controller is essentially a second reservoir. In some embodiments, the dead volume within a scrubber is utilized as a reservoir/accumulator for product gas. FIG. 50A illustrates an embodiment of a closed loop flow controller with an additional control of injected flow with a second proportional valve 820. In this embodiment, pressurized, scrubbed NO is available to the secondary flow controller, enabling the system to introduce NO to the variable inspiratory flow with minimal lag.

Figure 50B:
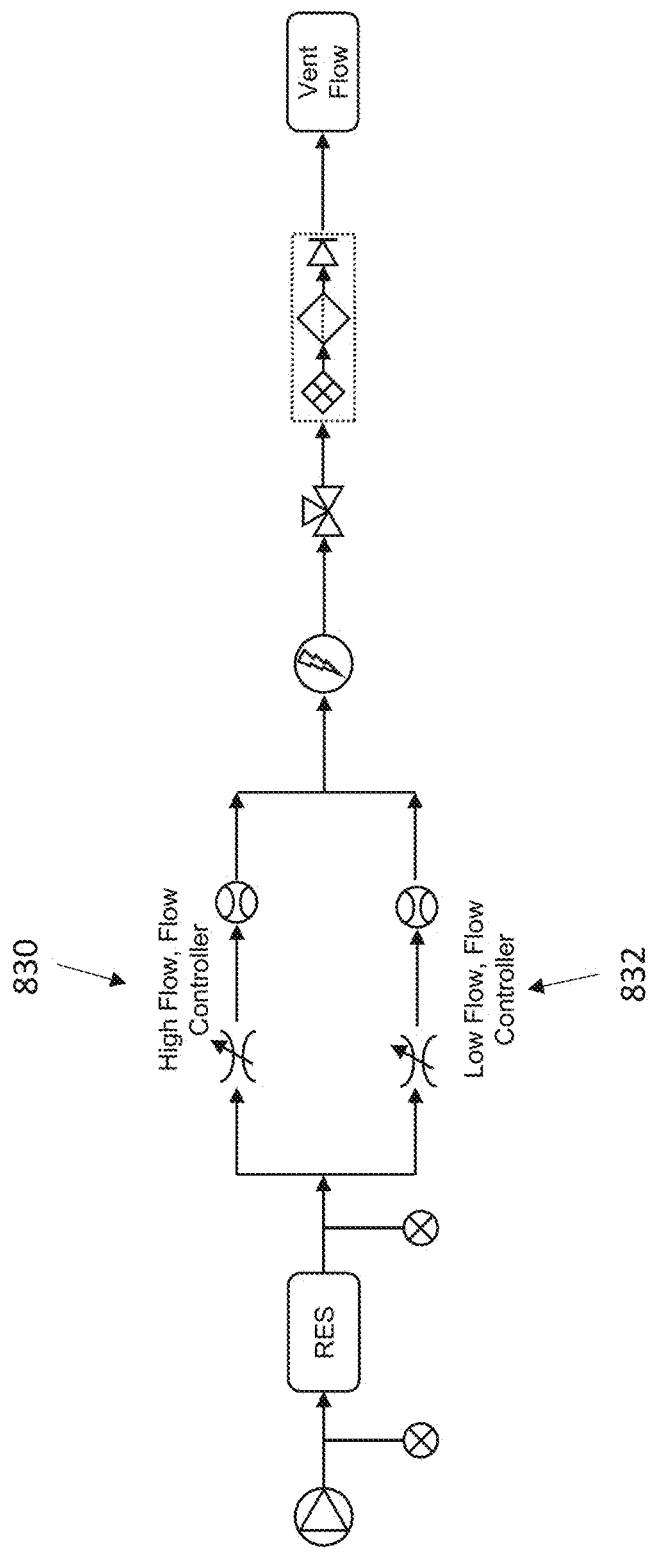
FIG. 50B illustrates an embodiment of a closed loop flow controller with a high and low flow control.

FIG. 50B illustrates an embodiment of a closed loop flow controller with a high and low flow control 830, 832. This approach provides finer resolution flow control at low flows to enable accurate dilution of low inspiratory flows with NO product gas.

In some embodiments, a proportional valve can be used to regulate the reactant gas flow. In some embodiments that provide improved flow accuracy at high and low flow rates, two or more binary valves are placed in parallel upstream of the proportional valve to provide up to 4 states of gas flow to the proportional valve: off, low, medium and high flow.

In some embodiments, two parallel flow paths each containing proportional valves and flow sensors provide high and low flow control, respectively for one or more plasma chambers.

In some embodiments, a NO generation system varies the pressure in a reservoir based on the flow rates required for a particular treatment. In some embodiments, the NO generation system pressurizes a reservoir to a lower pressure for low flow treatments, requiring the proportional valve to open more to achieve higher flows, thereby actuating the proportional valve over a broader range of positions for improved fidelity. In some embodiments, a NO generation system pressurizes a reservoir to a higher pressure to enable the system to generate faster flow rates required for a treatment. In some embodiments, the pressure of the reservoir is 2 atm.

Flow Measurement

Figures 51A, 51B:
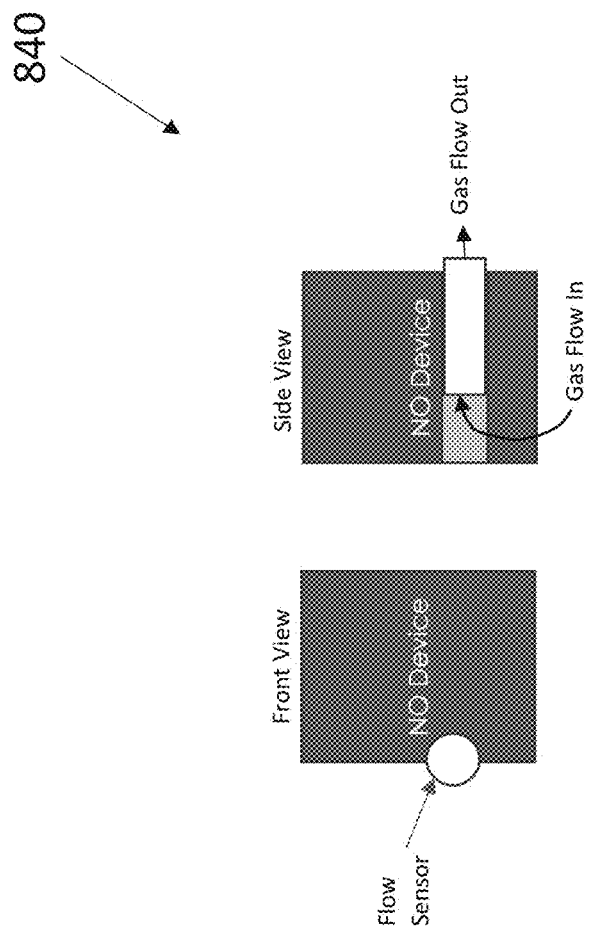
FIG. 51A and FIG. 51B show an embodiment of an NO generation system that includes a patient inspiratory flow sensor.

In some embodiments, a patient inspiratory flow sensor snaps into the side of a controller to enable straight-though flow which facilitates cleanability. In some embodiments, patient inspiratory flow enters the flow sensor at the back of the sensor and flows towards the front of the NO device 840, as shown in FIGS. 51A and 51B. In some embodiments, NO is added to the inspiratory flow within the flow sensor module, but typically after the flow sensing components.

In some embodiments, the system can detect reverse flow within the ventilator circuit of sufficient magnitude and duration to potentially contaminate the ventilator cartridge and alerts the user. In some embodiments, the inspiratory flow magnitude and duration are used to calculate a volume of gas and compared with the volume of the inspiratory limb. If the volume of reverse inspiratory flow is greater than the volume of the inspiratory limb, there is a risk of contamination of the NO generation system.

Under certain conditions, such as relaxing compliance in the ventilator tubing at the end of inspiration, air flow through the ventilator cartridge can flow in reverse. Under some circumstances this could result in air getting dosed twice, resulting in inaccurate dose levels delivered to the patient. In some embodiments, the system measures the volume of air that flowed in reverse and suspends injection of additional NO until forward flow cancels the reverse flow.

Reactant Gas Preparation

In some embodiments, a chemical filter on the inlet can be used to remove contaminants before the plasma. In some embodiments, the chemical filter includes activated charcoal.

In some embodiments, Gore-Tex filters prevent liquid water from entering the system.

In some embodiments, NO generation systems operate continuously, providing un-interrupted therapy to a patient. Thus, the flow of reactant gas and the filtering and/or scrubbing thereof should be continuous. It follows that in a NO generation system with multiple scrubber cartridges, it is important to ensure that incoming reactant gas is still filtered when a scrubber cartridge is removed. In some embodiments, a NO generation system changes channels to second NO generator and scrubber when a first scrubber is removed. In some embodiments, a first NO generator is able to source reactant gas from a second location when a first scrubber is removed.

Figure 52:
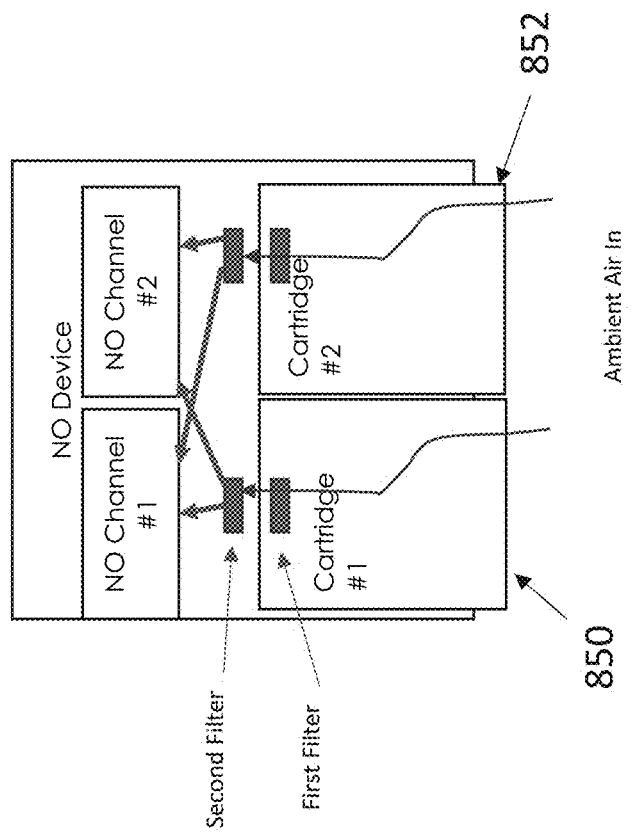
FIG. 52 shows an embodiment of an NO generation system that includes a two-channel system with two cartridges.
Figure 53:
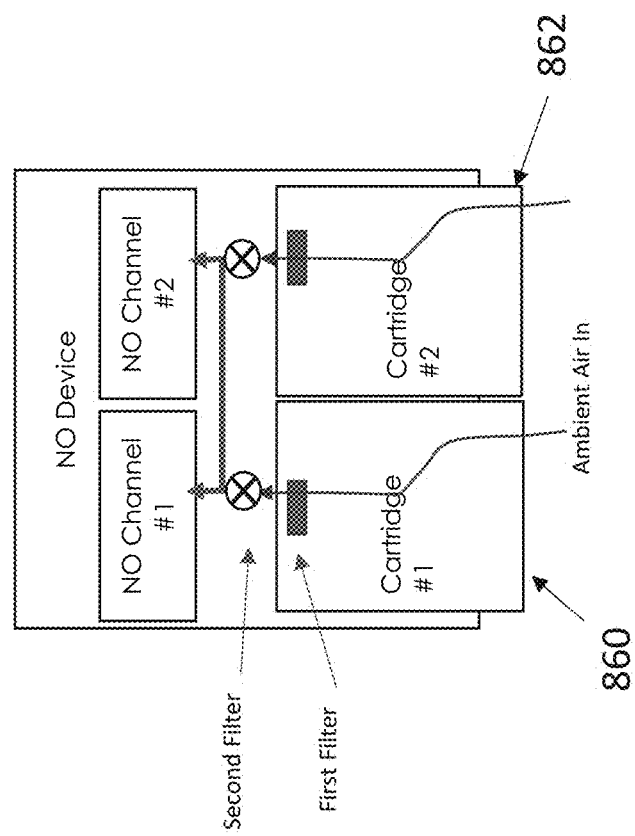
FIG. 53 shows an embodiment of an NO generation system that includes valves in the reactant gas pathway.

In some embodiments, reactant gas passes through a first filter located within a scrubber cartridge followed by a second filter located within the NO generation device. The second filter protects the system from particulates when a scrubber cartridge has been removed. In FIG. 52, a two-channel system with two cartridges 850, 852 is shown. When a first cartridge 850 is removed, reactant gas can be sourced through the second cartridge 852 or through the built-in filter in the system. In some embodiments, valves are used in the reactant gas pathway to ensure that reactant gas only enters the system through a filtered source, as shown in FIG. 53. When a cartridge 860 is removed, the gas flow path is blocked by closing a valve and reactant gas is sourced from the other scrubber cartridge 862.

Figure 54:
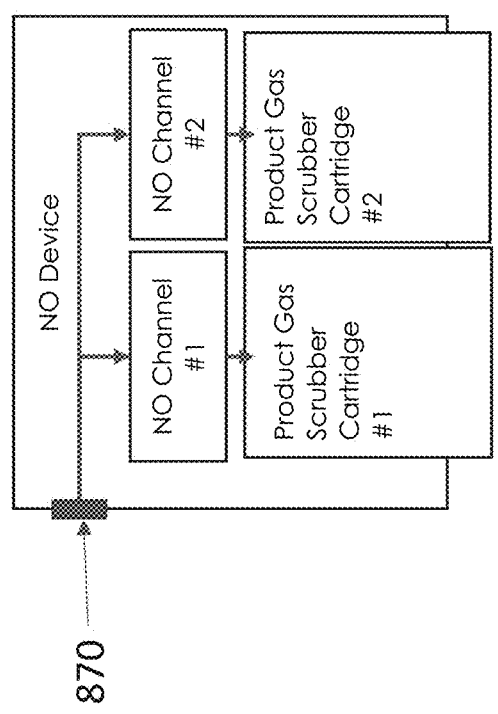
FIG. 54 shows an embodiment of an NO generation system that includes a scrubber for reactant gas and a scrubber for product gas.

In some embodiments, reactant gas is filtered and/or scrubbed by a separate filter/scrubber 870 than the product gas filter/scrubber, as shown in FIG. 54. This enables replacement of $NO_2$ scrubber cartridges without an interruption to reactant gas availability.

In some embodiments, a NO generation and delivery system includes a reactant gas inlet connector for sourcing pressurized reactant gas. In some embodiments, the system can switch between sourcing reactant gas from the gas inlet connector and sourcing reactant gas from the environment via pump. In some embodiments, the system preferentially operates with reactant gas externally sourced from the system to minimize acoustic noise generated by the system which could otherwise be disruptive in a hospital setting. When the NO generation and delivery system is put in transport mode, the system automatically converts to sourcing reactant gas via pump. In some embodiments, the source of reactant gas is manually selected by the user.

$NO_2$ Scrubbing

Figure 55:
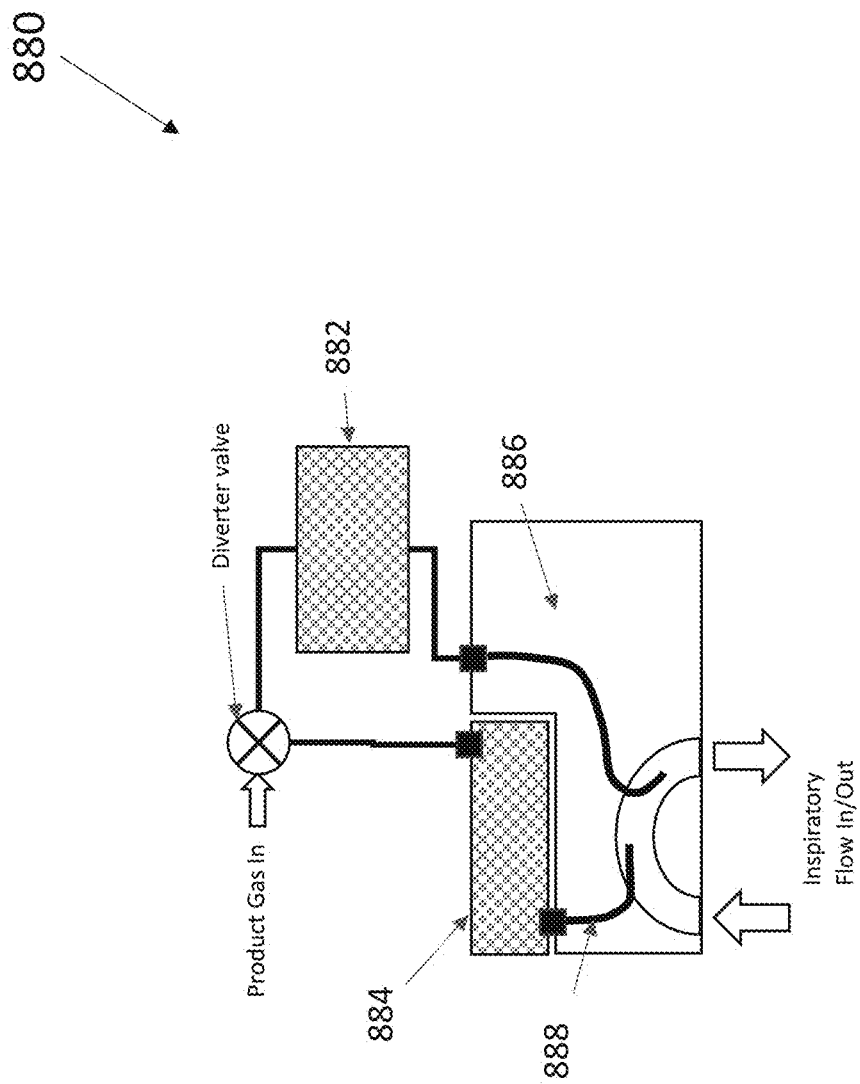
FIG. 55 shows an embodiment of an NO generation system that has the ability to bypass the primary scrubber cartridge.

When a scrubber cartridge is replaced, there can be an interruption in NO delivery. In some embodiments, product gas is not scrubbed during the brief time it takes to replace a scrubber cartridge. In some embodiments, a NO generation system 880 directs product gas through a secondary scrubber cartridge 884 when a primary scrubber cartridge 882 has been removed, as shown in FIG. 55. In some embodiments, product gas is routed through a second scrubber located within the NO generation device. This second scrubber is replaceable, but less frequently since it is only used when the primary scrubber cartridge is not present. In some embodiments, the secondary scrubber is only replaced during annual servicing. In some embodiments (shown), the secondary scrubber is located behind a ventilator cartridge 886. In some embodiments, the secondary product gas path has a separate injector 888. In some embodiments, flow from the secondary scrubber and the primary scrubber merge prior to a single injector. Check valves (not shown) can be used as needed, to prevent gas in the inspiratory path from leaking out when the primary scrubber is removed and/or leaking into the secondary scrubber.

Clinical Applications

Various therapies can be used with an NO generation device. In some embodiments, an NO generation and delivery device can be combined with a humidifier.

In some embodiments, an NO generation and delivery device is in the form of an ET tube. In some embodiments, the ET tube generates NO continuously with NO-containing gas entering and exiting the patient. In some embodiments, the system only generates NO as inspiratory gas enters the patient. The system can use a flow sensor to measure inspired gas and generate plasma accordingly. In some embodiments, the device pulses plasma constantly at an adjustable frequency and or duty cycle. The user can increase plasma activity to vary the dose.

In some clinical applications in home and/or in hospital, it can be advantageous to inhale NO for short intervals, periodically. In some embodiments, a patient inhales NO concentrations in excess of 80 ppm for several minutes, multiple times a day to treat or prevent pulmonary infection. In some embodiments, the range of inhaled NO concentration to prevent infection can be 100 to 300 ppm. NO delivery means for periodic dosing include but are not limited to an inhaler, an ambulatory device, a ventilator, an oxygen concentrator, and a NO tank. Treatments at high NO concentration can be based on elapsed time or clinical parameters, such as methemoglobin level. In some embodiments, a NO delivery system measures and/or receives methemoglobin readings and terminates a treatment when methemoglobin levels reach a threshold. In some embodiments, a NO delivery system can resume NO delivery when methemoglobin levels fall below a threshold.

In some clinical applications, a patient inhales NO on an as-needed basis. For example, after a short walk, ascending a flight of stairs, when their $SpO_2$ is low, when $O_2$ needs are high. In some embodiments, a NO delivery device permits the patient to select a dose within a pre-determined range. In some embodiments, a NO delivery device limits the amount of NO a patient can inhale over a period of time.

There are also a variety of clinical applications of inhaled NO in a hospital/clinical setting. Clinical applications include but are not limited to respiratory failure of prematurity, bronchopulmonary dysplasia (infants), serious lung infection, respiratory failure in the intensive care unit (PCU) or pediatric intensive care unit (PICU), heart surgery, acute iNO testing in pulmonary hypertension (PH) or chronic pulmonary hypertension (e.g. PAH), cardiac surgery in the USA, acute respiratory distress syndrome, cardiopulmonary resuscitation, cardiopulmonary bypass prevention of renal injury, acute stroke and traumatic brain injury, and acute ST-Elevation myocardial infarction (STEMI).

In some embodiments, a clinical application can include the prevention and/or treatment of ventilator associated pneumonia. NO is an anti-infective agent currently being explored in cystic fibrosis (CF) for mycobacterial infections and bacterial infections, e.g *pseudomonas*. It can be used with prolonged ventilated patients to reduce ventilator associated pneumonia.

In some embodiments, a clinical application can include periodically dosing a patient with NO to prevent ventilator associated pneumonia. In some embodiments, a ventilator that generates NO periodically doses a patient to prevent ventilator associated pneumonia.

In some embodiments, a clinical application can include Acute Right Heart Failure (diverse etiology) including pulmonary embolism. In this application, NO decreasing the pulmonary resistance, thereby offloading the right heart.

In some embodiments, a clinical application can include Administration with hemoglobin oxygen carriers and stored blood. Hemoglobin-based oxygen carriers (HBOCs) or hemoglobin based oxygen carrying solutions (HBOCs) can cause scavenging of NO and systemic and pulmonary vasoconstriction inhibited by iNO. Hemolyzed blood scavenges NO leading to systemic and pulmonary vasoconstriction.

There are also a variety of clinical applications of inhaled NO in an Ambulatory setting, including the following:
  WHO Group 1 PAH—Potential to subtype e.g. idiopathic, familial etc., pediatric PAH, and PAH during pregnancy (avoids toxicity from PAH drugs)
  WHO group 2 PAH—Selected well-controlled patients with left heart failure (risk of pulmonary edema, and LVAD recipients with right heart disease (RHD) and pulmonary hypertension (PH) (Orphan)
  WHO group 3 PH—PH-ILD or subtype ILD e.g. IPF, CT-related ILD, cHP, etc., PH-COPD, and Combined pulmonary fibrosis emphysema (CPFE)
  WHO group 4 Chronic Thromboembolic PH (CTEPH)—Improve right heart disease (RHD) Sarcoidosis
  Right heart dysfunction, diverse etiology—Afterload reduction even in absence of pulmonary hypertension (PH), and Etiologies include ischemic heart disease, valvular disease etc.
  Infectious diseases, such as cystic fibrosis e.g. *pseudomonas, B. Cepacia*, NTM, Multiple Drug-resistant tuberculosis, Non-tuberculous mycobacterial infection (NTM), and Bronchiectasis
  Bridge to lung and/or heart transplant—Addresses pulmonary hypertension (PH), oxygenation, RVD etc
  Post lung and or heart transplant—Reduces pulmonary vascular resistance and contributes to the prevention of bacterial infections
  High altitude medicine—To address mountain sickness, High altitude pulmonary edema (HAPE), and reduce hypoxic pulmonary vasoconstriction
  Military field applications, such as inhalation injury, cardiopulmonary resuscitation/shock, and High-altitude sickness including during flight
  Cardiopulmonary Resuscitation—reverses acute PH due to pulmonary vasoconstriction increasing cardiac output (compressions)
  With stored blood or hemoglobin oxygen carriers to prevent complications
  During cardiopulmonary bypass to prevent complications
  With ECMO to reduce the use of heparin All publications, patent applications and patents mentioned herein are hereby incorporated by reference in their entirety as if each individual publication or patent was specifically and individually indicated to be incorporated by reference. Reference is made to U.S. application Ser. No. 15/907,241, filed Feb. 27, 2018, U.S. application Ser. No. 16/388,464, filed Apr. 18, 2019, U.S. application Ser. No. 16/697,498, filed Nov. 27, 2019, U.S. application Ser. No. 15/907,258, filed on Feb. 27, 2018, U.S. application Ser. No. 16/363,505, filed Mar. 25, 2019 and U.S. application Ser. No. 16/724,233, filed Dec. 21, 2019 which are hereby incorporated by reference in their entireties.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A nitric oxide (NO) generation system, comprising:
  one or more plasma chambers configured to ionize a reactant gas to generate a plasma for producing a product gas containing nitric oxide (NO) using a flow of the reactant gas through the one or more plasma chambers;
  a controller configured to regulate an amount of nitric oxide in the product gas using one or more parameters as an input to the controller, the one or more parameters including information from a plurality of sensors configured to collect information relating to at least one of the reactant gas, the product gas, and an inspiratory gas into which the product gas flows; and
  a flow divider configured to divide a flow of the product gas from the one or more plasma chambers into a first gas flow to provide a flow to the inspiratory gas and a second gas flow to be released into an environment as excess product gas,
  wherein the controller is configured to determine an amount of product gas to deliver to the first gas flow such that the first gas flow is in direct proportion to a flow rate of the inspiratory gas, and a flow rate of the second gas flow is a difference between a product gas flow rate from the one or more plasma chambers and a flow rate of the first gas flow.

2. The nitric oxide (NO) generation system of claim 1, wherein the second gas flow from the flow divider comprises excess product gas produced by the one or more plasma chambers that includes NO and $NO_2$.

3. The nitric oxide (NO) generation system of claim 2, wherein the second gas flow is configured to be scrubbed for at least one of NO and $NO_2$ prior to release into the environment.

4. The nitric oxide (NO) generation system of claim 2, wherein the second gas flow is released to a house vacuum.

5. The nitric oxide (NO) generation system of claim 1, wherein at least one of the plurality of sensors is a gas sensor configured to measure an NO concentration in the product gas.

6. The nitric oxide (NO) generation system of claim 5, wherein the measured NO concentration in the product gas is configured to be used for control of production of the product gas containing NO in the one or more plasma chambers.

7. The nitric oxide (NO) generation system of claim 1, wherein at least one of the plurality of sensors comprises an inspiratory flow sensor configured to sense an inspiration of a patient.

8. The nitric oxide (NO) generation system of claim 7, wherein a flow rate of product gas configured to be diverted to the patient is proportional to the flow rate of the inspiratory gas.

9. The nitric oxide (NO) generation system of claim 1, wherein a gas flow rate through the one or more plasma chambers is constant.

10. The nitric oxide (NO) generation system of claim 1, wherein a concentration of product gas at the flow divider is constant.

11. The nitric oxide (NO) generation system of claim 1, wherein at least one of the plurality of sensors is a gas sensor configured to measure an $NO_2$ concentration in the product gas.

12. The nitric oxide (NO) generation system of claim 1, wherein the flow divider is comprised of a first flow controller and a second flow controller that are configured to operate to deliver a constant flow rate from the one or more plasma chambers.

13. A method of generating nitric oxide (NO) comprising:
ionizing a reactant gas inside one or more plasma chambers to generate a plasma for producing a product gas containing nitric oxide using a flow of the reactant gas through the one or more plasma chambers, the one or more plasma chambers including at least one pair of electrodes for generating the product gas;
controlling an amount of nitric oxide in the product gas using one or more parameters as input to a control algorithm used by one or more controllers to control the one or more plasma chambers, at least one of the one or more parameters being related to a target concentration of NO in a combination of the product gas and an inspiratory gas into which the product gas flows; and
dividing a flow of the product gas from the one or more plasma chambers into a first gas flow for providing a flow to the inspiratory gas and a second gas flow to be released into an environment as excess product gas by determining a flow rate required for the first gas flow such that the first gas flow is in direct proportion to a flow rate of the inspiratory gas.

14. The method of claim 13, wherein the second gas flow is scrubbed for at least one of NO and $NO_2$ prior to release into the environment.

* * * * *